US008911323B2

(12) United States Patent
Kuo

(10) Patent No.: US 8,911,323 B2
(45) Date of Patent: Dec. 16, 2014

(54) MULTI-RATIO TRANSMISSION SYSTEM WITH PARALLEL VERTICAL AND COAXIAL PLANET GEARS

(71) Applicant: Cheng Ho Chen, Taichung (TW)

(72) Inventor: Chih Tsung Kuo, New Taipei (TW)

(73) Assignee: Cheng Ho Chen, Taichuch (TW)

( * ) Notice: Subject to any disclaimer, the term of this patent is extended or adjusted under 35 U.S.C. 154(b) by 0 days.

(21) Appl. No.: 13/914,329

(22) Filed: Jun. 10, 2013

(65) Prior Publication Data
US 2013/0345016 A1 Dec. 26, 2013

(30) Foreign Application Priority Data

Jun. 11, 2012 (TW) .............................. 101120943 A

(51) Int. Cl.
| | |
|---|---|
| F16H 3/44 | (2006.01) |
| F16H 37/04 | (2006.01) |
| B62M 11/16 | (2006.01) |
| F16H 3/62 | (2006.01) |
| B62M 11/18 | (2006.01) |

(52) U.S. Cl.
CPC ............. *F16H 37/042* (2013.01); *B62M 11/16* (2013.01); *F16H 3/62* (2013.01); *B62M 11/18* (2013.01)
USPC ........... 475/291; 475/330; 475/207; 475/209; 475/219

(58) Field of Classification Search
USPC ......... 475/207, 209, 219, 281, 283, 285, 287, 475/289, 291, 292, 302, 318, 344, 324, 330, 475/343
See application file for complete search history.

(56) References Cited

U.S. PATENT DOCUMENTS

| | | | | | |
|---|---|---|---|---|---|
| 4,479,404 | A | * | 10/1984 | Stockton ........................ | 475/149 |
| 5,782,717 | A | * | 7/1998 | Smothers et al. ............. | 475/221 |
| 5,845,727 | A | * | 12/1998 | Miyazawa et al. .......... | 180/206.4 |
| 6,572,508 | B2 | * | 6/2003 | Shoge ............................ | 475/324 |
| 7,188,719 | B2 | * | 3/2007 | Kerr ................................ | 192/65 |
| 7,238,132 | B2 | * | 7/2007 | Sowul et al. ....................... | 475/5 |
| 7,749,128 | B2 | * | 7/2010 | Kamada et al. ............... | 475/280 |
| 8,113,981 | B2 | * | 2/2012 | Kirkwood et al. ............ | 475/275 |
| 8,439,792 | B2 | * | 5/2013 | Serkh et al. .................... | 475/276 |
| 8,628,447 | B2 | * | 1/2014 | Schmitz et al. ............... | 475/302 |
| 8,727,931 | B2 | * | 5/2014 | Hafner .......................... | 475/299 |
| 2012/0055743 | A1 | * | 3/2012 | Jun ............................... | 187/412 |

* cited by examiner

*Primary Examiner* — David D Le
*Assistant Examiner* — Timothy Hannon
(74) *Attorney, Agent, or Firm* — Muncy, Geissler, Olds & Lowe, P.C.

(57) ABSTRACT

A multi-ratio transmission system is provided, including multiple planet gear sub-systems, at least two coupling assemblies, a setting element, a setting element controller, an annular gear, a cylindrical casing, a sprocket, and a central axle. The planet gear sub-systems are disposed coaxially in series along a first axis. Each of the planet gear sub-system includes a sun gear and at least one planet gear. Each coupling assembly transmits the rotation between every two adjacent planet gear sub-systems. The setting element optionally engages with the sun gear. The annular gear is installed onto a one-way clutch. The cylindrical casing encloses the planet gear sub-systems. The sprocket is installed onto the planet gear sub-systems through the one-way clutch. The central axle enables the hollowed tube of the setting element controller to rotate around the central axle.

32 Claims, 40 Drawing Sheets

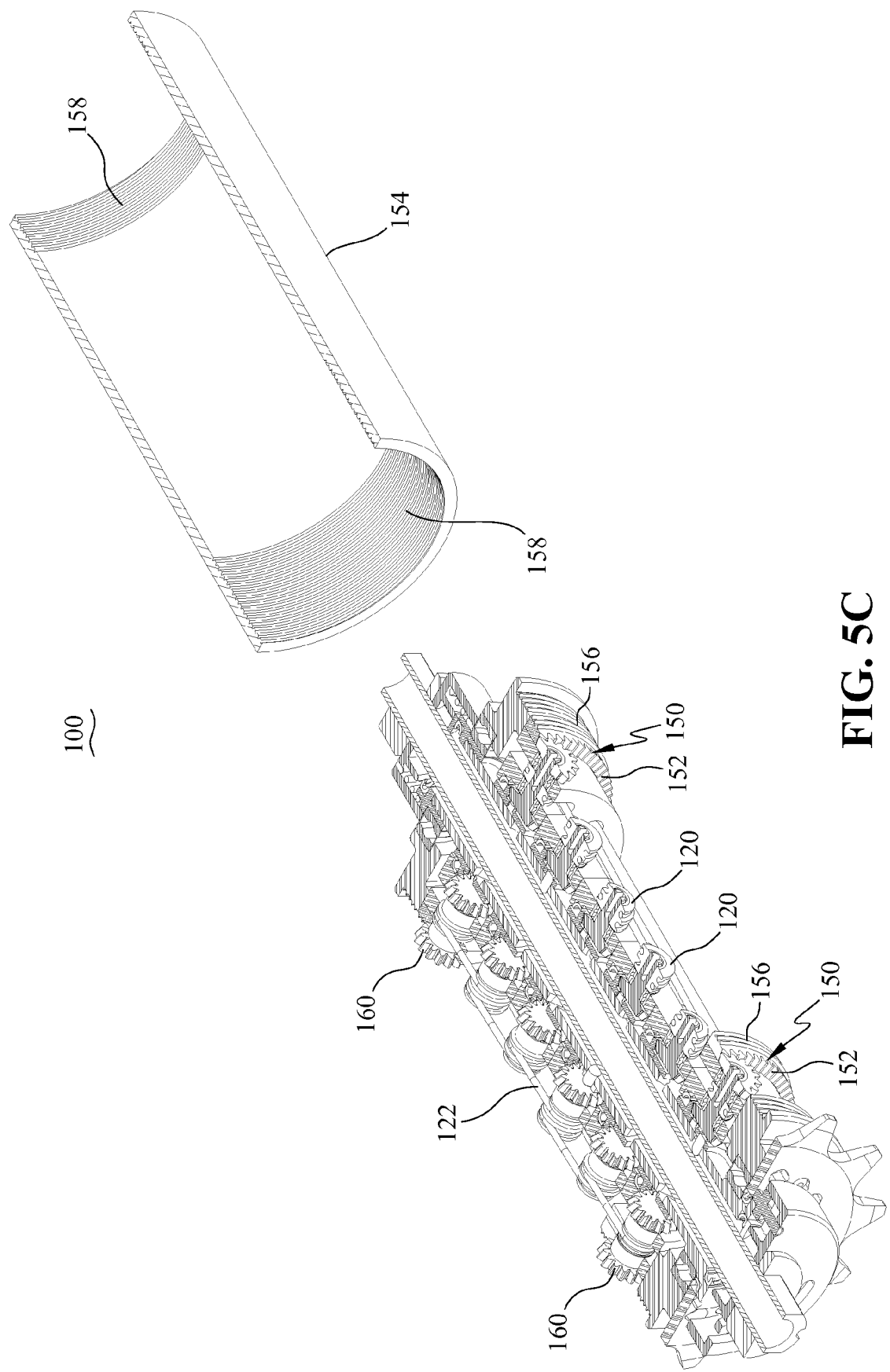

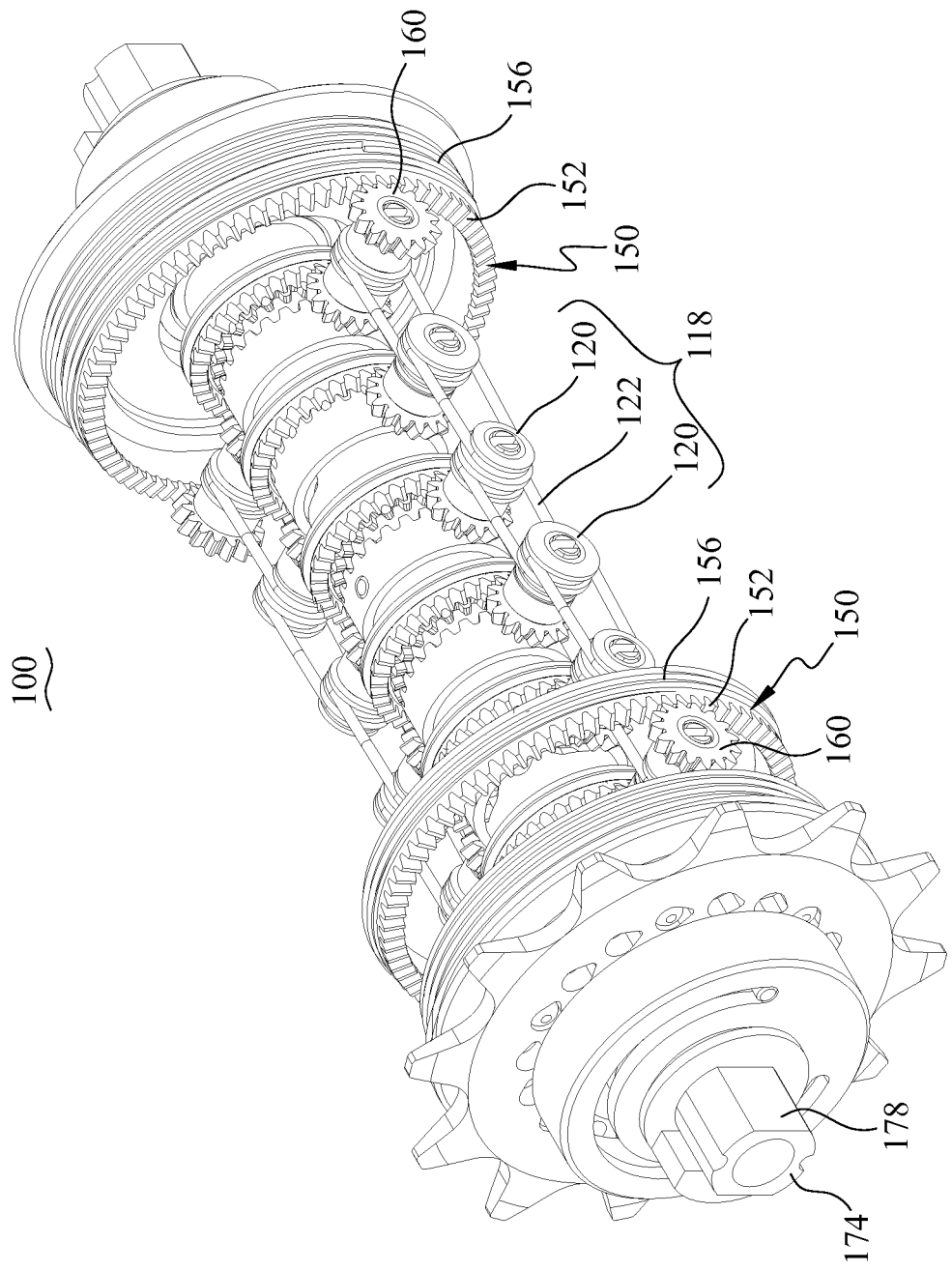

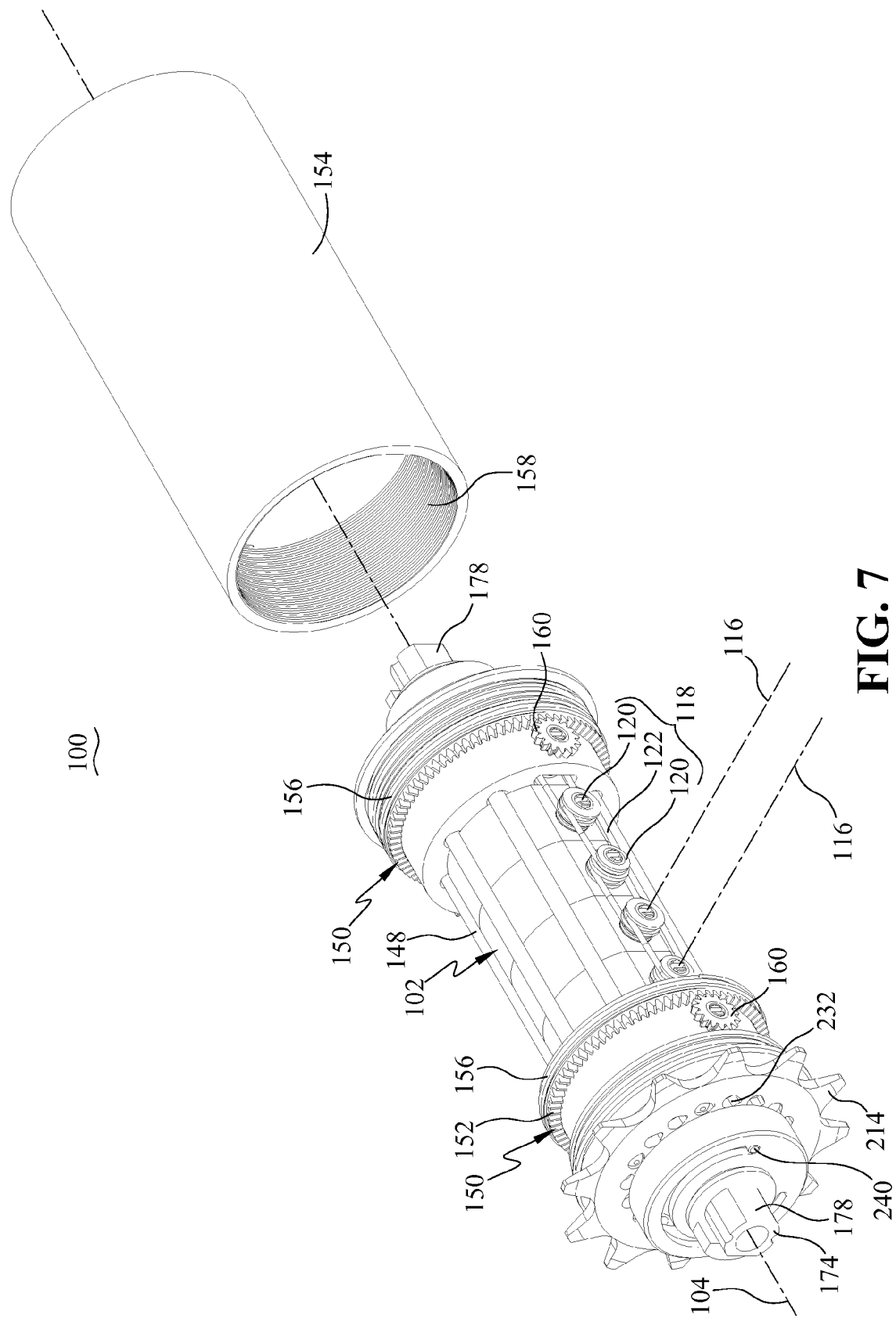

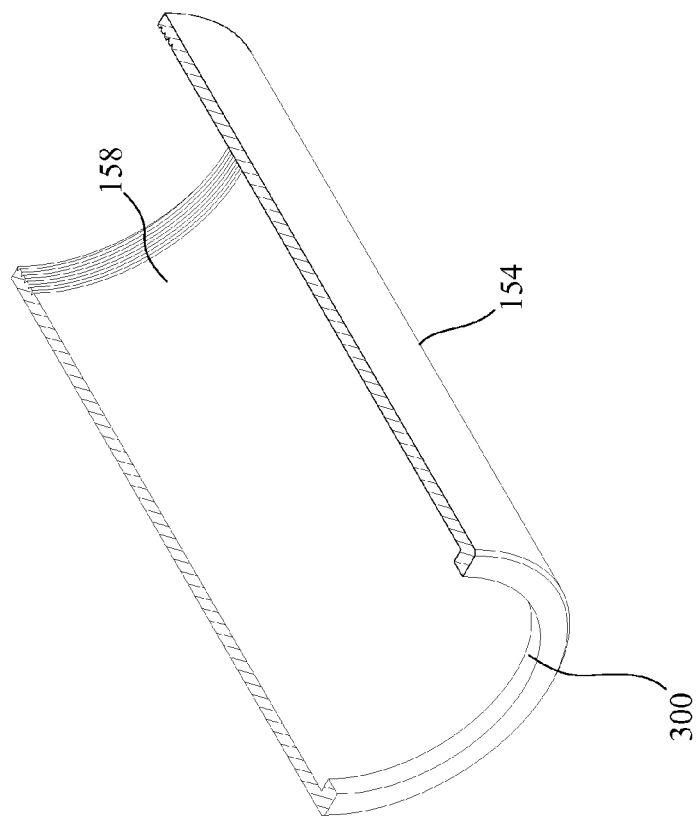
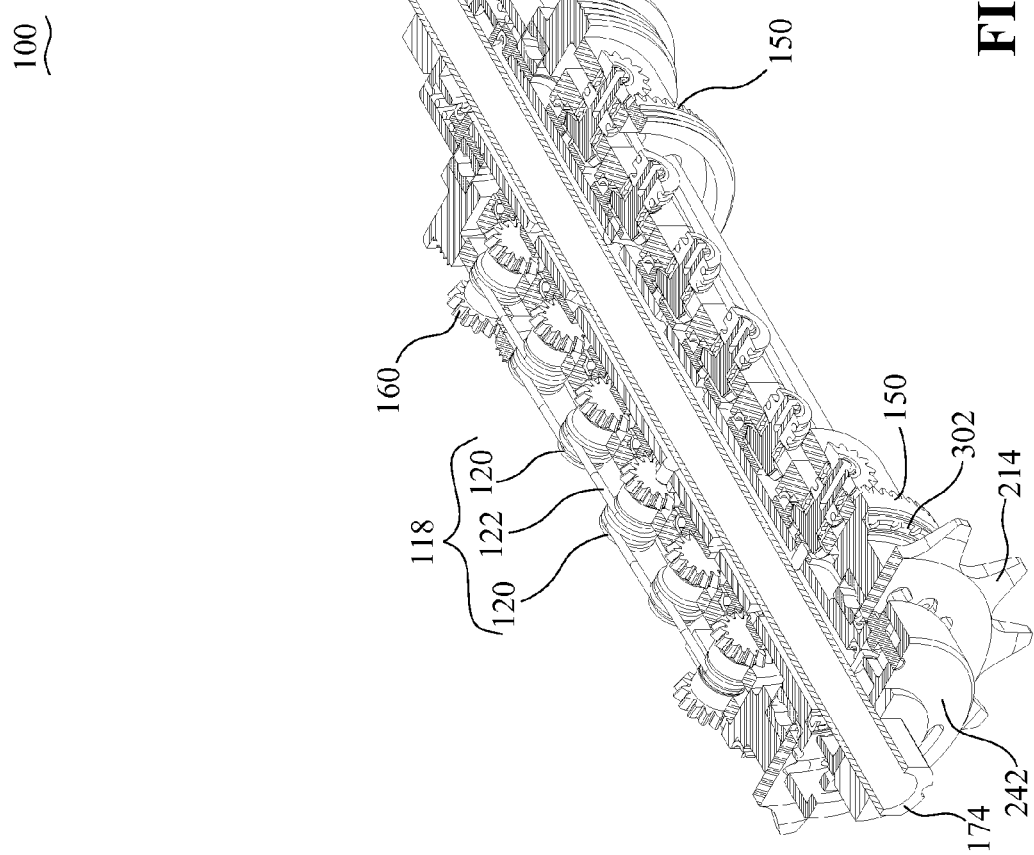
FIG. 11C

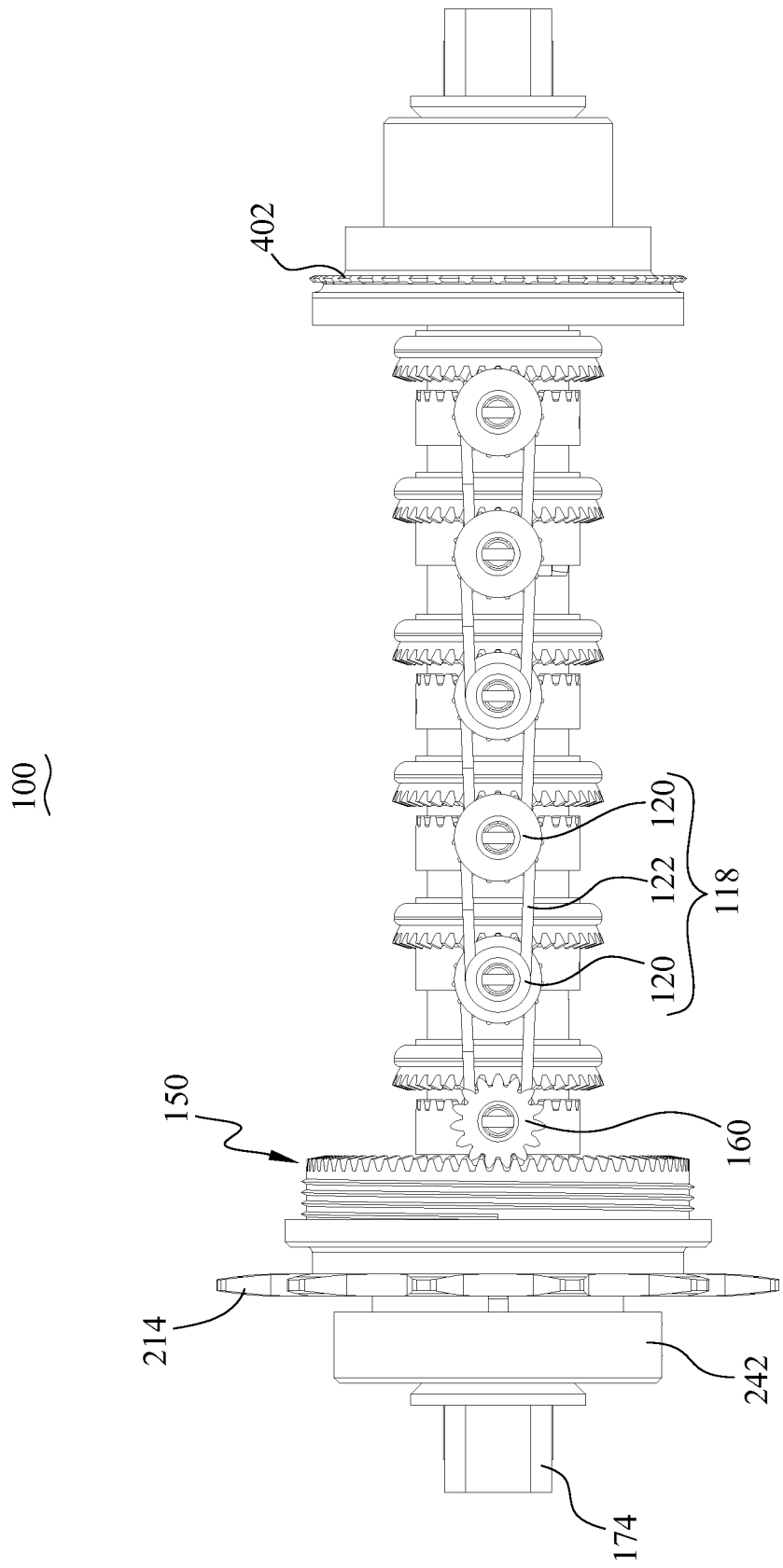

MULTI-RATIO TRANSMISSION SYSTEM WITH PARALLEL VERTICAL AND COAXIAL PLANET GEARS

CROSS-REFERENCE TO RELATED APPLICATION

This application claims the priority of Taiwanese patent application No. 101120943, filed on Jun. 11, 2012, which is incorporated herewith by reference.

BACKGROUND OF THE INVENTION

1. Field of the Invention

The present invention relates generally to a multi-ratio transmission system, more particularly, relates to a multi-ratio transmission system with parallel vertical and coaxial planet gears which can be used on bicycles, transportation vehicles or other devices.

2. The Prior Arts

Mechanical multi-ratio transmission systems are widely used in many different kinds of power machineries and equipments. The main purpose of the mechanical multi-ratio transmission system is to provide the change in rotation speeds and torques between the input end and the output end of the machinery.

The bicycle derailleur is one of the commonly seen multi-ratio transmission systems, which is mainly composed of different sizes of sprockets. As shown in FIG. 1, the bicycle derailleur system 900 includes multiple sprockets 902 which are coaxially disposed on the bicycle along bicycle wheel axle 904, e.g. the rear bicycle wheel axis. The sprockets 902 are connected to the bicycle pedals through a chain 906. In the system described above, derailing the chain 906 between sprockets 902 of different sizes can change the rotation speed ratio between the rear bicycle wheel and the pedal. Due to the nature of the structure of the derailleur, the axial size of the derailleur system would increase as more sprockets are added to the system. Therefore, only a limited number of sprockets can be used in such derailleur system to prevent the size of the system from becoming too large and thus interfering with the operation of the machinery or equipment. However, since each sprocket represents a different rotation speed, the number of the sprockets determines the number of transmission ratios available in a bicycle derailleur system. Hence, under the condition that the number of sprockets is limited, the number of the transmission ratios that can be provided by the derailleur is also limited.

Another type of commonly seen multi-ratio transmission system is the gear shifting system of the mobile vehicles, such as the ones in the automobiles or motorcycles. As shown in FIG. 2, such gear shifting system 920 usually have multiple sets of gears 924 that are engaged to one another installed within a metal casing 922. These gears 924 rotate around axles that are separately disposed from one another, and optionally slide on the axles to achieve different engagement status of the gears 924, thereby achieving the change in the speed ratio and torque between the output end and the input end. The gears 924 and the axles of the gears have the same size. In order to provide enough space for the gears to move around, the size of such gear shifting system is relatively large. In addition, similar to the derailleur of the bicycle, the number of the transmission ratios that can be achieved is also determined by the number of the gears in the system; therefore, when the number of gears is limited due to the limitation of the actual design of such system, the number of the transmission ratios that can be provided is also limited.

On the other hand, planet gear system is an effective way to reduce the size of the gear transmission system in the mechanical industry. FIG. 3 is an example of a commonly seen planet gear system. As shown in FIG. 3, the planet gear system 940 includes a sun gear 942 and an annular gear 944. The sun gear 942 and the annular gear 944 are coaxially placed with each other to form an annular space within. Multiple planet gears 946 are placed inside the annular space to simultaneously engage with the sun gear 942 and the annular gear 944. With such configuration, the sun gear 942, the annular gear 944 and the planet gears 946 basically rotate in different speed. When the planet gear system as described above is in use, each of the sun gear, the planet gear and the annular gear serve as the input end or the output end to change the rotation speed and the torque between the input end and the output end. However, the number of transmission ratio that can be achieved by a single planet gear system is limited; hence, two sets or more of the planet gear systems are often coupled together in the axial direction to increase the number of the transmission ratio or torque available. In addition, the rotation axes of the planet gears are parallel to the rotation axis of the sun gear, which still result in the increase of the overall size of the system.

Furthermore, similar to the derailleur of the bicycle and the gear shifting system of the automobile or motorcycle, axially coupling multiple planet gear systems together still increases the overall size of the multi-ratio transmission system, which is a disadvantage to the application of the system.

Therefore, it is urgently needed for the industry to develop a type of the multi-ratio transmission system that can provide a large number of transmission ratios while maintaining an overall small size of the system.

SUMMARY OF THE INVENTION

A primary objective of the present invention is to provide a multi-ratio transmission system with parallel vertical and coaxial planet gears. The multi-ratio transmission system is featured by a large number of gear ratios available with relatively small overall size of the system.

Another objective of the present invention is to provide a multi-ratio transmission system with parallel vertical and coaxial planet gears, where the adjacent planet gear systems are driven by the difference in the size of the coaxial pulleys, and by the combination relationship between the coaxial sub-pulleys. With such configuration, the present invention can exceed the conventional multi-ratio transmission system based on gears in the number of gear ratios available. In order to achieve a specific gear ratio in the conventional multi-ratio transmission system, the section area of the system is likely to increase; therefore the space needed for the system is also larger. Nevertheless, the combination relationship between the coaxial pulleys can easily multiply the relative gear ratio, and the flexibility in the belts can also provide the buffer effect needed during shifting between different gear ratios. In this way, a smooth shifting process is provided without the jumps, which occur during the gear shifting, caused by the difference in the accelerations.

A further objective of the present invention is to provide a multi-ratio transmission system with parallel vertical and coaxial planet gears, which has an overall size that can be installed onto a bicycle wheel axle while providing a relatively more gear ratios available than the conventional bicycle derailleur system.

A further objective of the present invention is to provide a multi-ratio transmission system with parallel vertical and coaxial planet gears, where the movement between the adjacent planet gear systems is transmitted through belts. With the flexibility of the belts, a buffer effect is achieved for smoothing the gear shifting process during the change of speed when shifting between different gears ratios. In this way, the riding experience of the bicycle can be enhanced due to the prevention of the jumps, which occurs during gear shifting, caused by the difference in acceleration among different gear ratios.

A further objective of the present invention is to provide a multi-ratio transmission system with parallel vertical and coaxial planet gears including multiple planet gear sub-systems. The planet gear sub-systems are coaxially placed with one another, and a coupling gear system is provided to connect every two adjacent planet gear sub-systems to form a hybrid planet gear system. As a multi-ratio transmission system, such hybrid planet gear system has a wider range of gear ratio available.

For achieving the foregoing objectives, the present invention provides a multi-ratio transmission system with parallel vertical and coaxial planet gears. The multi-ratio transmission system includes: multiple planet gear sub-systems, at least two coupling assemblies, a setting element, a setting element controller, an annular gear, a cylindrical casing, a sprocket and a central axle. The planet gear sub-systems are coaxially disposed in series along a first axis. Each of the planet gear sub-system includes: a sun gear and at least one planet gear. The sun gear is coaxially disposed along the first axis and rotates around the first axis optionally. The planet gear is coaxially disposed along a second axis, which is vertical to the first axis, and rotates around the second axis. Each coupling assembly includes a gear set, and is disposed between every two adjacent planet gear sub-systems so as to transmit the rotation of the planet gear of the former planet gear sub-system to planet gear of the latter planet gear sub-system. The at least two coupling assemblies form a group of coupling assemblies, and multiple groups of the coupling assembly are disposed along the first axis in a repeated manner. The setting element is disposed corresponding to each planet gear sub-system. The setting element optionally moves in the direction of first axis so as to optionally engage with the sun gear of the planet gear sub-system. The setting element controller has a hollowed tube, which is disposed coaxially with the first axis to rotate around the first axis within a range of predetermined angles. The hollowed tube has an outer circumferential surface. A cam groove is formed on the outer circumferential surface in the circumferential direction corresponding to each of the setting element of the planet gear sub-system, thereby allowing the setting element to optionally move along the first axis and to optionally engage with the sun gears of the planet gear sub-systems. The annular gear is installed onto a one-way clutch. Meanwhile, the annular gear forms a linkage relationship with the planet gear of at least one planet gear sub-system. The cylindrical casing encloses the planet gear sub-systems, wherein the cylindrical casing has a front end for rotatably fitting the annular gear. The sprocket is installed onto the one-way clutch, and is installed with an external transmission system to drive the planet gear sub-systems to rotate via the one-way clutch and the annular gear. The central axle is disposed coaxially with the first axis. The central axle is inserted into a center through hole of the hollowed tube of the setting element controller by relative rotation, thereby enabling the hollowed tube to rotate around the central axle.

According to an embodiment of the present invention, the second axes of the planet gears of the planet gear sub-systems are configured to be parallel to one another.

According to an embodiment of the present invention, the sun gear of each planet gear sub-system includes an outer gear, which is a bevel gear. The planet gear of each planet gear sub-system is a bevel gear. The planet gear of each planet gear sub-system engages with the outer gear of the sun gear.

According to an embodiment of the present invention, the sun gear further includes an inner gear. The setting element is a crown gear, which optionally engages with the inner gear of the sun gear.

According to an embodiment of the present invention, the sun gear of each planet gear sub-system includes an outer gear and an inner gear. The outer gear and the inner gear are coaxially connected to each other. The outer gear is located at the outer side of the inner gear and is a bevel gear. The planet gear of the planet gear sub-system is a bevel gear, which is engaged with the outer gear of the sun gear. The setting element is a crown gear, which optionally engages with the inner gear of the sun gear.

According to an embodiment of the present invention, each planet gear sub-system includes two planet gears, which are disposed opposite to each other.

According to an embodiment of the present invention, the coupling assembly includes two small gears and a coupling gear plate. The two small gears are coaxially connected to the planet gears of two adjacent planet gear sub-systems respectively, and are rotated in synchronization with the planet gears respectively. The coupling gear plate is disposed between two small gears and has two gears. The two gears are engaged with the two small gears.

According to an embodiment of the present invention, the two gears of the coupling gear plate are two crown gears. The two crown gears are formed on two axial end surfaces of the coupling gear plate respectively.

According to an embodiment of the present invention, the two crown gears of the coupling gear plate are configured to have different diameters.

According to an embodiment of the present invention, the two crown gears of the coupling gear plate are configured to have the same diameter.

According to an embodiment of the present invention, the multi-ratio transmission system of the present invention includes two of the coupling plate. The two crown gears of at least one of the coupling gear plate are configured to have different diameters, and the two crown gears of at least one of the coupling gear plate are configured to have the same diameter.

According to an embodiment of the present invention, the multi-ratio transmission system of the present invention includes two of the coupling gear plates. The two crown gears of each coupling gear plate are configured to have different diameters, and the two coupling gear plates are disposed symmetrically with each other.

According to an embodiment of the present invention, each of the group of coupling assemblies includes two coupling assemblies. The two crown gears of the two coupling gear plates in each group are configured to have different diameters, and the two coupling gear plates are disposed symmetrically with each other.

According to an embodiment of the present invention, wherein each group of coupling assemblies includes three coupling assemblies. The two crown gears of two coupling gear plates in the three coupling gear plates of the three coupling assemblies are configured to have different diameters. The two coupling gear plates are disposed symmetrically with each other. The two crown gears of the other coupling gear plate are configured to have the same diameter, and the other coupling gear plate is disposed between the two coupling gear plates described previously.

According to an embodiment of the present invention, the annular gear engages with the small gear of a first planet gear sub-system among the planet gear sub-systems, so as to form the linkage relationship between the planet gear and the annular gear.

According to an embodiment of the present invention, the central axle has two ends, which are secured with a bicycle rack respectively.

According to an embodiment of the present invention, two flat surfaces are formed opposite to each other on each end of the central axle. The two flat surfaces of the central axle are engaged with two corresponding flat surfaces of the bicycle rack to prevent relative rotation between the central axle and the bicycle rack.

According to an embodiment of the present invention, the setting element controller further includes a rotation controller. The rotation controller is installed onto an end of the hollowed tube so as to optionally rotate the hollowed tube in the range of predetermined angles.

According to an embodiment of the present invention, the setting element includes a hollowed cylinder. Teeth are formed on a side end of the hollowed cylinder. The hollowed cylinder is disposed coaxially with the sun gear of the planet gear sub-system in such way that the hollowed cylinder moves along the first axis corresponding to the sun gear, thereby allowing the teeth to optionally engage with the sun gear. The hollowed cylinder includes a control pin, in which a free end of the control pin is inserted into the cam groove to move along the cam groove.

According to an embodiment of the present invention, a shoulder portion is formed between the annular gear and the one-way clutch. An annular flange is formed inwardly at the front end of the cylindrical casing. The annular flange abuts against the shoulder portion of the annular gear to rotatably fit the annular gear inside the front end of the cylindrical casing.

According to an embodiment of the present invention, the multi-ratio transmission system further includes a bearing. The bearing is disposed between the annular flange of the cylindrical casing and the shoulder portion formed between the annular gear and the one-way clutch.

According to an embodiment of the present invention, the multi-ratio transmission system includes another annular gear. The other annular gear is rotatably fitted at a rear end of the cylindrical casing opposite to the front end. The annular gear and the other annular gear form a linkage relationship with the planet gears of the first planet gear sub-systems and a last planet gear sub-systems among the planet gear sub-systems respectively.

According to an embodiment of the present invention, the multi-ratio transmission system includes a securing end cap having a center hole. The other annular gear is rotatably supported inside the center hole.

According to an embodiment of the present invention, an outer thread is formed at an outer circumferential surface of the securing end cap, and an inner thread is formed at an inner circumferential surface at the rear end of the cylindrical casing. The outer thread of the securing end cap is engaged with the inner thread of the cylindrical casing to secure the securing end cap at the rear end of the cylindrical casing.

According to an embodiment of the present invention, the annular gear and the other annular gear are engaged with the small gears of the first and the last planet gear sub-systems respectively, thereby forming the linkage relationship between the annular gears and the planet gears of the planet gear sub-systems.

According to an embodiment of the present invention, each planet gear sub-system includes an annular base. A circular wall structure is formed on the annular base surrounding the setting element and the planet gear of the planet gear sub-system while being disposed coaxially with the first axis. A hole is formed on the annular base for rotatably fitting and supporting an axle of the planet gear.

According to an embodiment of the present invention, the rotation controller is installed onto a shift cable connector for connecting to a shift cable. The rotation controller and the hollowed tube installed onto the rotation controller are driven to rotate around the first axis by pulling the shift cable.

According to an embodiment of the present invention, a connecting hole is formed on the rotation controller for inserting an inner axial pin of the shift cable connector.

According to an embodiment of the present invention, the multi-ratio transmission system further includes a shift-guiding component inserted and connected to the central axle. A circular guiding groove is formed coaxially with the first axis on the shift-guiding component. The shift cable connector has an outer axial pin which is slidably inserted into the circular guiding groove. The circular guiding groove extends for a range of angles in the circumferential direction. The range of angles is corresponded to the range of predetermined angles of the rotation of the hollowed tube of the setting element controller.

According to an embodiment of the present invention, an insertion hole is formed at the center of the shift-guiding component. The two sides of the insertion hole are formed as two flat walls for abutting against the flat surfaces of the central axle, thereby preventing relative rotation between the central axle and the shift-guiding component.

According to an embodiment of the present invention, the one-way clutch includes a clutch casing and at least one pin set. The clutch casing is integrally formed with the annular gear. The clutch casing has an annular protrusion for installing the sprocket, and at least one pin-fitting hole is formed on the annular protrusion. The at least one pin set is fitted inside the pin-fitting hole. The pin set includes a pin, which is constantly pushed outward by a spring to engage with one of the engaging holes formed on the sprocket, and is retracted from the engaging hole by an external force.

According to an embodiment of the present invention, the engaging holes of the sprocket are distributed along a circle, which is coaxial to said first axis, with equal angular intervals in between every two adjacent engaging holes. Each engaging hole has a flat surface and an oblique surface opposite to the flat surface. The flat surface is abutted against the pin to transmit force in a given rotation direction. The oblique surface serves as a cam and guides the pin outside the engaging hole upon contact to avoid force transmission in a rotation direction opposite to the given rotation direction.

BRIEF DESCRIPTION OF THE DRAWINGS

The present invention will be apparent to those skilled in the art by reading the following detailed description of a preferred embodiment thereof, with reference to the attached drawings, in which:

FIG. 5C is a perspective sectional view of the first embodiment of the multi-ratio transmission system with parallel vertical and coaxial planet gears according to the present invention, where the cylindrical casing is apart from the system;

FIG. 6A is perspective view of the first embodiment of the multi-ratio transmission system with parallel vertical and coaxial planet gears according to the present invention, where the cylindrical casing and the annular bases of each planet gear sub-system are omitted for a better view of the internal structure;

FIG. 7 is a perspective view of the second embodiment of the multi-ratio transmission system with parallel vertical and coaxial planet gears according to the present invention;

FIG. 11C is a perspective sectional view of the third embodiment of the multi-ratio transmission system with parallel vertical and coaxial planet gears according to the present invention, where the cylindrical casing is apart from the system;

FIG. 15B is a side view of FIG. 15A;

DETAILED DESCRIPTION OF THE PREFERRED EMBODIMENTS

Figure 1:
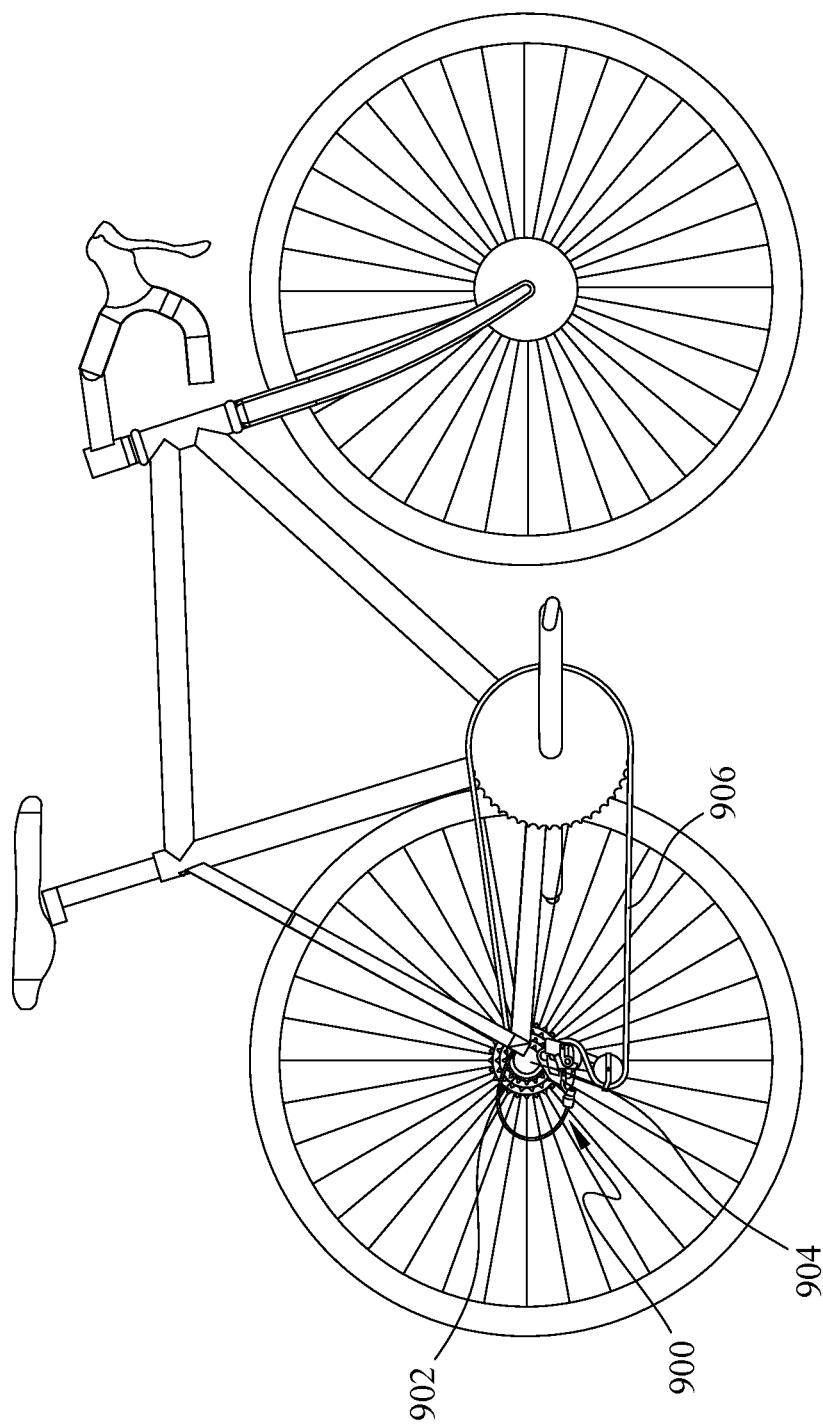
FIG. 1 is a schematic view illustrating a conventional derailleur system of a bicycle.
Figure 2:
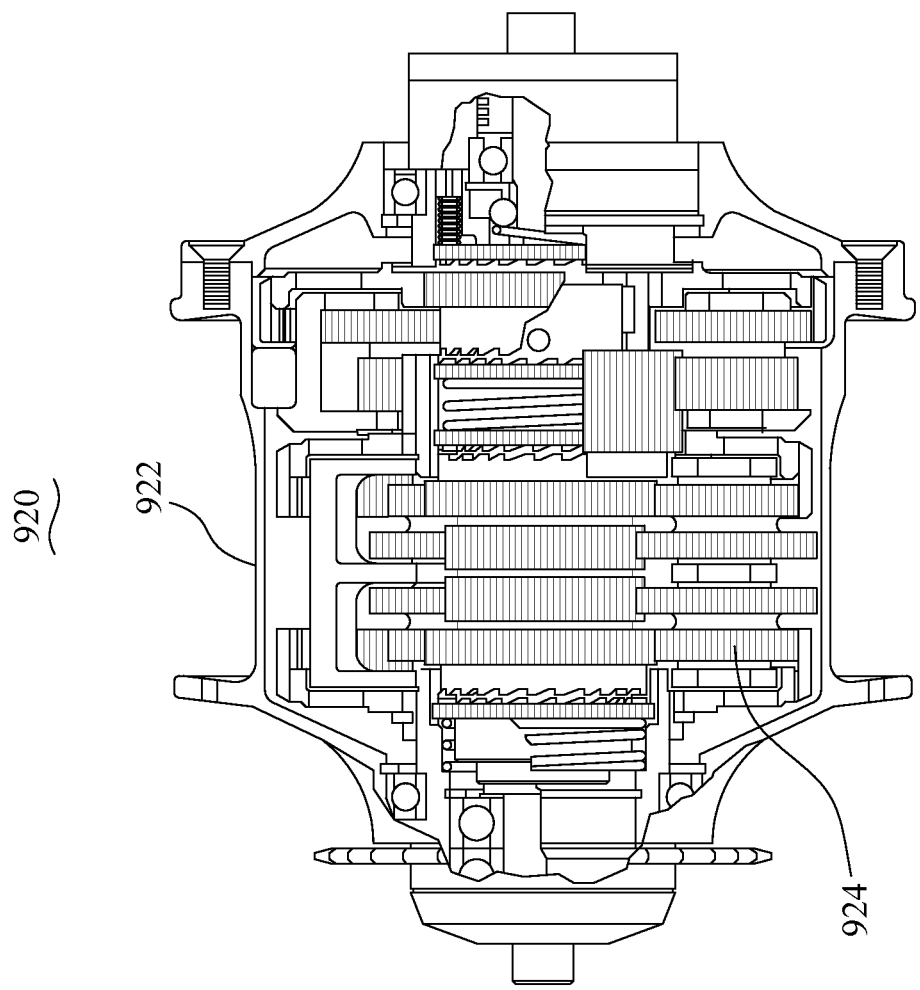
FIG. 2 is a schematic view illustrating a conventional gear shifting system of an automobile.
Figure 3:
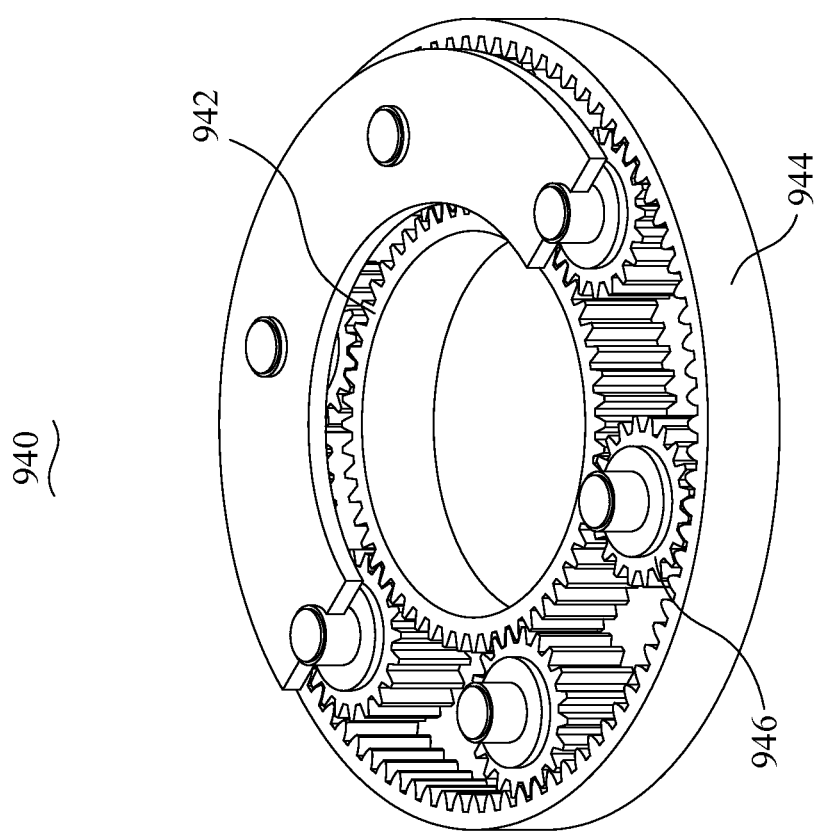
FIG. 3 is a schematic view illustrating a conventional planet gear system.

The accompanying drawings are included to provide a further understanding of the invention, and are incorporated in and constitute a part of this specification. The drawings illustrate embodiments of the invention and, together with the description, serve to explain the principles of the invention. The preferred embodiments are for illustrative purpose but to limit the scope of the present invention. Those who skilled in the art can make modification to the present invention within the scope defined by the claims of the present invention.

A multi-ratio transmission system with parallel vertical and coaxial planet gears provided in the present invention mainly includes multiple planet gear sub-systems. The planet gear sub-systems are coaxially placed in series along a first axis, which is defined by the common axis of the planet gear sub-systems. Each planet gear sub-system includes a center sun gear and at least one planet gear. The sun gear is disposed coaxially with the first axis, and is able to optionally rotate around the first axis. The planet gear is disposed coaxially with a second axis, which is perpendicular to the first axis, and is able to rotate around the second axis. The second axis of the planet gear of each planet gear sub-system is configured to be perpendicular to the first axis, and is configured to be parallel with each other to form the multi-ratio transmission system with parallel vertical and coaxial planet gears of the present invention.

Two adjacent planet gear sub-systems are coupled together with a coupling assembly. In this way, the rotation of the planet gear of the former planet gear sub-system can be transmitted to the planet gear of the latter planet gear sub-system, thereby enabling the planet gears of each planet gear sub-system to rotate around the second axis.

Each planet gear sub-system further includes a setting element. The setting element can optionally move along the first axis so as to optionally engage and secure the sun gear, or to disengage and release the sun gear. With the combination of the engaged sun gears and the disengaged sun gears of the planet gear sub-systems, the present invention is able to provide different gear ratios.

The multi-ratio transmission system with parallel vertical and coaxial planet gears of the present invention further includes a setting element controller. The setting element controller is connected to the setting element of each planet gear sub-system for optionally moving the setting elements. In this way, the setting elements of the planet gear sub-systems can optionally engage or disengage with each sun gear.

The multi-ratio transmission system with parallel vertical and coaxial planet gears of the present invention further includes an annular gear. The annular gear is engaged with the planet gear of the planet gear sub-system.

In the multi-ratio transmission system with parallel vertical and coaxial planet gears of the present invention as described above, the first planet gear sub-system, i.e. the front planet gear sub-system, can be configured to be the input end, and the annular gear can be configured to be the output end (or the other way around). The planet gear sub-systems are placed in series along the first axis to form a hybrid planet gear system. Such hybrid planet gear system is able to transmit rotation speed or torque from the input end to the output end, and is able to further provide different gear ratios between the input end and the output end. Meanwhile, by controlling the engagement status between the setting element and the sun gear in each planet gear sub-system through the setting element controller, the gear ratios can be changed.

The multi-ratio transmission system with parallel vertical and coaxial planet gears of the present invention is featured by placing the planet gear sub-systems in series along a common axis, i.e. the first axis, and configuring the planet gear of each planet gear sub-system to be parallel to one another while being perpendicular to the common axis. A coupling assembly is used to couple the planet gears of two adjacent planet gear sub-systems. In this way, the overall size of the multi-ratio transmission system with parallel vertical and coaxial planet gears can be greatly reduced, while multiple planet gear sub-systems can be placed in series and coupled together to form a hybrid planet gear system.

In the first embodiment of the present invention, the multi-ratio transmission system of the present invention is placed in a bicycle wheel hub. Herein, the annular gear is configured to be the output end and is installed onto the spokes of the wheels. The first planet gear sub-system is configured to be the input end and is engaged with an input gear, where the input gear is installed onto the sprockets of the bicycle. In this way, when the user rides on the bicycle, the torque is transmitted from the pedals through the sprockets to the first planet gear sub-system, and then the torque is passed through each planet gear sub-system to the annular gear. The annular gear then rotates the wheel via the spokes of the wheels.

The user can move the setting elements in each planet gear sub-system to optionally engage with the sun gear via the setting element controller, thereby changing the gear ratio of the transmission system.

First Embodiment

Figure 4:
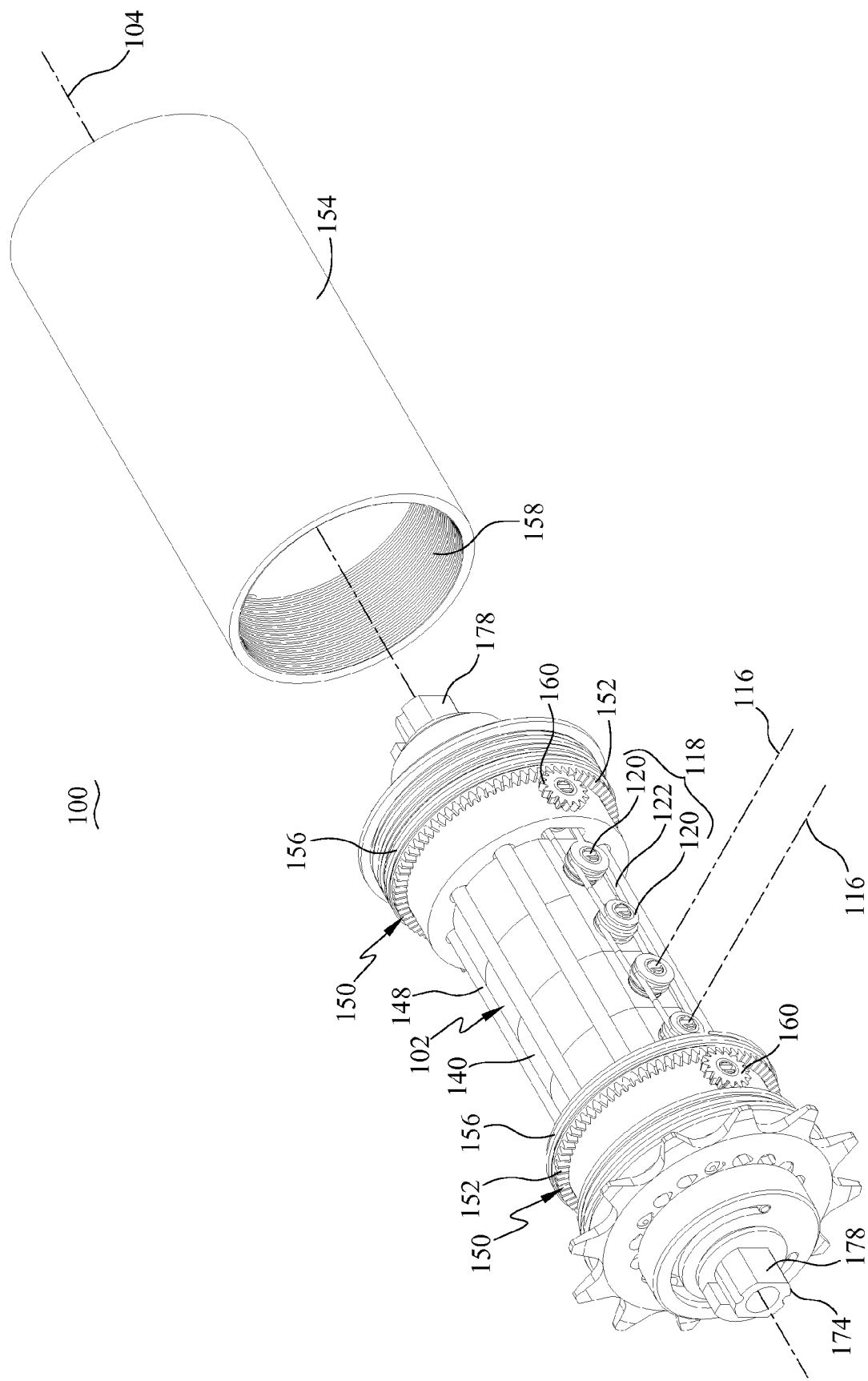
FIG. 4 is a perspective view of the first embodiment of a multi-ratio transmission system with parallel vertical and coaxial planet gears according to the present invention.
Figure 5A:
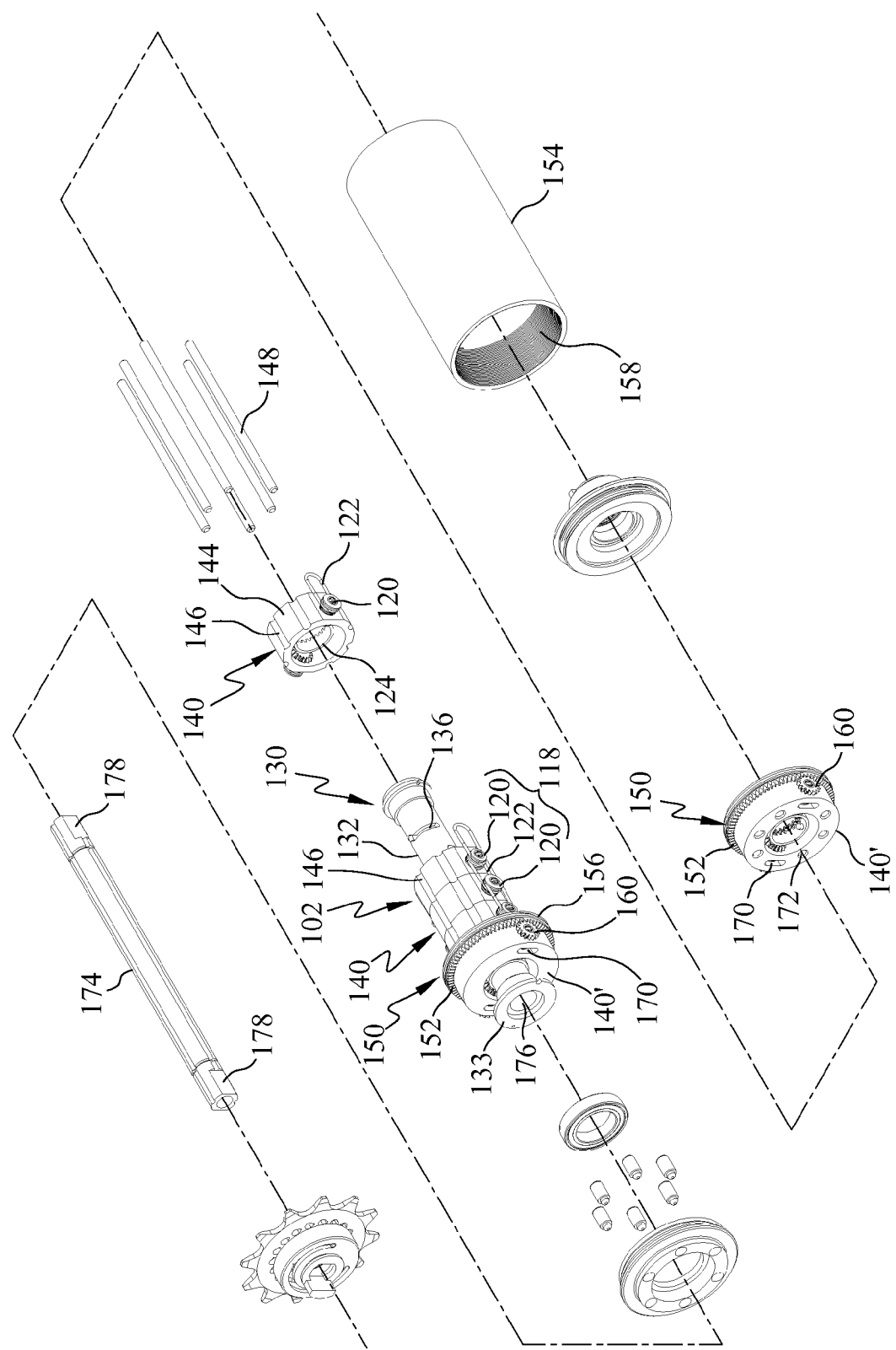
FIG. 5A is an exploded view of the first embodiment of the multi-ratio transmission system with parallel vertical and coaxial planet gears according to the present invention.
Figure 5B:
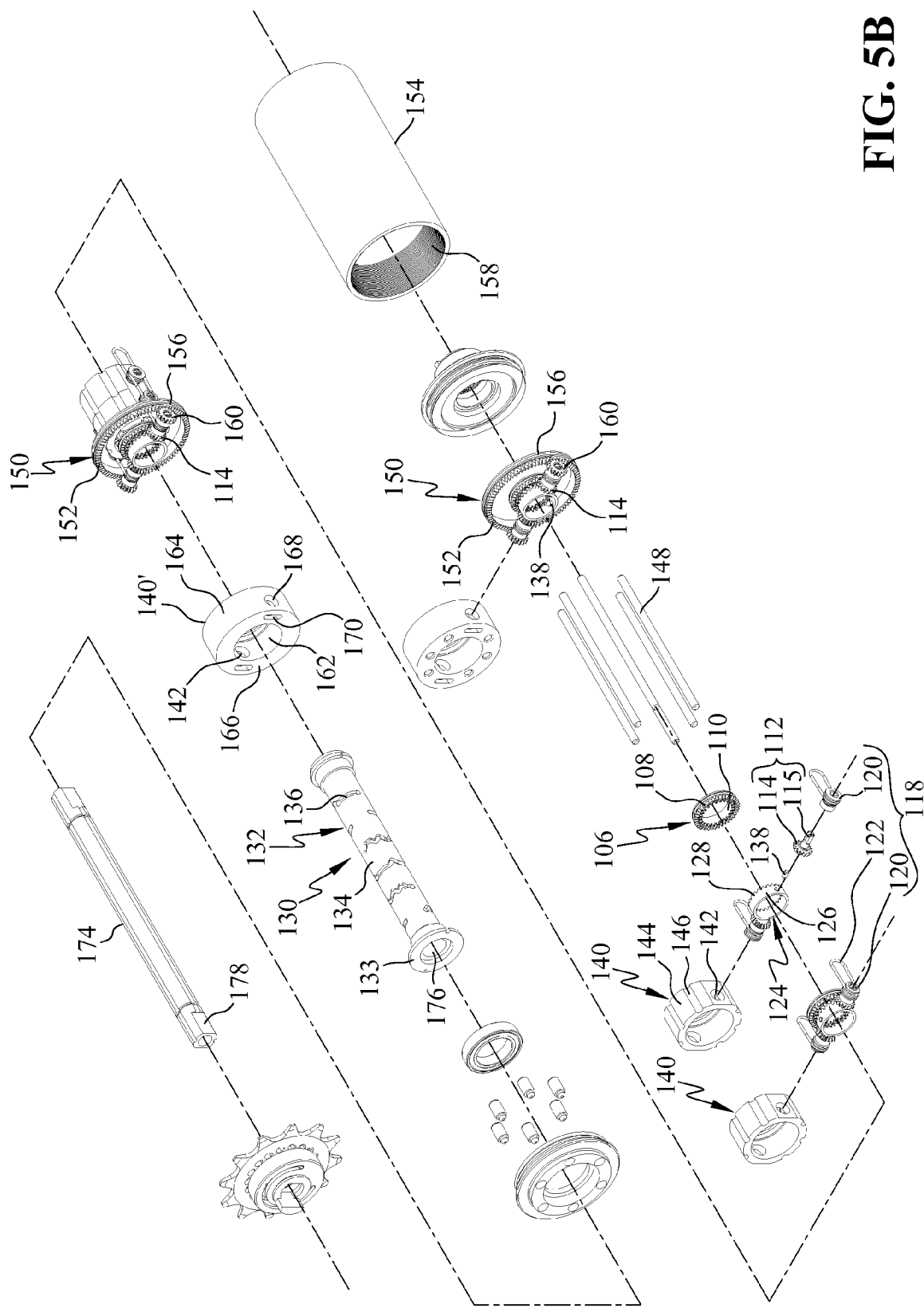
FIG. 5B is another exploded view of the first embodiment of the multi-ratio transmission system with parallel vertical and coaxial planet gears according to the present invention.
Figure 6B:
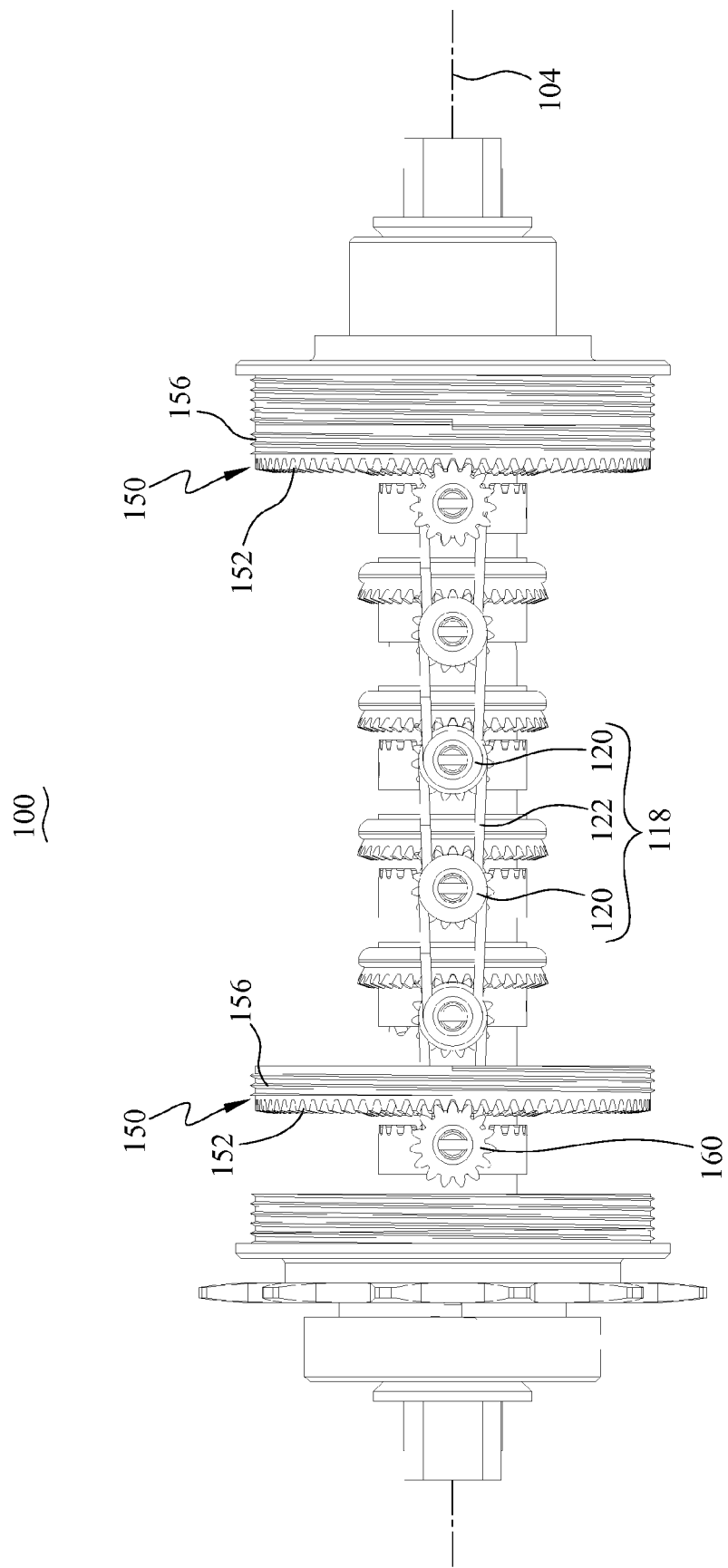
FIG. 6B is a side view of FIG. 6A.

In the following section, the first embodiment of the multi-ratio transmission system with parallel vertical and coaxial planet gears according to the present invention will be described with reference to FIG. 4, FIG. 5A, FIG. 5B, FIG. 5C, FIG. 6A and FIG. 6B.

In the figures of the present invention, the multi-ratio transmission system with parallel vertical and coaxial planet gears is given the item number 100. According to the first embodiment of the present invention, the multi-ratio transmission system 100 includes multiple planet gear subsystems 102. In the first embodiment, the multi-ratio transmission system 100 includes six planet gear sub-systems 102. The six planet gear sub-systems 102 are coaxially placed in series along a common axis, which is defined as a first axis 104. Each planet gear sub-system 102 includes a sun gear 106, which is configured to rotate around the first axis 104. The sun gear 106 includes an outer gear 108 and an inner gear 110. The outer gear 108 and the inner gear 110 are connected coaxially relative to each other. The outer gear 108 is a bevel gear and is located at an outer side of the inner gear 110.

Each planet gear sub-system 102 further includes at least one planet gear set 112 having a planet gear 114. The planet gear 114 is a bevel gear, and is able to engage with the outer gear 108 of the sun gear 106. The planet gear 114 is mounted on an axle 115 so as to rotate around a second axis 116. The second axis 116 is perpendicular to the first axis 104, and is defined by the axis of the axle 115. Notably, the second axis 116 of the planet gear 114 in each planet gear sub-system 102 is perpendicular to the first axis 104, and is configured to be parallel with each other.

Considering the balance of the forces, each planet gear sub-system 102 includes two planet gears 114 in the first embodiment. The two planet gears 114 are configured to be opposite to each other, in other words, the two planet gears 114 are 180 degrees apart from each other. However, the number of the planet gears 114 is not limited by the first embodiment. If necessary, each planet gear sub-system 102 can include three or more planet gears 114 that are configured symmetrically about the axle (or not symmetrically about the axle).

A coupling assembly 118 is used to couple two adjacent planet gear sub-systems 102 together, so that rotation of the planet gear 114 of the former planet gear sub-system 102 is transmitted to the planet gear 114 of the latter planet gear sub-system 102. In the first embodiment, the coupling assembly includes two pulleys 120. Each pulley 120 is connected to the axles 115 of the planet gear sets 112 of the two adjacent planet gear sub-systems, so as to rotate in synchronization with the planet gears 114 of the planet gear sets 112. A belt 122 is trained around the two pulleys 120 to connect the two pulleys, so the rotation of the planet gear 114 of the former planet gear sub-system is transmitted through the axle 115 and the pulleys 120 to the planet gear 114 of the latter planet gear sub-system 102.

It is worth noting that except for the first (the front) and the last (the rear) planet gear sub-system 102, each axle 115 of the planet gear 114 in the rest of the planet gear sub-systems is installed with two pulleys 120. The two pulleys 120 installed on the axle 115 are connected to the pulley 120 of the former planet gear sub-systems 102 and to the pulley 120 of the latter planet gear sub-systems 102 via two belts 122.

Except for the combination of pulleys 120 and belts 122, those who skilled in the art can use other means to set up the coupling assembly 118. For example, one can replace the combination of pulleys 120 and belts 122 with gear sets, which can also transmit the rotation of the planet gear 114 of the former planet gear sub-system 102 to the planet gear 114 of the latter planet gear sub-system 102. Of course, there are many other conventional methods to transmit the rotation motion between two objects. If the conventional methods or mechanism used to transmit the rotation motion are in the same field as the present invention, they are considered to have the same effect with the mechanism used in the present invention, and therefore are within the protection scope of the present invention.

Another fact worth mentioning is that in the coupling assembly 118 composed of the pulleys 120 and the belts 122, the belt 122 is made from material with flexibility or elasticity. Although the belt 122 is tensely stretched between two pulleys 120, it is still able to provide further stretching in some degrees, which can provide the buffer effect while transmitting forces. In other words, the flexibility of the belt 122 enables the same to serve as the "buffer", which prevents the direct and immediate transmission of the force. In this way, the force transmission between the pulleys 120 is smoother. In the human-powered devices, for example the transmission system of the bicycle, such characteristic is very useful. With the buffer effect provided during the transmission, the user would not feel the jumps, which is caused by the difference in the acceleration, when shifting between different gear ratios. In short, with the coupling assembly 118 composed of the belts and pulleys, a smoother transmission can be obtained, thereby avoiding the jumps, which is caused by the difference in the acceleration, during the shifting between gear ratios.

Furthermore, each planet gear sub-system 102 further includes a setting element 124. The setting element is able to optionally move along the first axis 104, so as to engage and secure the sun gear 106 of the planet gear sub-system 102, or to disengage and release the sun gear 106 of the planet gear sub-system 102. In the first embodiment, the setting element 124 is a crown gear and has a hollowed cylinder 126. The setting element 124 is disposed coaxially with the sun gear 106, and is able to move along the first axis 104 corresponding to the sun gear 106. Teeth 128 are formed at an end of the hollowed cylinder 126 of the setting element 124 facing the inner gear 110 of the sun gear 106. When the setting element 124 moves toward the sun gear 106, the teeth 128 are then engaged with the inner gear 110 of the sun gear 106, thereby securing the sun gear 106. When the setting element 124 moves away from the sun gear 106, the teeth 128 of the setting element 124 are disengaged from the inner gear 110, thereby releasing the sun gear 106 for free rotation. With the configuration described above, different gear ratios are provided based on the engagement statuses of the sun gears 106 of the planet gear sub-systems 102.

The multi-ratio transmission system 100 of the present invention further includes a setting element controller 130. The setting element controller 130 is connected to the setting element 124 of each planet gear sub-system 102, so as to enable the setting element 124 to engage the sun gear 106 or disengage from the sun gear 106. In the first embodiment, the setting element controller 130 includes a hollowed tube 132. The hollowed tube 132 is disposed coaxially with the first axis 104, and is able to rotate around the first axis 104 in a range of predetermined angles. The hollowed tube 132 has two ends. At least one end of the hollowed tube 132 is installed with a rotation controller 133 for optionally rotating the hollowed tube 132 within the range of predetermined angles. The hollowed tube 132 has an outer circumferential surface 134, where multiple cam grooves 136 are formed generally in the circumferential direction. In the first embodiment, six cam grooves 136 are formed corresponding to the setting elements 124 of the six planet gear sub-systems 102. The hollowed cylinder 126 of each setting element 124 has an inner circumferential surface (not numbered). A control pin 138 is installed on the inner circumferential surface in such way that the free end of the control pin 138 is inserted into the corresponding cam groove 136, so that the control pin 138 can move along the cam groove on the outer circumferential surface 134 in the circumferential direction. Hence, when the rotation controller 133 rotates the hollowed tube 132 of the setting element controller 130 in the range of predetermined angles, the setting elements 124 of all six planet gear sub-systems 102 move in the axial direction along the first axis 104 corresponding to the cam grooves 136 due to the control pins 138 inserted in the cam grooves 136. In this way, the setting elements 124 moved closer to or away from the sun gears 106, and thereby engaging or disengaging from the corresponding sun gears 106. By designing different shapes for the cam grooves 136, each setting element 124 can move in different axial directions and thereby granting different gear ratios.

In the first embodiment, the depth of the cam groove 136 of the setting element controller 130 is the same as the wall thickness of the hollowed tube 132; however, the depth of the cam groove 136 can also be configured to be smaller than the wall thickness of the hollowed tube 132.

Each planet gear sub-system 102 further includes an annular base 140. A circular wall structure is formed on the annular base 140 surrounding the setting element 124 and the planet gears 114, and is coaxially disposed with the first axis 104. A hole 142 is drilled on the annular base 140 corresponding to the axle 115 of the planet gear set 112 for fitting the axle 115. In the first embodiment, the inner end of the axle 115 (located inside the annular base 140) and the outer end (located outside the annular base 140) are installed with the planet gear 114 and the pulley 120 respectively. In this way, the planet gear 114 is located inside the annular base 140, and the pulley 120 is located outside the annular base 140. However, in the first embodiment, the annular base 140 of the first (the front) planet gear sub-system 102 is different from the annular base 140 of the last (the rear) planet gear sub-system 102. The details regarding this manner will be described later.

In the first embodiment, the annular bases 140 of the six planet gear sub-systems 102 of the multi-ratio transmission system 100 are interconnected with each other, therefore relative rotation and relative axial movements are not allowed. Each annular base 140 has two axial ends. The axial ends of the annular bases 140 abut against each other, so each annular base 140 cannot move in the axial direction of the first axis 104 separately. On the other hand, at least one axial groove 146 is formed on the outer side surface 144 of each annular base 140. The axial groove extends from an axial end to another axial end of the annular base 140 along the first axis 104. In the first embodiment, the outer side surface 144 of each annular base 140 has six axial grooves 146. In addition, six securing rods 148 are disposed along the first axis 104 in such way that a part of each securing rod 148 is tightly fitted inside the corresponding axial groove 146 of the annular base 140. In this way, the securing rods 148 penetrates through the axial grooves 146 of each annular base 140 along the first axis 104 so as to prevent relative rotation between the annular bases 140.

The multi-ratio transmission system 100 of the present invention further includes at least one annular gear 150 for engaging the planet gear 114 of one of the planet gear sub-systems 102. In the first embodiment, the multi-ratio transmission system 100 includes two annular gears 150. Each annular gear engages with the planet gear 114 of the first and the last planet gear sub-systems 102 respectively. In the first embodiment, the annular gear 150 is a crown gear. Teeth 152 are formed at one axial end of the annular gear 150, and the outer circumferential surface of the annular gear 150 is installed at an inner circumferential surface of a cylindrical casing 154. Any conventional methods can be used to install the annular gear 150 onto the cylindrical casing 154. In the first embodiment, an outer thread 156 is formed on the outer circumferential surface of the annular gear 150 for engaging an inner thread 158 formed on the inner circumferential surface of the cylindrical casing 154. In this way, the annular gear 150 is mounted securely onto the cylindrical casing 154. In the first embodiment, two annular gear 150 engage the planet gears 114 of the first and the last planet gear sub-systems 102, therefore, the inner thread 158 is formed at the two ends of the inner circumferential surface of the cylindrical casing 154 respectively for engaging the outer threads 156 of the two annular gear 150. Then, the rest of the planet gear sub-systems 102 are enclosed within the cylindrical casing 154.

According to the present invention, the planet gear set 112 of the first and the last planet gear sub-system 102 further includes a transmission gear 160. The transmission gear 160 is installed onto each axle 115 of the planet gear set 112, so that the transmission gear 160 is disposed coaxially with the axles 115 of the planet gears 114 (coaxial with the axis of the axle 115) and rotates in synchronization with the axles 115. Under this condition, the transmission gear 160 is engaged with the teeth 152 of the annular gear 150 to form the engagement relationship between the annular gear 150 and the planet gear sub-system 102.

Hence, in correspondence to the configuration of the transmission gear 160, the annular base of the first and the last planet gear sub-systems 102 are different from the annular base 140 of the rest of the planet gear sub-systems 102 in the first embodiment. For clarity, the annular bases of the first and the last planet gear sub-system 102 in the first embodiment are referred to as the "end annular base" in the following section, and is numbered as 140'. The rest of the annular bases 140 are referred to as the "midsection annular base". The end annular base 140' is formed with an inner circular wall 162 and an outer circular wall 164. The inner circular wall 162 is formed with an axial end and is formed corresponding to the circular wall structure of the midsection annular bases 140. The axial end of the end annular base 140' is abutted against the axial ends of the adjacent midsection annular base 140 as described above. The outer circular wall 164 coaxially surrounds the inner circular wall 162, and is connected to the inner circular wall 162 through a connecting portion 166 respectively at both ends. Similar to the midsection annular bases 140, a hole 142 is formed at each inner circular wall 162 of the end annular base 140' for fitting the axle 115 of the planet gear 114. Similarly, another hole 168 is also formed on the outer circular wall 164 for further fitting the axle 115. The transmission gear 160 connected to the axle 115 is located outside the outer circular wall 164 for engaging with the teeth 152 of the annular gear 150. In the first embodiment, two grooves 170 are formed at the connecting portion 166 of the end annular base 140' which is facing the midsection annular base 140. The two grooves 170 are the passage way for the belt 122 of the coupling assembly 118 of the planet gear sub-system 102, so the belt 122 passes through the two grooves 170 and are placed around the pulleys 120 of the adjacent planet gear sub-system 102. In addition, six securing holes 172 are formed on the connecting portion 166 for receiving and securing the end of the securing rods 148. In this way, the two end annular bases 140' are connected with the four midsection annular bases 140 to prevent relative movements or rotations.

The multi-ratio transmission system 100 of the present invention further includes a central axle 174. The central axle 174 is disposed coaxially with the first axis 104, and is inserted to a center through hole 176 of the hollowed tube 132 of the setting element controller 130 by relative rotation. The central axle 174 enables the hollowed tube 132 to rotate around the central axle 174, so when the rotation controller 133 rotates the hollowed tube 132 of the setting element controller 130 around the central axle 174, the setting element 124 moves in the axial direction on the outer circumferential surface 134 of the hollowed tube 132.

When in use, the two ends of the central axle 174 are secured onto the external securing portion respectively, so the rotation of the central axle 174 relative to the external securing portion is prevented. In the first embodiment, a flat surface 178 is formed at least one end of the central axle 174 for engaging with the external flat surface, thereby preventing rotation of the central axle 174.

According to the above configuration, the first (the front) planet gear sub-system 102 and the annular gear 150 of the multi-ratio transmission system 100 of the present invention can be configured to be the input end and the output end (or the other way around). The mid planet gear sub-systems 102 are placed in series along the first axis 104 to form a hybrid planet gear system for transmitting the torque or rotation between the input end and the output end, thereby providing different gear ratios between the input end and the output end. Meanwhile, the setting element controller 130 is available for controlling the engagement status of the setting element 124 of each planet gear sub-system 102, thereby changing the gear ratios.

Second Embodiment

In the following section, the multi-ratio transmission system with parallel vertical and coaxial planet gears 100 of the present invention will be explained as a transmission system of the bicycle.

Figure 8A:
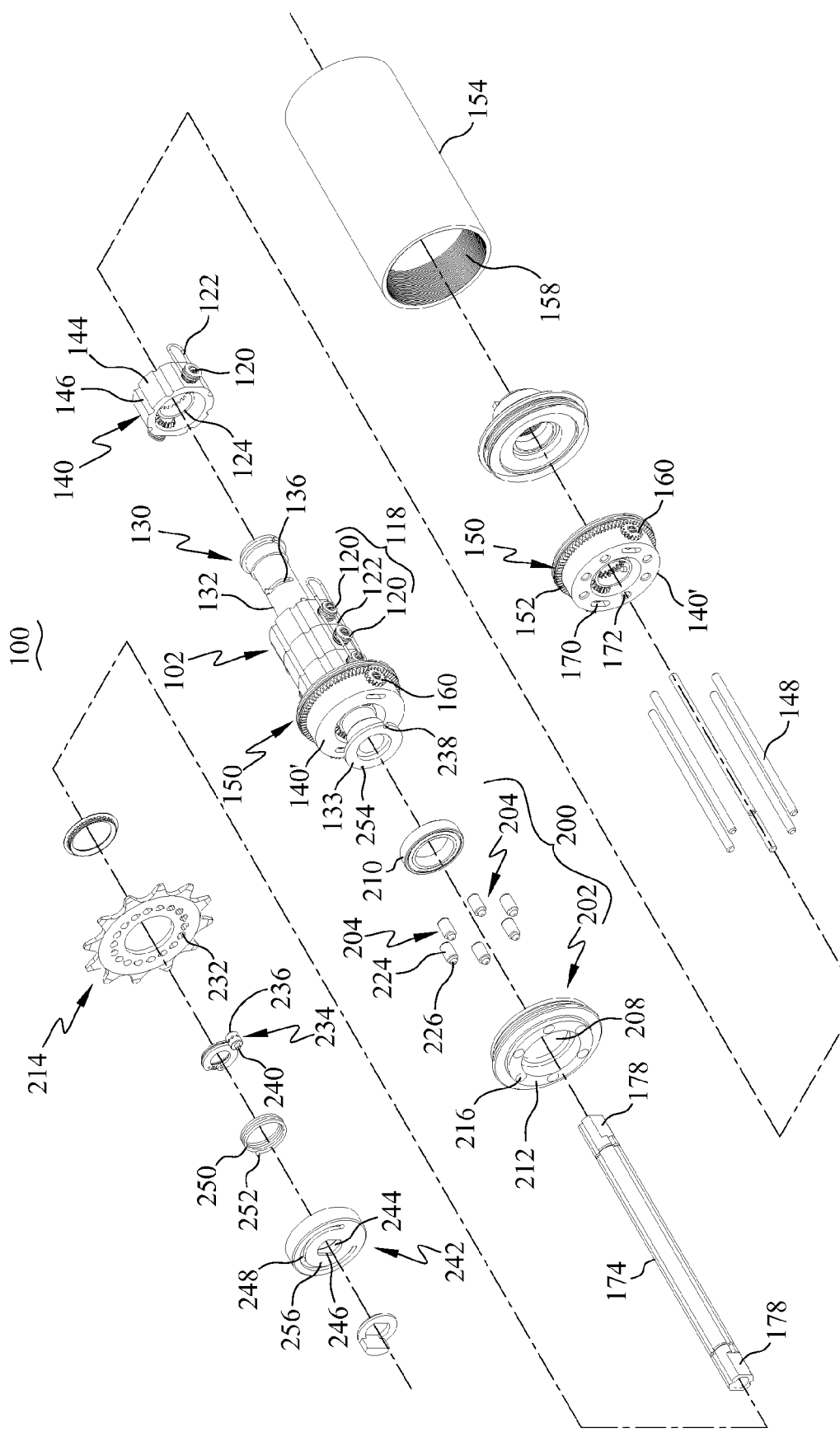
FIG. 8A is an exploded view of the second embodiment of the multi-ratio transmission system with parallel vertical and coaxial planet gears according to the present invention.
Figure 8B:
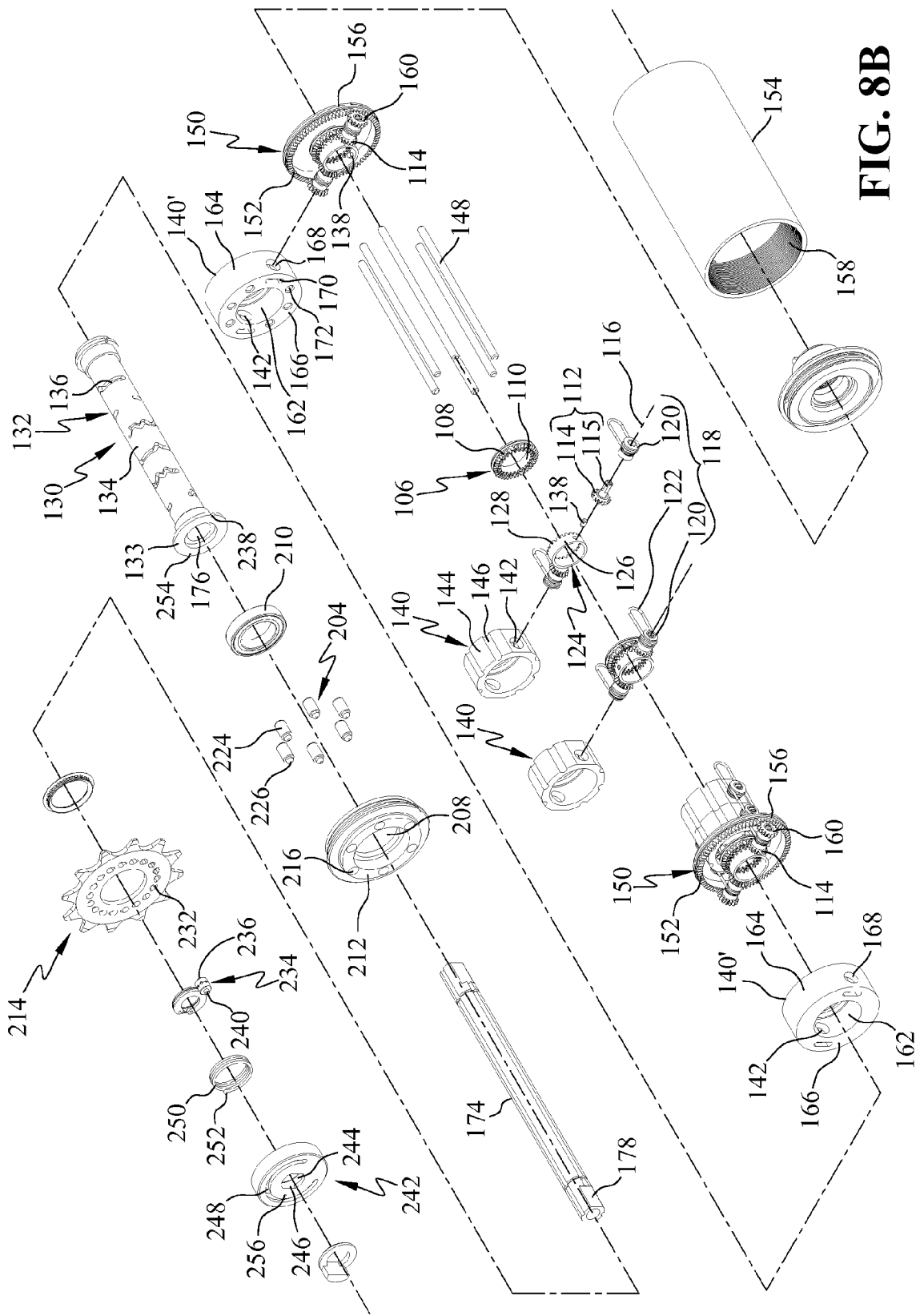
FIG. 8B is another exploded view of the second embodiment of the multi-ratio transmission system with parallel vertical and coaxial planet gears according to the present invention.
Figure 8C:
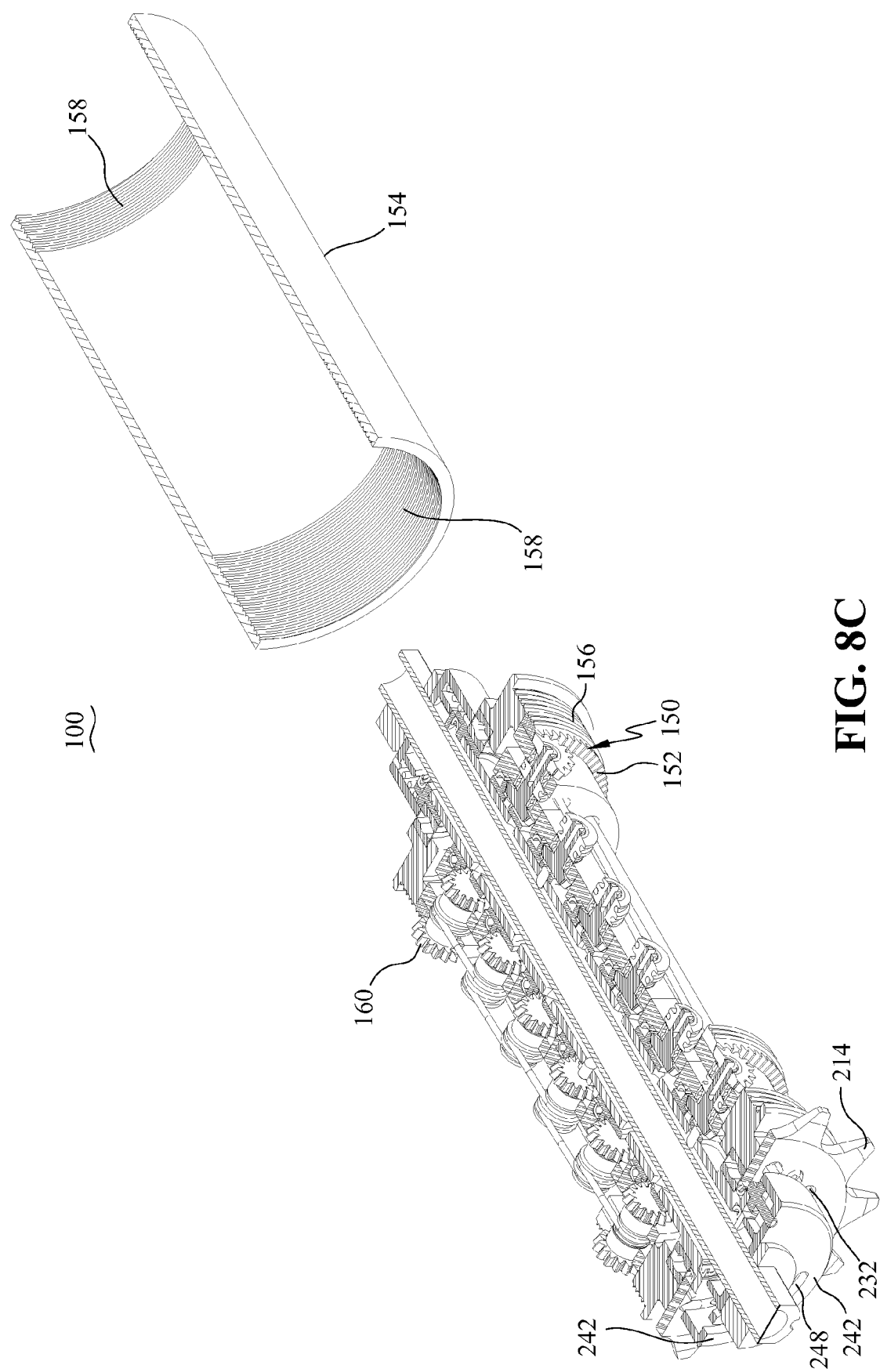
FIG. 8C is a perspective section view of the second embodiment of the multi-ratio transmission system with parallel vertical and coaxial planet gears according to the present invention, where the cylindrical casing is apart from the system.
Figure 9A:
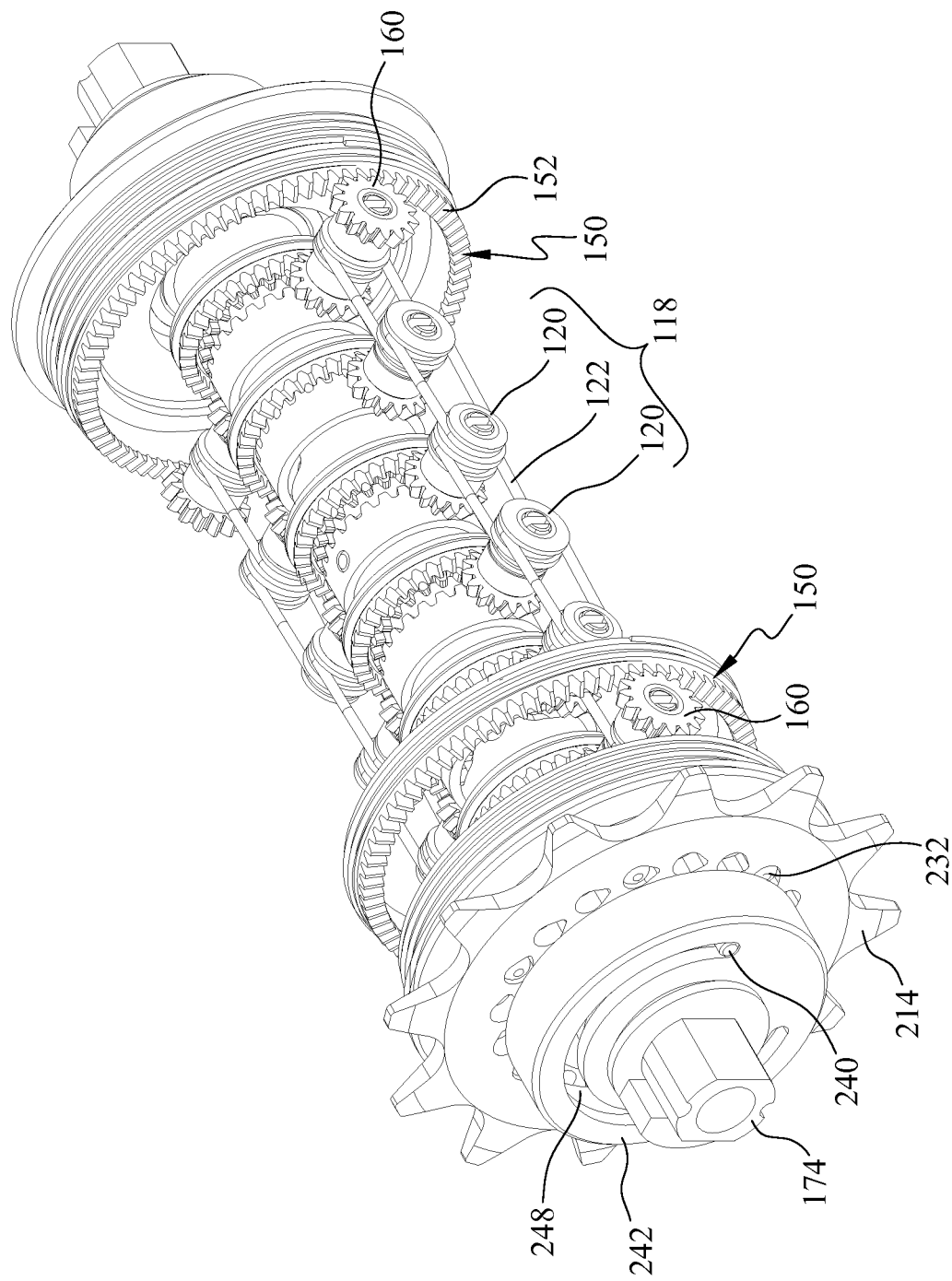
FIG. 9A is a perspective view of the second embodiment of the multi-ratio transmission system with parallel vertical and coaxial planet gears according to the present invention, where the cylindrical casing and the annular bases of each planet gear sub-systems are omitted for a better view of the internal structure.
Figure 9B:
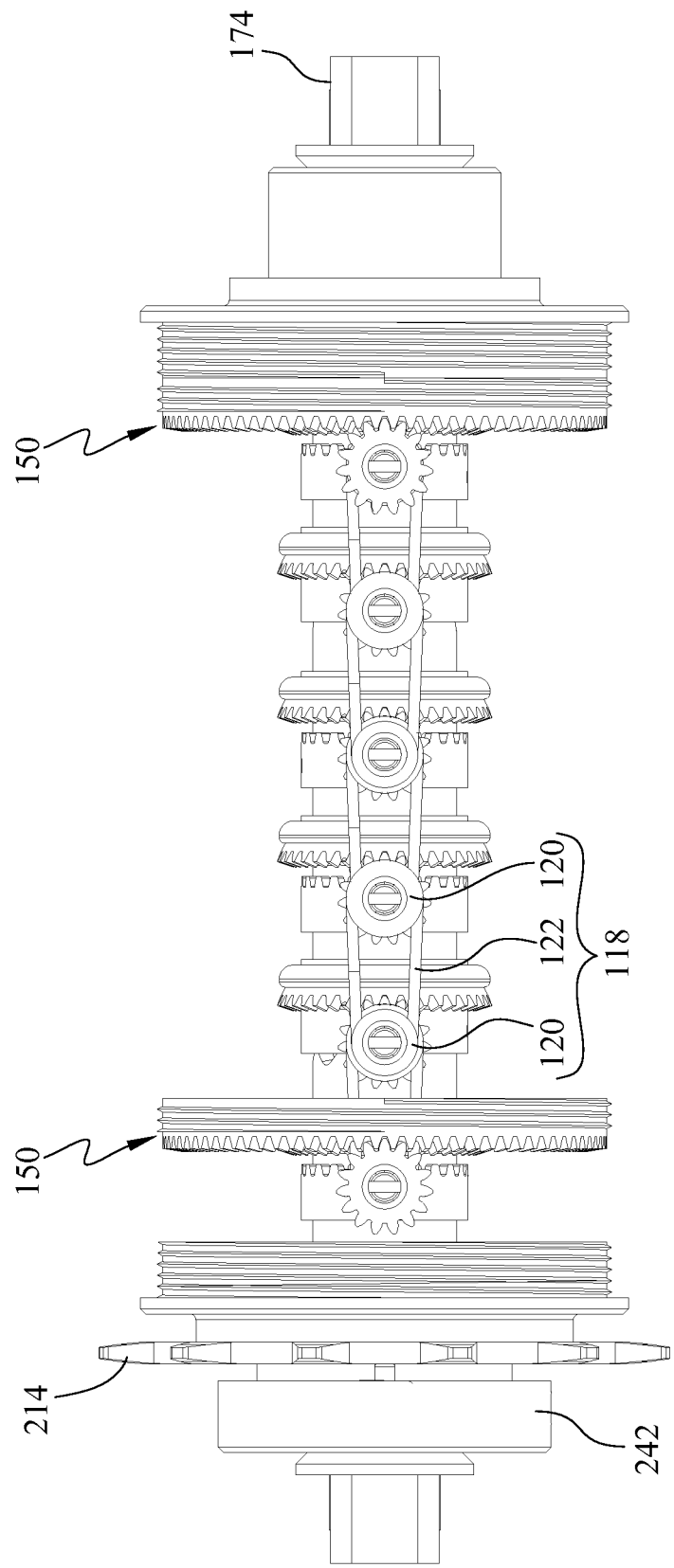
FIG. 9B is a side view of FIG. 9A.
Figure 9C:
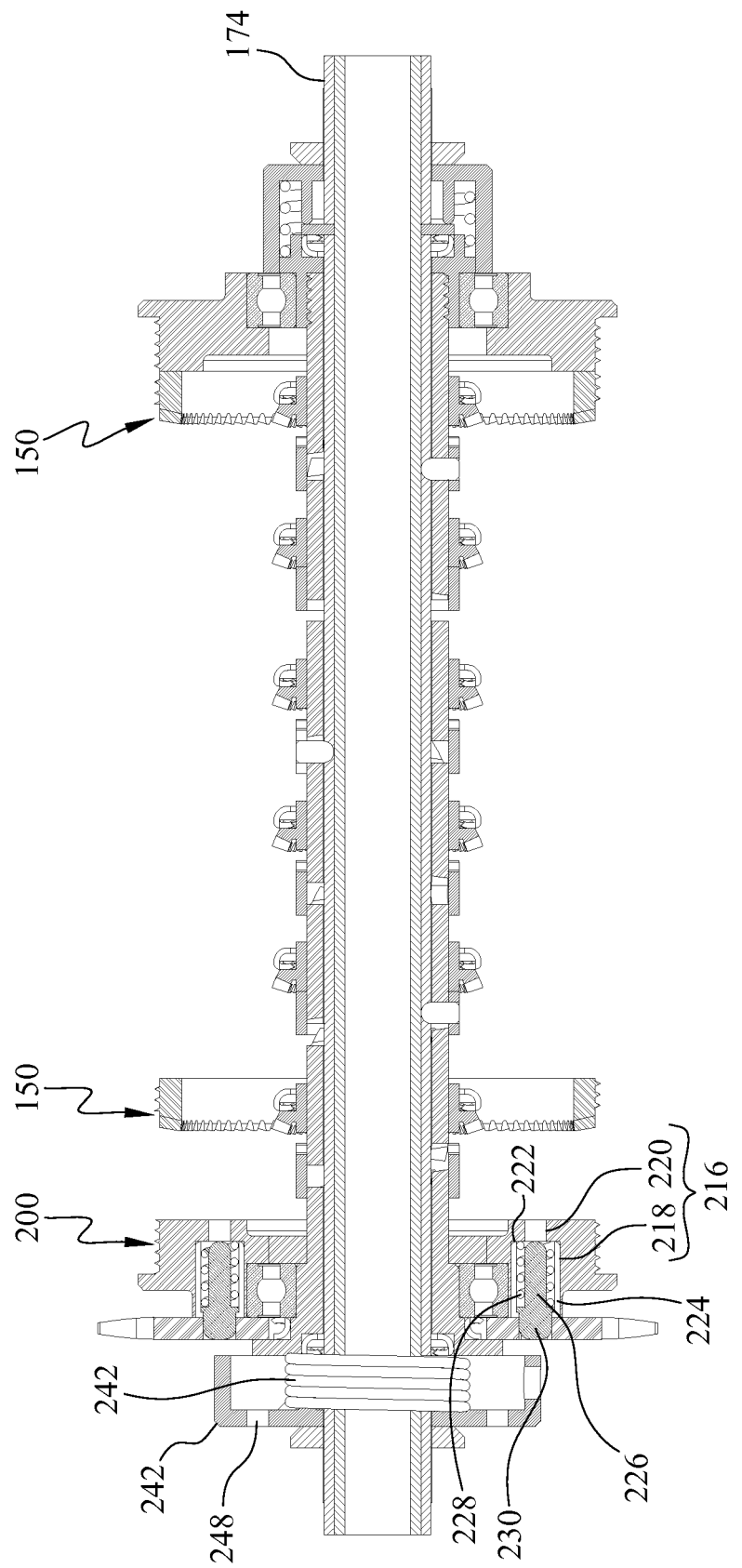
FIG. 9C is a sectional view of the second embodiment of the multi-ratio transmission system with parallel vertical and coaxial planet gears according to the present invention, where some components are omitted.

The multi-ratio transmission system 100 according to a second embodiment of the present invention will be further explained with reference to FIG. 7, FIG. 8A, FIG. 8B, FIG. 8C, FIG. 9A and FIG. 9B.

The multi-ratio transmission system 100 of the present invention includes multiple planet gear sub-systems. In the second embodiment, the multi-ratio transmission system 100 includes six planet gear sub-systems 102. The six planet gear sub-systems 102 are coaxially placed in series along a common axis, which is defined as a first axis 104. Each planet gear sub-system 102 includes a sun gear 106, which is configured to rotate around the first axis 104. The sun gear 106 includes an outer gear 108 and an inner gear 110, and the outer gear 108 and the inner gear 110 are connected coaxially relative to each other. The outer gear 108 is a bevel gear and is located at an outer side of the inner gear 110.

Each planet gear sub-system 102 further includes at least one planet gear set 112 having a planet gear 114. The planet gear 114 is a bevel gear, and is able to engage with the outer gear 108 of the sun gear 106. The planet gear 114 is disposed on an axle 115 so as to rotate around a second axis 116. The second axis 116 is perpendicular to the first axis 104, and is defined by the axis of the axle 115. Notably, the second axis 116 of the planet gear 114 in each planet gear sub-system 102 is perpendicular to the first axis 104, and is configured to be parallel with each other.

Considering the balance of the forces, each planet gear sub-system 102 includes two planet gears 114 in the second embodiment. The two planet gears 114 are configured to be opposite to each other, in other words, the two planet gears 114 are 180 degrees apart from each other. However, the number of the planet gears 114 is not limited by the second embodiment. If necessary, each planet gear sub-system 102 can include three or more planet gears 114 that are configured symmetrically about the axle (or not symmetrically about the axle).

A coupling assembly 118 is used to couple two adjacent planet gear sub-systems 102 together, so that the rotation of the planet gear 114 of the former planet gear sub-system 102 is transmitted to the planet gear 114 of the latter planet gear sub-system 102. In the second embodiment, the coupling assembly 118 includes two pulleys 120. Each pulley 120 is connected to the axles 115 of the planet gear sets 112 of the two adjacent planet gear sub-systems 102 so as to rotate in synchronization with the planet gears 114 of the planet gear sets 112. A belt 122 is trained around the two pulleys 120 to connect the two pulleys, so the rotation of the planet gear 114 of the former planet gear sub-system is transmitted through the axle 115 and the pulleys 120 to the planet gear 114 of the latter planet gear sub-system 102.

It is worth noting that except for the first (the front) and the last (the rear) planet gear sub-system 102, each axle 115 of the planet gear 114 in the rest of the planet gear sub-systems is installed with two pulleys 120. The two pulleys 120 installed on the axle 115 are connected to the pulley 120 of the former planet gear sub-systems 102 and to the pulley 120 of the latter planet gear sub-systems 102 with two belts 122. In the following description, the first planet gear planet gear sub-system 102 is referred to the first planet gear sub-system 102 connected adjacently to a sprocket 214 (please refer to the following description). The last planet gear subsystem 102 is referred to the very last planet gear sub-system 102 in the series of planet gear sub-systems 102 relative to the first planet gear sub-system 102.

In addition, each planet gear sub-system 102 further includes a setting element 124. The setting element 124 is able to optionally move along the first axis 104 so as to engage and secure the sun gear 106 of the planet gear sub-system 102, or disengage from the sun gear 106 of the planet gear sub-system 102. In the second embodiment, the setting element 124 is a crown gear and has a hollowed cylinder 126. The setting element 124 is disposed coaxially with the sun gear 106, and is able to move along the first axis 104 corresponding to the sun gear 106. Teeth 128 are formed at an end of the hollowed cylinder 126 of the setting element 124 facing the inner gear 110 of the sun gear 106. When the setting element 124 moves toward the sun gear 106, the teeth 128 engage the inner gear 110 of the sun gear 106, thereby securing the sun gear 106. When the setting element 124 moves away from the sun gear 106, the teeth 128 of the setting element 124 disengaged from the inner gear 110, thereby releasing the sun gear 106 for free rotation. With the configuration described above, different gear ratios are provided based on the engagement statuses of the sun gears 106 of the planet gear sub-systems 102.

The multi-ratio transmission system 100 of the present invention further includes a setting element controller 130. The setting element controller 130 is connected to the setting element 124 of each planet gear sub-system 102, so as to enable the setting element 124 to engage with the sun gear 106 or to disengage from the sun gear 106. In the second embodiment, the setting element controller 130 includes a hollowed tube 132. The hollowed tube 132 is disposed coaxially with the first axis 104, and is able to rotate around the first axis 104 in a range of predetermined angles. The hollowed tube 132 has two ends. At least one end of the hollowed tube 132 is installed with a rotation controller 133 for optionally rotating the hollowed tube 132 within the range of predetermined angles. The hollowed tube 132 has an outer circumferential surface 134, where multiple cam grooves 136 are formed generally in the circumferential direction. In the second embodiment, six cam grooves 136 are formed corresponding to the setting elements 124 of the six planet gear sub-systems 102. The hollowed cylinder 126 of each setting element 124 has an inner circumferential surface (not numbered). A control pin 138 is installed on the inner circumferential surface in such way that the free end of the control pin 138 is inserted into the corresponding cam groove 136, so the control pin 138 moves along the cam groove 136 on the outer circumferential surface 134 in the circumferential direction. Hence, when the rotation controller 133 rotates the hollowed tube 132 of the setting element controller 130 in the range of predetermined angles, the setting elements 124 of all six planet gear sub-systems 102 move in the axial direction along the first axis 104 corresponding to the cam grooves 136 due to the control pins 138 inserted in the cam grooves 136. In this way, the setting elements 124 move closer to or away from the sun gears 106, and thereby engaging with or disengaging from the corresponding sun gears 106. By designing different shapes for different cam grooves 136, each setting element 124 can move in different axial directions and thereby granting different gear ratios.

In the second embodiment, the depth of the cam groove 136 of the setting element controller 130 is the same as the wall thickness of the hollowed tube 132; however, the depth of the cam groove 136 can also be configured to be smaller than the wall thickness of the hollowed tube 132.

Each planet gear sub-system 102 further includes an annular base 140. A circular wall structure is formed on the annular base 140 surrounding the setting element 124 and the planet gears 114, and is coaxially disposed with the first axis 104. A hole 142 is drilled on the annular base 140 corresponding to the axle 115 of the planet gear set 112 for fitting the axle 115. In the second embodiment, the inner end of the axle 115 (located inside the annular base 140) and the outer end (located outside the annular base 140) are installed with the planet gear 114 and the pulley 120 respectively. In this way, the planet gear 114 is located inside the annular base 140, and the pulley 120 is located outside the annular base 140.

In the second embodiment, the annular bases 140 of the first (the front) and the last (the rear) planet gear sub-systems 102 are different from the annular bases of the rest of the planet gear sub-systems 102. For clarity, the annular bases of the first and the last planet gear sub-system 102 in the second embodiment are referred to as the "end annular base" in the following section, and is numbered as 140'. The rest of the annular bases 140 are referred to as the "midsection annular base". The end annular base 140' is formed with an inner circular wall 162 and an outer circular wall 164. The inner circular wall 162 is formed with an axial end and is formed corresponding to the circular wall structure of the midsection annular bases 140. The outer circular wall 164 coaxially surrounds the inner circular wall 162, and is connected to the inner circular wall 162 through a connecting portion 166 respectively at both ends. Similar to the midsection annular bases 140, a hole 142 is formed at each inner circular wall 162 of the end annular base 140' for fitting the axle 115 of the planet gear 114. Similarly, another hole 168 is also formed on the outer circular wall 164 for further fitting the axle 115. The transmission gear 160 connected to the axle 115 is located outside the outer circular wall 164 for engaging with the teeth 152 of the annular gear 150 (details of which will be further described later).

In the second embodiment, the annular bases 140 of the six planet gear sub-systems 102 of the multi-ratio transmission system 100 are interconnected with one another, therefore relative rotation and relative axial movements are not allowed. Each midsection annular base 140 has axial ends. The axial ends of the midsection annular bases 140 abut against one another, and an axial end of each end annular base 140' abuts against the axial end of the adjacent midsection annular base 140, so each annular base 140 cannot move in the axial direction of the first axis 104 separately. On the other hand, at least one axial groove 146 is formed on the outer side surface 144 of each midsection annular base 140. The axial groove extends from an axial end to another axial end of the annular base 140 along the first axis 104. In the second embodiment, the outer side surface 144 of each midsection annular base 140 has six axial grooves 146. In addition, six securing rods 148 are disposed along the first axis 104 in such way that a part of each securing rod 148 is tightly fitted inside the corresponding axial groove 146 of the midsection annular base 140. In this way, the securing rods 148 penetrates through the axial grooves 146 of each midsection annular base 140 along the first axis 104, so as to prevent relative rotation between the midsection annular bases 140.

In the second embodiment, two grooves 170 are formed at the connecting portion 166 of the end annular base 140' facing the midsection annular base 140. The two grooves 170 are the passage way for the belt 122 of the coupling assembly 118 of the planet gear sub-system 102, so the belt 122 passes through the two grooves 170 and is trained around the pulleys 120 of the adjacent planet gear sub-system 102. In addition, six securing holes 172 are formed on the connecting portion 166 for receiving and securing the end of the securing rods 148. In this way, the two end annular bases 140' are connected to the four midsection annular bases 140 to prevent relative movements or rotations.

The multi-ratio transmission system 100 of the present invention further includes at least one annular gear 150 for engaging with the planet gear 114 of one of the planet gear sub-systems 102. In the second embodiment, the multi-ratio transmission system 100 includes two annular gears 150, each annular gear is engaged with the planet gear 114 the first and the last planet gear sub-systems respectively. In the second embodiment, the annular gear 150 is a crown gear. Teeth 152 are formed at one axial end of the annular gear 150 for engaging with the corresponding planet gears 114, and the outer circumferential surface of the annular gear 150 corresponding to the first planet gear sub-system 102 is installed at an inner circumferential surface of a cylindrical casing 154. Any conventional methods can be used to install the annular gear 150 onto the cylindrical casing 154. In the second embodiment, an outer thread 156 is formed on the outer circumferential surface of the annular gear 150 for engaging with an inner thread 158 formed on the inner circumferential surface of the cylindrical casing 154. In this way, the annular gear 150 is mounted securely onto the cylindrical casing 154. In the second embodiment, two annular gears 150 engage with the planet gears 114 of the first and the last planet gear sub-systems 102, therefore, the inner thread 158 is formed at the two ends of the inner circumferential surface of the cylindrical casing 154 respectively for engaging with the outer threads 156 of the two annular gears 150. Then, the rest of the planet gear sub-systems 102 are enclosed within the cylindrical casing 154.

According to the present invention, the planet gear set 112 of the first and the last planet gear sub-system 102 further includes a transmission gear 160. The transmission gear 160 is installed onto each axle 115 of the planet gear set 112, so that the transmission gear 160 is disposed coaxially with the axles 115 of the planet gears 114 (coaxial with the axis of the axle 115) and rotates in synchronization with the axles 115. The transmission gear 160 is engaged with the teeth 152 of the annular gear 150 to form the engagement relationship between the annular gear 150 and the planet gear sub-system 102.

The multi-ratio transmission system 100 of the present invention further includes a central axle 174. The central axle 174 is disposed coaxially with the first axis 104, and is inserted to a center through hole 176 of the hollowed tube 132 of the setting element controller 130 by relative rotation. The central axle 174 enables the hollowed tube 132 to rotate around the central axle 174, so when the rotation controller 133 rotates the hollowed tube 132 of the setting element controller 130 around the central axle 174, the setting element 124 moves in the axial direction on the outer circumferential surface 134 of the hollowed tube 132.

In the second embodiment, the two ends of the central axle 174 are secured to the bicycle rack respectively, so the central axle 174 is mounted to the bicycle rack and is prevented from relative motion or rotation. In the second embodiment, two flat surfaces 178 are formed opposite to each other at each end of the central axle 174. The flat surfaces 178 can engage with the external flat surfaces to prevent the rotation of the central axle 174. In addition, the flat surfaces 178 also provide the space for other components to mount onto the central axle 174.

In the second embodiment, the multi-ratio transmission system further includes a one-way clutch 200. The one-way clutch 200 is installed onto the cylindrical casing 154 and is located outside of the first planet gear sub-system 102. The one-way clutch 200 includes a clutch casing 202 and multiple pin sets 204. The clutch casing 202 is roughly a cylindrical component having an inner axial end (not numbered) and an outer axial end (not numbered). The inner axial end is inserted into the cylindrical casing 154, and the outer axial end is located outside the cylindrical casing 154. The cylindrical component of the clutch casing 202 has a side circumferential surface (not numbered). The outer diameter of the side circumferential surface is roughly equal to the inner diameter of the cylindrical casing 154, so that the clutch casing 202 can be inserted into the cylindrical casing 154. In addition, an outer thread 206 is formed on the side circumferential surface for engaging with the inner thread formed on the inner circumferential surface of the cylindrical casing 154. In this way, the one-way clutch 200 can be installed inside the cylindrical casing 154. The inner thread formed on the inner circumferential surface of the cylindrical casing 154 for securing the clutch casing 202 can be formed together with the inner thread 158 for securing the annular gear 150, as shown in the figures illustrating the second embodiment. Alternatively, the two inner threads can also be formed separately.

A through hole 208 is formed in the center of the clutch casing 202, and is configured to be coaxial with the first axis 104. The rotation controller 133 of the setting element controller 130 is rotatably fitted and supported in the through hole 208. The cross-section shape of the through hole 208 is formed corresponding to the rotation controller 133 and the shape of the hollowed tube 132 installed on the rotation controller 133. This belongs to the common means of those who skilled in the art, therefore it is not described in detail herein. A fact worth mentioning is that, a bearing 210 or other components with similar functions is disposed between the rotation controller 133 and the through hole 208 for steadily and rotatably supporting the rotation controller 133 of the setting element controller 130 and the hollowed tube 132.

An annular protrusion 212 is formed on the outer axial end of the clutch casing 202, and is formed coaxially with and surrounding the through hole 208 for coaxially supporting a sprocket 214. Multiple pin-fitting holes 216 are formed on the annular protrusion 212. In the second embodiment, six pin-fitting holes 216 are formed on the annular protrusions 212, but the number of the pin-fitting holes 216 can be adjusted according to different needs. Preferably, the pin-fitting holes 216 are formed on the annular protrusion 212 in the circumferential direction with the same angular interval between every two adjacent pin-fitting holes 216. Each pin-fitting hole 216 is formed with a first section 218 and a second section 220, in which the first section 218 has a larger diameter than the second section 220. A shoulder portion 222 is formed between the first section 218 and the second section 220. A pin set 204 is fitted inside each pin-fitting hole 216.

Each pin set 204 includes a housing 224 which is shaped as a hollowed cylinder and a pin 226 which is movably placed inside the housing 224. A spring 228 is placed between the housing 224 and the pin 226 in such a manner that its inner end abuts against the shoulder portion 222 and its outer end abuts against a flange of the pin 226. With the flexibility of the spring 228, the spring 228 pushes the outer end 230 of the pin 226 outside the housing 224, and further engages the outer end 230 of the pin 226 with the engaging holes 232 formed on the sprocket 214. In this way, the one-way clutch 200 engages the sprocket 214 to rotate together with the sprocket 214.

With the flexibility of the spring 228, the pin 226 retracts back into the casing 224 when the outer end 230 of the pin 226 is under internal stress. Under this condition, the inner end of the pin 226 is fitted inside the second section 220 of the pin-fitting hole 216 of the housing 224, thereby avoiding interferences between the components.

Multiple engaging holes 232 are formed on the sprockets 214. The engaging holes 232 are distributed along a circle, which is coaxial with the first axis 104, with equal angular intervals between every two adjacent engaging holes 232. Each engaging hole 232 has a front end and a back end (both not numbered) in the circumferential direction. The back end has a flat surface, which abuts against the outer end 230 of the pin 226, for transmitting the force. When the sprocket 214 rotates forward, the back ends of the engaging holes 232 also rotate forward with the pins 226, thereby transmitting the torque and the rotation motion to the multi-ratio transmission system 100 of the present invention. On the other hand, the front end of the engaging hole 232 is an oblique surface, which serves as a cam. The front end of the engaging hole 232 can guide the outer end 230 of the pin 226 to the outside of the engaging hole 232 when it comes into contact with the outer end 230 of the pin 226. Hence, when the sprockets 214 rotates backward, the pin 226 would not transmit the torque and the rotation motion to the multi-ratio transmission system 100 of the present invention due to the oblique surface of the front end of the engaging hole 232. In this way, the one-way clutch 200 is only able to transmit the torque and rotation motion in one direction.

In the second embodiment, the multi-ratio transmission system 100 of the present invention further includes a shift cable connector 234. The shift cable connector has an inner axial pin 236 for inserting into and connecting with a connecting hole 238 of the rotation controller 133 of the setting element controller 130. The connecting hole 238 is formed eccentrically to the first axis 104, in this way, the shift cable connector 234 can rotate the connecting hole 238 around the first axis 104, and further drives the hollowed tube 132 of the rotation controller 133 to rotate around the first axis 104, thereby shifting between different gear ratios.

A shift cable (not shown) can be installed onto the shift cable connector 234. The shift cable can be the shift cable commonly seen on any bicycles, which is connected with a lever installed on the bicycle. When the user shifts the lever, the shift cable is then pulled by the lever and further rotates the setting element controller 130 through the shift cable connector 234.

In addition, an outer axial pin 240 is disposed on the shift cable connector 234 opposite to the inner axial pin 236.

A shift-guiding component 242 is inserted and connected to the central axle 174. Especially, an insertion hole 244 is formed at the center of the shift-guiding component 242, in which the two sides of the insertion hole 244 are formed as two flat walls 246 for abutting against the flat surfaces 178 of the central axle 174, so as to prevent relative rotation between the two. In addition, a circular guiding groove 248 is formed coaxially with the first axis 104 on the shift-guiding component 242. The circular guiding groove 248 extends in a range of angles along the circumferential direction, in which the range of angles is corresponded to the range of predetermined angles for the rotation of the hollowed tube 132 of the setting element controller 130.

The outer axial pin 240 of the shift cable connector 234 is inserted into the circular guiding groove 248 to move along the circular guiding groove 248. When the user pulls the shift cable connector 234 through the shift cable, the outer axial pin 240 moves along the circular guiding groove 248, thereby achieving the shifting between different gear ratios. Herein, a fact worth mentioning is that the two ends of the circular guiding groove 248 serve as the stopper of the outer axial pin 240 to prevent the outer axial pin 240 from moving out of range.

A restoring spring 250 is disposed between the shift-guiding component 242 and the rotation controller 133 of the setting element controller 130. The restoring spring 250 provides the restoring force of the setting element controller 130 after the gear shifting, in which the setting element controller 130 is pulled by the shift cable. In the second embodiment, the restoring spring 250 has two side ends 252, which are inserted into the insertion hole 254 formed on the rotation controller 133 and the insertion hole 256 formed on the shift-guiding component 242 respectively.

Third Embodiment

In the following paragraphs, the multi-ratio transmission system with parallel vertical and coaxial planet gears 100 of the present invention will be explained as a transmission system of the bicycle according to a third embodiment.

Figure 10:
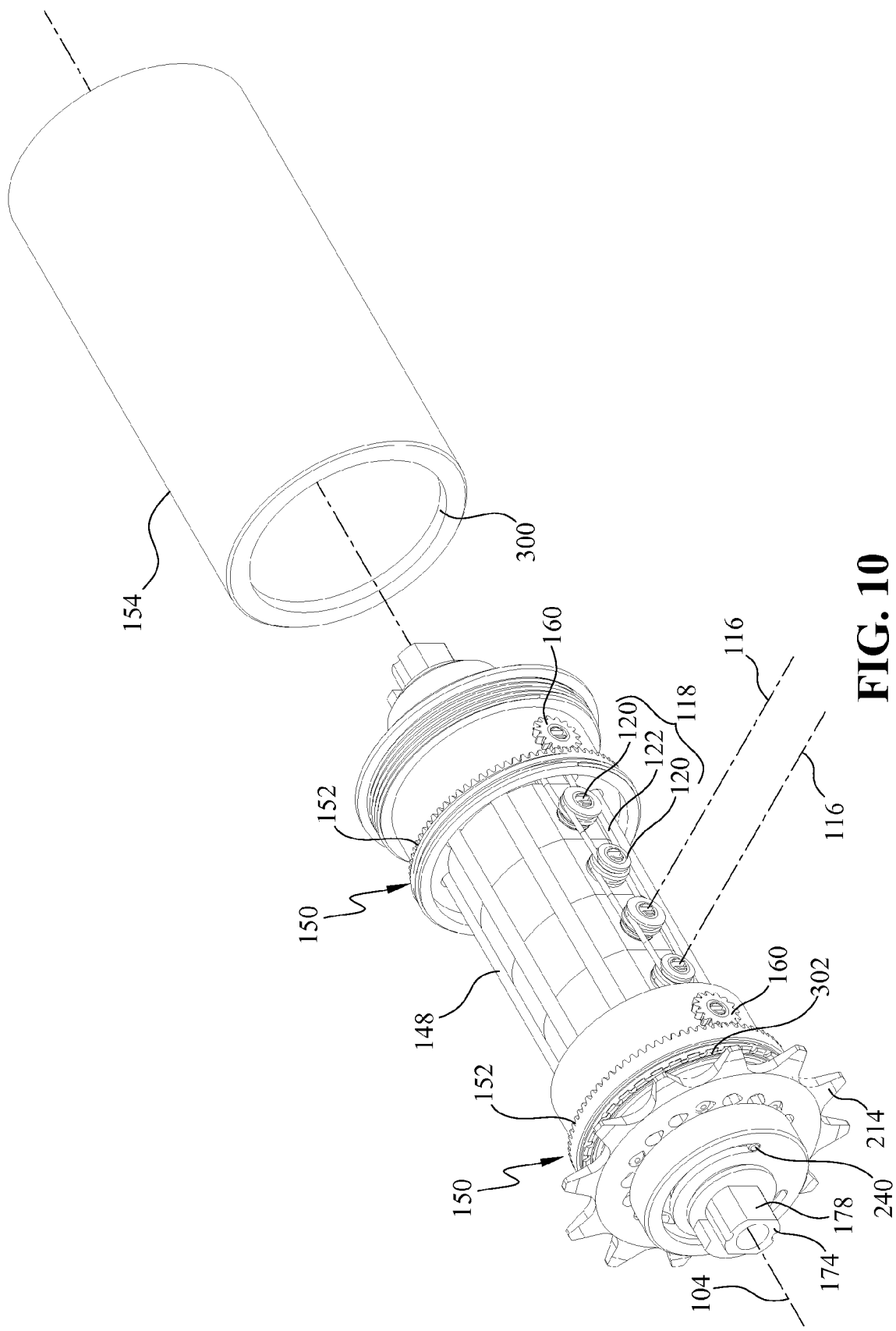
FIG. 10 is a perspective view of the third embodiment of the multi-ratio transmission system with parallel vertical and coaxial planet gears according to the present invention.
Figure 11A:
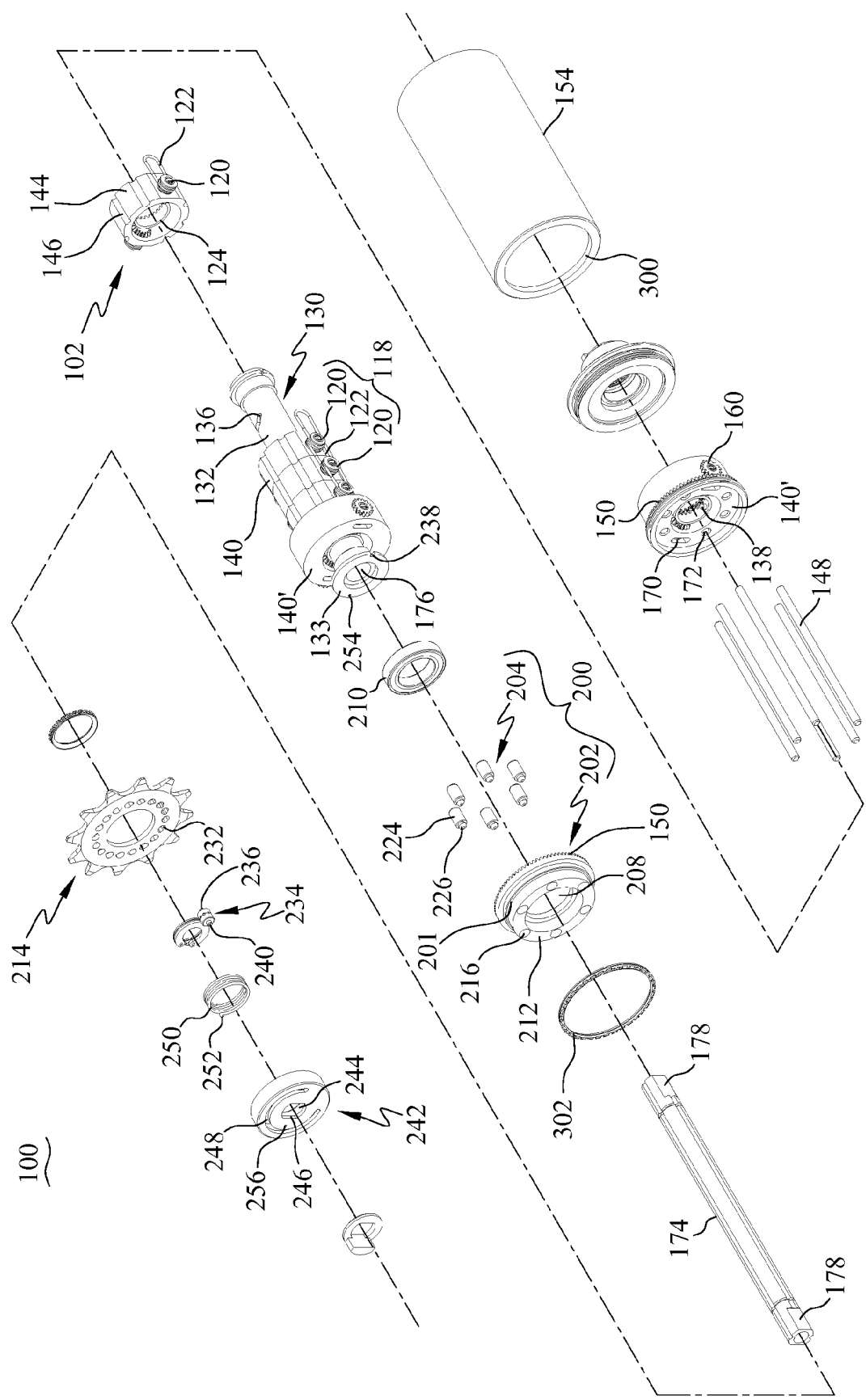
FIG. 11A is an exploded view of the third embodiment of the multi-ratio transmission system with parallel vertical and coaxial planet gears according to the present invention.
Figure 11B:
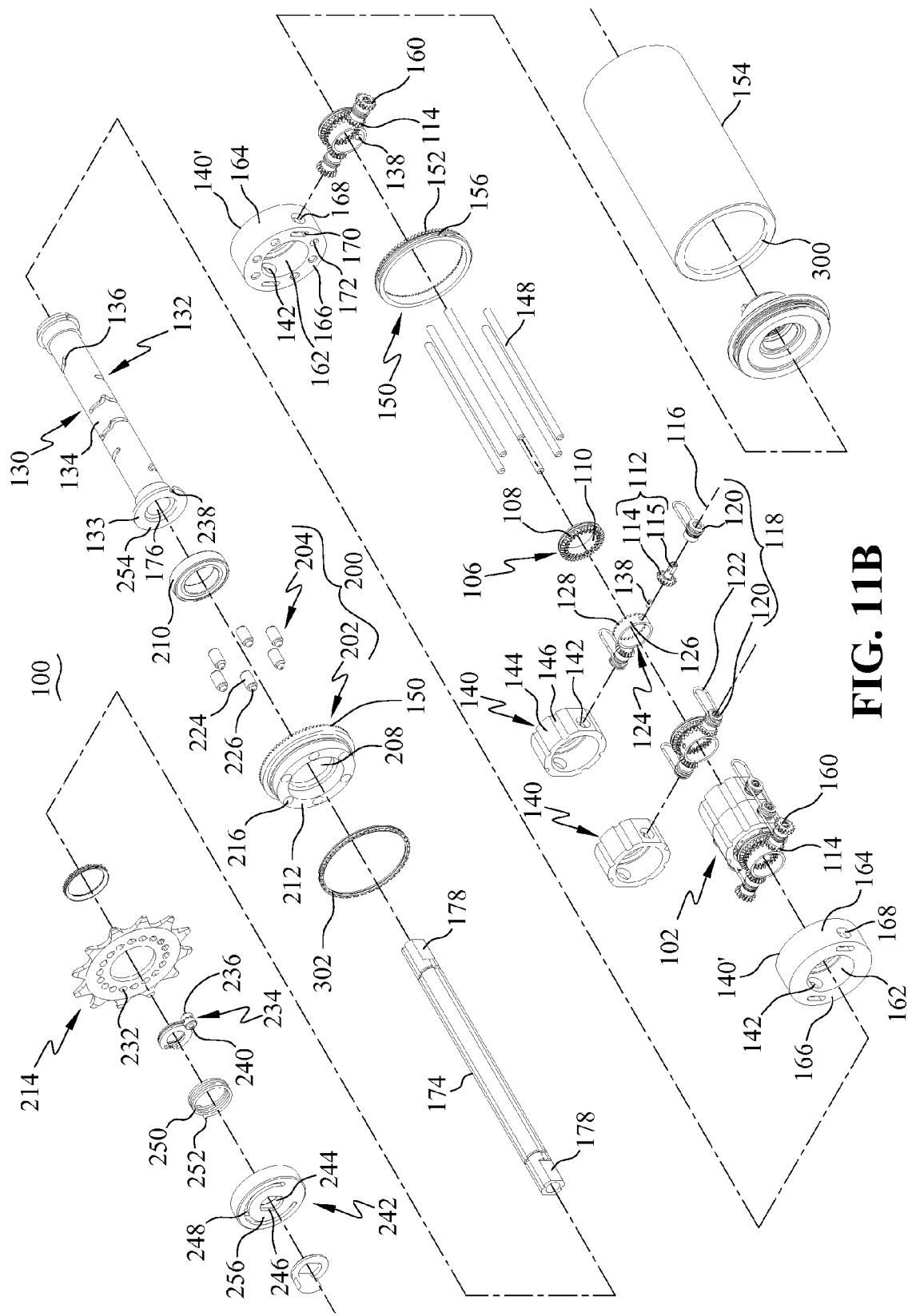
FIG. 11B is another exploded view of the third embodiment of the multi-ratio transmission system with parallel vertical and coaxial planet gears according to the present invention.
Figure 12A:
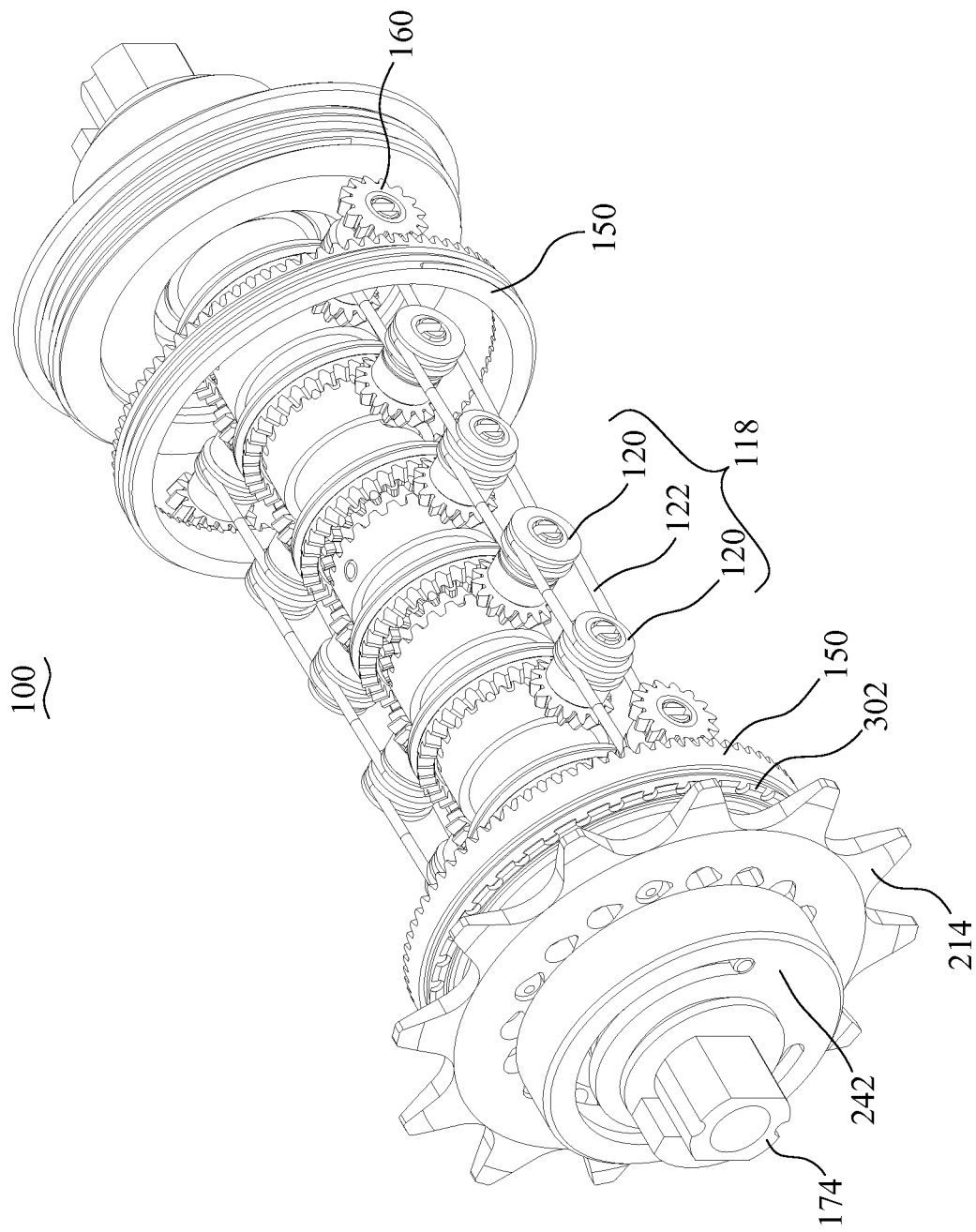
FIG. 12A is a perspective view of the third embodiment of the multi-ratio transmission system with parallel vertical and coaxial planet gears according to the present invention, where the cylindrical casing and the annular bases of each planet gear sub-systems are omitted for a better view of the internal structure.
Figure 12B:
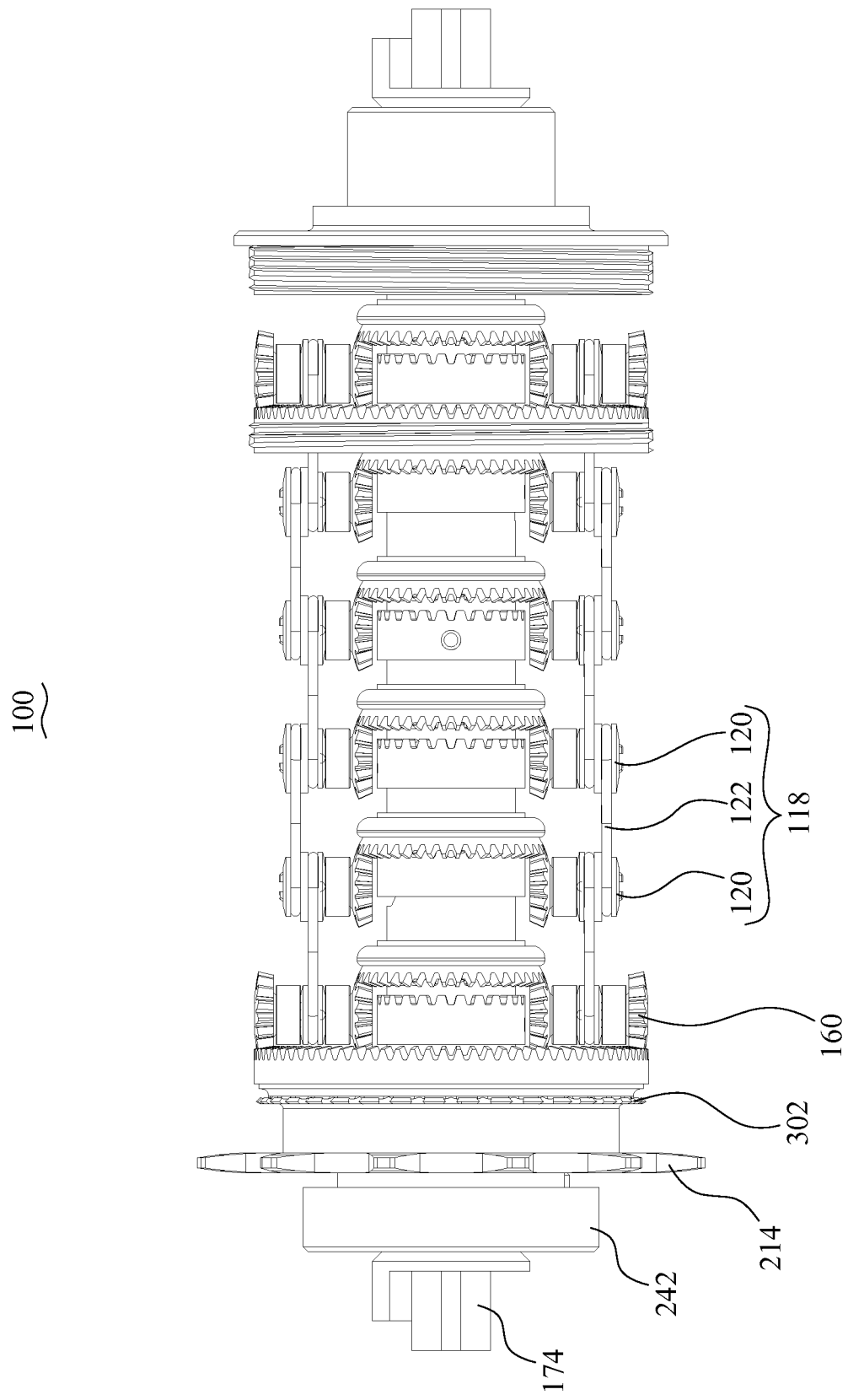
FIG. 12B is a side view of FIG. 12A.

The multi-ratio transmission system 100 according to the third embodiment of the present invention will be further explained with reference to FIG. 10, FIG. 11A, FIG. 11B, FIG. 11C, FIG. 12A and FIG. 12B.

The multi-ratio transmission system 100 of the present invention includes multiple planet gear sub-systems 102. In the third embodiment, the multi-ratio transmission system 100 includes six planet gear sub-systems 102. The six planet gear sub-systems 102 are coaxially placed in series along a common axis, which is defined as a first axis 104. Each planet gear sub-system 102 includes a sun gear 106, which is configured to rotate around the first axis 104. The sun gear 106 includes an outer gear 108 and an inner gear 110, and the outer gear 108 and the inner gear 110 are connected coaxially relative to each other. The outer gear 108 is a bevel gear and is located at an outer side of the inner gear 110.

Each planet gear sub-system 102 further includes at least one planet gear set 112 having a planet gear 114. The planet gear 114 is a bevel gear, and is able to engage with the outer gear 108 of the sun gear 106. The planet gear 114 is disposed on an axle 115 so as to rotate around a second axis 116. The second axis 116 is perpendicular to the first axis 104, and is defined by the axis of the axle 115. Notably, the second axis 116 of the planet gear 114 in each planet gear sub-system 102 is perpendicular to the first axis 104, and is configured to be parallel with each other.

Considering the balance of the forces, each planet gear sub-system 102 includes two planet gears 114 in the third embodiment. The two planet gears 114 are configured to be opposite to each other, in other words, the two planet gears 114 are 180 degrees apart from each other. However, the number of the planet gears 114 is not limited by the third embodiment. If necessary, each planet gear sub-system 102 includes three or more planet gears 114 that are configured symmetrically about the axle (or not symmetrically about the axle).

A coupling assembly 118 is used to couple two adjacent planet gear sub-systems 102 together, so that the rotation of the planet gear 114 of the former planet gear sub-system 102 is transmitted to the planet gear 114 of the latter planet gear sub-system 102. In the third embodiment, the coupling assembly 118 includes two pulleys 120. Each pulley 120 is connected to the axles 115 of the planet gear sets 112 of the two adjacent planet gear sub-systems 102 so as to rotate in synchronization with the planet gears 114 of the planet gear sets 112. A belt 122 is trained around the two pulleys 120 to connect the two pulleys, so that the rotation of the planet gear 114 of the former planet gear sub-system is transmitted through the axle 115 and the pulleys 120 to the planet gear 114 of the latter planet gear sub-system 102.

It is worth noting that except for the first (the front) and the last (the rear) planet gear sub-system 102, each axle 115 of the planet gear 114 in the rest of the planet gear sub-systems 102 is installed with two pulleys 120. The two pulleys 120 installed on the axle 115 are connected to the pulley 120 of the former planet gear sub-systems 102 and to the pulley 120 of the latter planet gear sub-systems 102 via two belts 122. In the following description, the first planet gear planet sub-system 102 is referred to the first planet gear sub-system 102 connected adjacently to a sprocket 214 (please refer to the following description). The last planet gear subsystem 102 is referred to the very last planet gear sub-system 102 in the series of planet gear sub-systems 102 relative to the first planet gear sub-system 102.

In addition, each planet gear sub-system 102 further includes a setting element 124. The setting element 124 is able to optionally move along the first axis 104 so as to engage and secure the sun gear 106 of the planet gear sub-system 102, or disengage from and release the sun gear 106 of the planet gear sub-system 102. In the third embodiment, the setting element 124 is a crown gear and has a hollowed cylinder 126. The setting element 124 is disposed coaxially with the sun gear 106, and is able to move along the first axis 104 corresponding to the sun gear 106. Teeth 128 are formed at an end of the hollowed cylinder 126 of the setting element 124 facing the inner gear 110 of the sun gear 106. When the setting element 124 moves toward the sun gear 106, the teeth 128 engage with the inner gear 110 of the sun gear 106, thereby securing the sun gear 106. When the setting element 124 moves away from the sun gear 106, the teeth 128 of the setting element 124 disengage from the inner gear 110, thereby releasing the sun gear 106 for free rotation. With the configuration described above, different gear ratios are provided based on the engagement statuses of the sun gears 106 of the planet gear sub-systems 102.

The multi-ratio transmission system 100 of the present invention further includes a setting element controller 130. The setting element controller 130 is connected to the setting element 124 of each planet gear sub-system 102 so as to enable the setting element 124 to engage the sun gear 106 or disengage from the sun gear 106. In the third embodiment, the setting element controller 130 includes a hollowed tube 132. The hollowed tube 132 is disposed coaxially with the first axis 104, and is able to rotate around the first axis 104 in a range of predetermined angles. The hollowed tube 132 has two ends. At least one end of the hollowed tube 132 is installed with a rotation controller 133 for optionally rotating the hollowed tube 132 within the range of predetermined angles. The hollowed tube 132 has an outer circumferential surface 134, where multiple cam grooves 136 are formed generally in the circumferential direction. In the third embodiment, six cam grooves 136 are formed corresponding to the setting elements 124 of the six planet gear sub-systems 102. The hollowed cylinder 126 of each setting element 124 has an inner circumferential surface (not numbered). A control pin 138 is installed on the inner circumferential surface in such way that the free end of the control pin 138 is inserted into the corresponding cam groove 136, so that the control pin 138 moves along the cam groove 136 on the outer circumferential surface 134 in the circumferential direction. Hence, when the rotation controller 133 rotates the hollowed tube 132 of the setting element controller 130 in the range of predetermined angles, the setting elements 124 of all six planet gear sub-systems 102 move in the axial direction along the first axis 104 corresponding to the cam grooves 136 due to the control pins 138 inserted in the cam grooves 136. In this way, the setting elements 124 are moved closer to or away from the sun gears 106, and thereby engaging with or disengaging from the corresponding sun gears 106. By designing the cam grooves 136 into different shapes, each setting element 124 moves in different axial directions and thereby granting different gear ratios.

In the third embodiment, the depth of the cam groove 136 of the setting element controller 130 is the same as the wall thickness of the hollowed tube 132; however, the depth of the cam groove 136 can also be configured to be smaller than the wall thickness of the hollowed tube 132.

Each planet gear sub-system 102 further includes an annular base 140. A circular wall structure is formed on the annular base 140 surrounding the setting element 124 and the planet gears 114, and is coaxially disposed with the first axis 104. A hole 142 is drilled on the annular base 140 corresponding to the axle 115 of the planet gear set 112 for fitting the axle 115. In the third embodiment, the inner end of the axle 115 (located inside the annular base 140) and the outer end (located outside the annular base 140) are installed with the planet gear 114 and the pulley 120 respectively. In this way, the planet gear 114 is located inside the annular base 140, and the pulley 120 is located outside the annular base 140.

In the third embodiment, the annular bases 140 of the first (the front) and the last (the rear) planet gear sub-systems 102 are different from the annular bases of the rest of the planet gear sub-systems 102. For clarity, the annular bases of the first and the last planet gear sub-system 102 in the third embodiment are referred to as the "end annular base" in the following section, and is numbered as 140'. The rest of the annular bases 140 are referred to as the "midsection annular base". The end annular base 140' is formed with an inner circular wall 162 and an outer circular wall 164. The inner circular wall 162 is formed with an axial end and is formed corresponding to the circular wall structure of the midsection annular bases 140. The outer circular wall 164 coaxially surrounds the inner circular wall 162, and is connected to the inner circular wall 162 through a connecting portion 166 respectively at both ends. Similar to the midsection annular bases 140, a hole 142 is formed at each inner circular wall 162 of the end annular base 140' for fitting the axle 115 of the planet gear 114. Similarly, another hole 168 is also formed on the outer circular wall 164 for further fitting the axle 115. The transmission gear 160 connected to the axle 115 is located outside the outer circular wall 164 for engaging with the teeth 152 of the annular gear 150 (The details will be further described later).

In the third embodiment, the annular bases 140 of the six planet gear sub-systems 102 of the multi-ratio transmission system 100 are interconnected with each other, therefore relative rotation and relative axial movements are not allowed. Each midsection annular base 140 has two axial ends. The axial ends of the midsection annular bases 140 are abutted against each other, and an axial end of each end annular base 140' is abutted against the axial end of the adjacent midsection annular base 140, so each annular base 140 cannot move in the axial direction of the first axis 104 separately. On the other hand, at least one axial groove 146 is formed on the outer side surface 144 of each midsection annular base 140. The at least one axial groove extends from an axial end to another axial end of the annular base 140 along the first axis 104. In the third embodiment, the outer side surface 144 of each midsection annular base 140 has six axial grooves 146. In addition, six securing rods 148 are disposed along the first axis 104 in such way that a part of each securing rod 148 is tightly fitted inside the corresponding axial groove 146 of the midsection annular base 140. In this way, the securing rods 148 penetrates through the axial grooves 146 of each midsection annular base 140 along the first axis 104 so as to prevent relative rotation between the midsection annular bases 140.

In the third embodiment, two grooves 170 are formed at the connecting portion 166 of the end annular base 140' which is facing the midsection annular base 140. The two grooves 170 are the passage way for the belt 122 of the coupling assembly 118 of the planet gear sub-system 102, so the belt 122 can be passed through the two grooves 170 to be placed around the pulleys 120 of the adjacent planet gear sub-system 102. In addition, six securing holes 172 are formed on the connecting portion 166 for receiving and securing the end of the securing rods 148. In this way, the two end annular bases 140' are connected with the four midsection annular bases 140 to prevent relative movements or rotations.

The multi-ratio transmission system 100 of the present invention further includes at least one annular gear 150 for engaging with the planet gear 114 of one of the planet gear sub-systems 102. In the third embodiment, the multi-ratio transmission system 100 includes two annular gears 150, each annular gear is engaged with the planet gear 114 the first and the last planet gear sub-systems 102 respectively. In the third embodiment, the annular gear 150 is a crown gear. Teeth 152 are formed at one axial end of the annular gear 150 for engaging with the corresponding planet gears 114, and the outer circumferential surface of the annular gear 150 corresponding to the first planet gear sub-system 102 is installed at an inner circumferential surface of a cylindrical casing 154. Any conventional methods can be used to install the annular gear 150 onto the cylindrical casing 154. In the third embodiment, an outer thread 156 is formed on the outer circumferential surface of the annular gear 150 for engaging with an inner thread 158 formed on the inner circumferential surface of the cylindrical casing 154. In this way, the annular gear 150 is mounted securely onto the cylindrical casing 154. The annular gear 150 corresponding to the first planet gear sub-system 102 is installed onto a one-way clutch 200 (will be described later) with a shoulder portion 201 formed between the two. In the third embodiment, because the two annular gears 150 are engaged with the planet gears 114 of the first and the last planet gear sub-systems 102 respectively, the annular gear 150 corresponding to the last planet gear sub-system 102 is secured with the inner thread 158 at an end (rear end) of the cylindrical casing 154, and the annular gear 150 corresponding to the first planet gear sub-system 102 is fitted at the other end (front end) of the cylindrical casing 154. The rest of the planet gear sub-systems 102 are enclosed within the cylindrical casing 154.

In the third embodiment, except for the inner thread 158 formed at the rear end of the cylindrical casing 154, an annular flange 300 is also formed inwardly at the front end of the cylindrical casing 154. The annular flange 300 can be abutted against the annular gear 150 of the planet gear sub-system 102 via a bearing 302 and the shoulder portion 201 of the one-way clutch 200 to secure each planet gear sub-system 102 inside the cylindrical casing 154.

In the third embodiment, the annular gear 150 installed at the front end of the cylindrical casing 154 is formed integrally with a clutch casing 202 of the one-way clutch 200.

According to the present invention, the planet gear set 112 of the first and the last planet gear sub-system 102 further includes a transmission gear 160. The transmission gear 160 is installed onto each axle 115 of the planet gear set 112, so the transmission gear 160 is disposed coaxially with the axles 115 of the planet gears 114 (coaxial with the axis of the axle 115) and rotates in synchronization with the axles 115. The transmission gear 160 is engaged with the teeth 152 of the annular gear 150 to form the engagement relationship between the annular gear 150 and the planet gear sub-system 102.

The multi-ratio transmission system 100 of the present invention further includes a central axle 174. The central axle 174 is disposed coaxially with the first axis 104, and is inserted to a center through hole 176 of the hollowed tube 132 of the setting element controller 130 by relative rotation. The central axle 174 enables the hollowed tube 132 to rotate around the central axle 174, so when the rotation controller 133 rotates the hollowed tube 132 of the setting element controller 130 around the central axle 174, the setting element 124 is moved in the axial direction on the outer circumferential surface 134 of the hollowed tube 132.

In the third embodiment, the two ends of the central axle 174 are secured to the bicycle rack respectively, so the central axle 174 is mounted to the bicycle rack and is prevented from relative motion or rotation. In the third embodiment, two flat surfaces 178 are formed opposite to each other at each end of the central axle 174. The flat surfaces 178 can engage with the external flat surfaces to prevent the rotation of the central axle 174. In addition, the flat surfaces 178 can also provide the space for other components to mount onto the central axle 174.

In the third embodiment, the multi-ratio transmission system 100 of the present invention further includes the one-way clutch 200 located outside of the first planet gear sub-system 102. The one-way clutch 200 is abutted against the annular flange 300 of the cylindrical casing 154 via the bearing 302 and the front annular gear 150. In the third embodiment, the one-way clutch 200 includes a clutch casing 202 and multiple pin sets 204. The clutch casing 202 is roughly a cylindrical component formed with an inner axial end (not numbered) and an outer axial end (not numbered). The inner axial end of the clutch casing 202 is installed onto the front annular gear 150 and is located inside the cylindrical casing 154 while the outer axial end of the clutch casing 202 is located outside the cylindrical casing 154.

A through hole 208 is formed at the center of the clutch casing 202, and is configured to be coaxial with the first axis 104. The rotation controller 133 of the setting element controller 130 is rotatably fitted and supported in the through hole 208. The cross-section shape of the through hole 208 can be formed corresponding to the rotation controller 133 and the shape of the hollowed tube 132 installed on the rotation controller 133. This belongs to the common means of those who skilled in the art, therefore it is not described in detail herein. A fact worth mentioning is that a bearing 210 or other components with similar functions can be disposed between the rotation controller 133 and the through hole 208 for steadily and rotatably supporting the rotation controller 133 of the setting element controller 130 and the hollowed tube 132.

An annular protrusion 212 is formed on the outer axial end of the clutch casing 202, and is formed coaxially with the through hole 208 surrounding the through hole 208 for coaxially supporting a sprocket 214. Multiple pin-fitting holes 216 are formed on the annular protrusion 212. In the third embodiment, six pin-fitting holes 216 are formed on the annular protrusions 212, but the number of the pin-fitting holes 216 can be adjusted according to different needs. Preferably, the pin-fitting holes 216 are formed on the annular protrusion 212 in the circumferential direction with the same angular interval in between every two pin-fitting hole 216. Each pin-fitting hole 216 is formed with a first section 218 and a second section 220, in which the first section 218 has a larger diameter than the second section 220. A shoulder portion 222 is formed between the first section 218 and the second section 220. A pin set 204 is fitted in each pin-fitting hole 216.

Each pin set 204 includes a housing 224 which is shaped as a hollowed cylinder and a pin 226 which is movably placed inside the housing 224. A spring 228 is placed between the housing 224 and the pin 226 in such a manner that its inner end abutting against the shoulder portion 222 and its outer end abutting against a flange of the pin 226. With the flexibility of the spring 228, the spring 228 pushes the outer end 230 of the pin 226 outside the housing 224, and further engages the outer end 230 of the pin 226 with the engaging holes 232 formed on the sprocket 214. In this way, the one-way clutch 200 is engaged with the sprocket 214 to rotate with the sprocket 214.

With the flexibility of the spring 228, the pin 226 retracts back into the casing 224 when the outer end 230 of the pin 226 is under internal stress. Under this condition, the inner end of the pin 226 can be fitted inside the second section 220 of the pin-fitting hole 216 of the housing 224, thereby avoiding interferences between the components.

Multiple engaging holes 232 are formed on the sprockets 214. The engaging holes 232 are distributed along a circle, which is coaxial with the first axis 104, with equal angular intervals in between. Each engaging hole 232 has a front end and a back end (both not numbered) in the circumferential direction. The back end has a flat surface, which can be abutted against the outer end 230 of the pin 226, for transmitting the force. When the sprocket 214 rotates forward, the back ends of the engaging holes 232 also rotate forward with the pins 226, thereby transmitting the torque and the rotation motion to the multi-ratio transmission system 100 of the present invention. On the other hand, the front end of the engaging hole 232 is an oblique surface, which can serve as a cam. The front end of the engaging hole 232 can guide the outer end 230 of the pin 226 to the outside of the engaging hole 232 when it comes into contact with the outer end 230 of the pin 226. Hence, when the sprockets 214 rotates backward, the pin 226 would not be able to transmit the torque and the rotation motion to the multi-ratio transmission system 100 of the present invention due to the oblique surface of the front end of the engaging hole 232. In this way, the one-way clutch 200 is only able to transmit the torque and rotation motion in one direction.

In the third embodiment, the multi-ratio transmission system 100 of the present invention further includes a shift cable connector 234. The shift cable connector has an inner axial pin 236 for inserting into and connecting with a connecting hole 238 of the rotation controller 133 of the setting element controller 130. The connecting hole 238 is formed eccentrically to the first axis 104, in this way, the shift cable connector 234 can rotate the connecting hole 238 to rotate around the first axis 104, and further drives the hollowed tube 132 of the rotation controller 133 to rotate around the first axis 104, thereby shifting between different gear ratios.

A shift cable (not shown) can be installed onto the shift cable connector 234. The shift cable can be the shift cable commonly seen on any bicycles, which is connected with a lever installed on the bicycle. When the user shifts the lever, the shift cable is then pulled by the lever and further rotates the setting element controller 130 through the shift cable connector 234.

In addition, an outer axial pin 240 is disposed on the shift cable connector 234 opposite to the inner axial pin 236.

A shift-guiding component 242 is inserted and connected to the central axle 174. Especially, an insertion hole 244 is formed at the center of the shift-guiding component 242, in which the two sides of the insertion hole 244 are formed as two flat walls 246 for abutting against the flat surfaces 178 of the central axle 174, so the relative rotation between the two is prevented. In addition, a circular guiding groove 248 is formed coaxially with the first axis 104 on the shift-guiding component 242. The circular guiding groove 248 extends in a range of angles along the circumferential direction, in which the range of angles corresponds to the range of predetermined angles for the rotation of the hollowed tube 132 of the setting element controller 130.

The outer axial pin 240 of the shift cable connector 234 is inserted into the circular guiding groove 248 to move along the circular guiding groove 248. When the user pulls the shift cable connector 234 through the shift cable, the outer axial pin 240 then moves along the circular guiding groove 248 and thereby achieving the shifting between different gear ratios. Herein, a fact worth mentioning is that the two ends of the circular guiding groove 248 can serve as the stopper of the outer axial pin 240 to prevent the outer axial pin 240 from moving out of range.

A restoring spring 250 is disposed between the shift-guiding component 242 and the rotation controller 133 of the setting element controller 130. The restoring spring 250 can server as the restoring force of the setting element controller 130 after the gear shifting, in which the setting element controller 130 is pulled by the shift cable. In the third embodiment, the restoring spring 250 has two side ends 252, which are inserted into the insertion hole 254 formed on the rotation controller 133 and the insertion hole 256 formed on the shift-guiding component 242 respectively.

Fourth Embodiment

In the following section, the multi-ratio transmission system with parallel vertical and coaxial planet gears 100 of the present invention will be explained as a transmission system of the bicycle according to a fourth embodiment.

Figure 13:
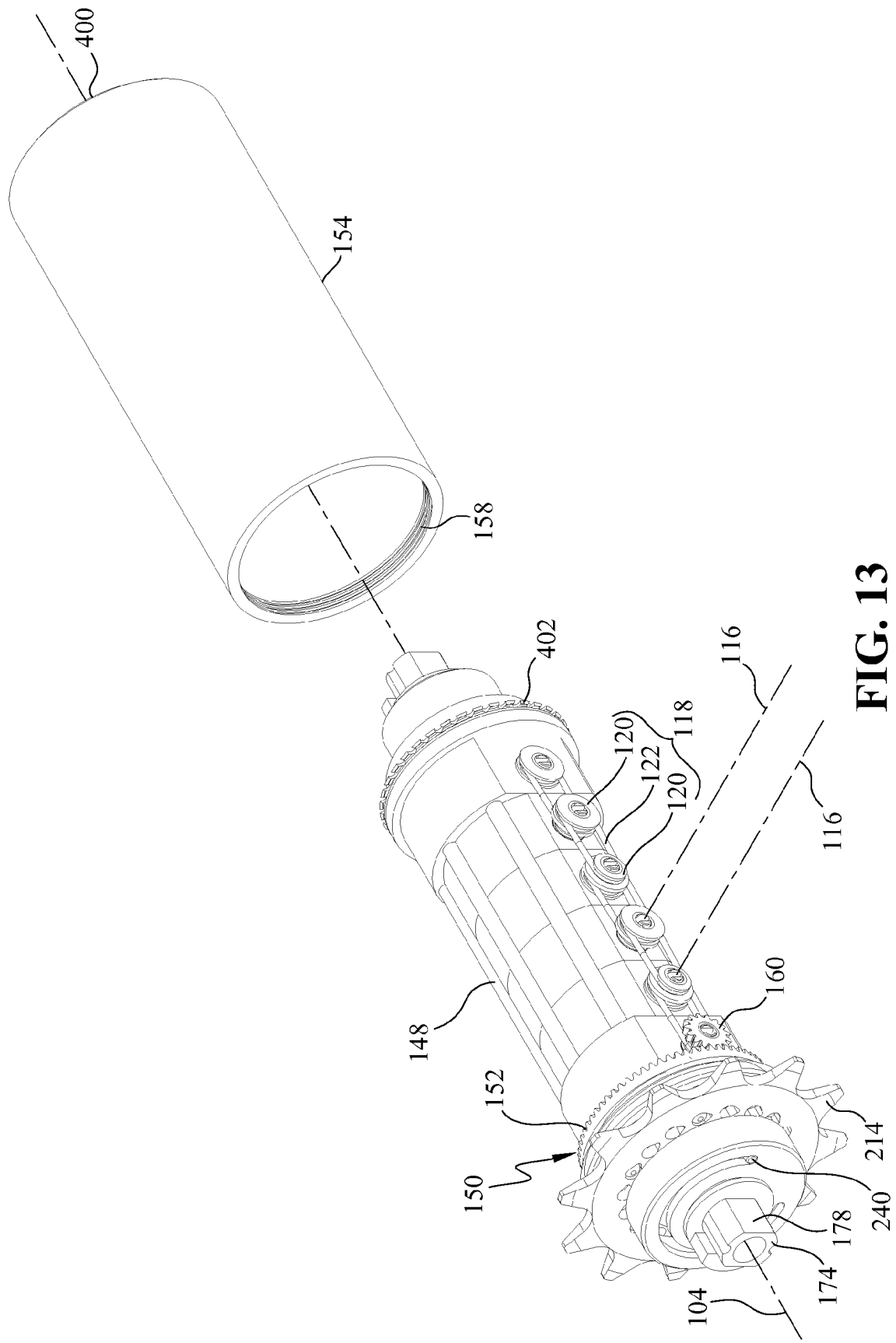
FIG. 13 is a perspective view of the fourth embodiment of the multi-ratio transmission system with parallel vertical and coaxial planet gears according to the present invention.
Figure 14A:
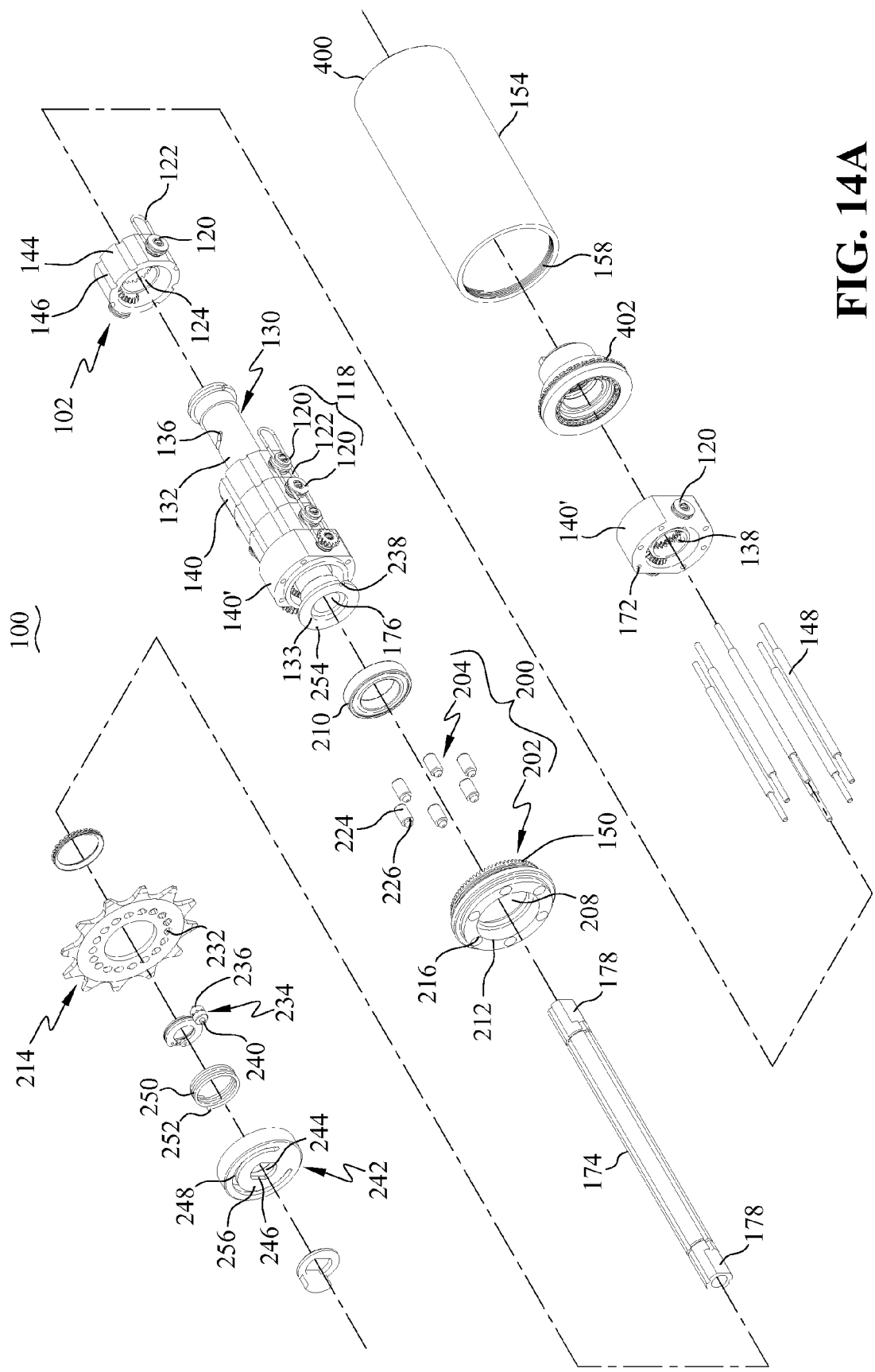
FIG. 14A is an exploded view of the fourth embodiment of the multi-ratio transmission system with parallel vertical and coaxial planet gears according to the present invention.
Figure 14B:
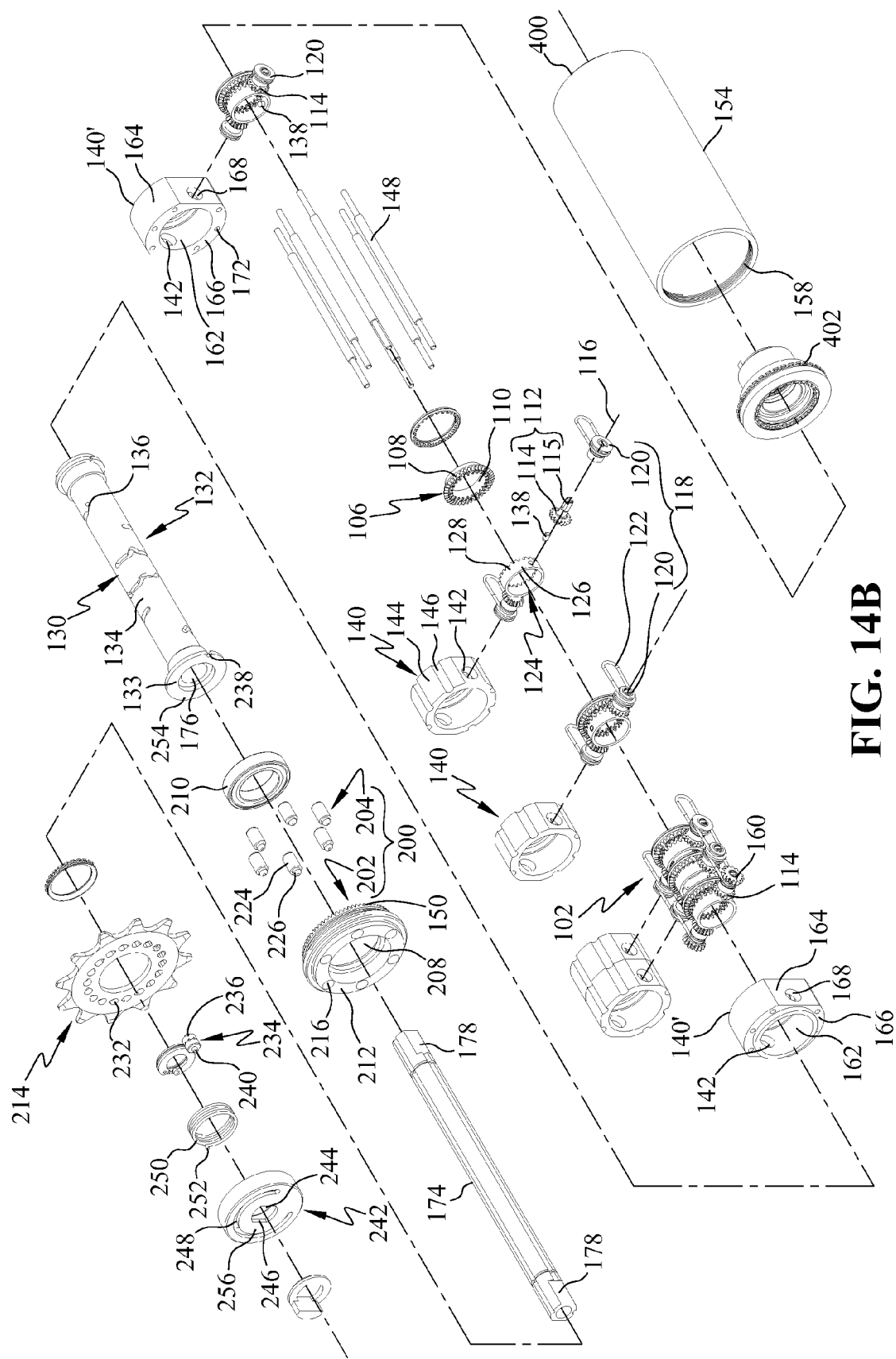
FIG. 14B is another exploded view of the fourth embodiment of the multi-ratio transmission system with parallel vertical and coaxial planet gears according to the present invention.
Figure 14C:
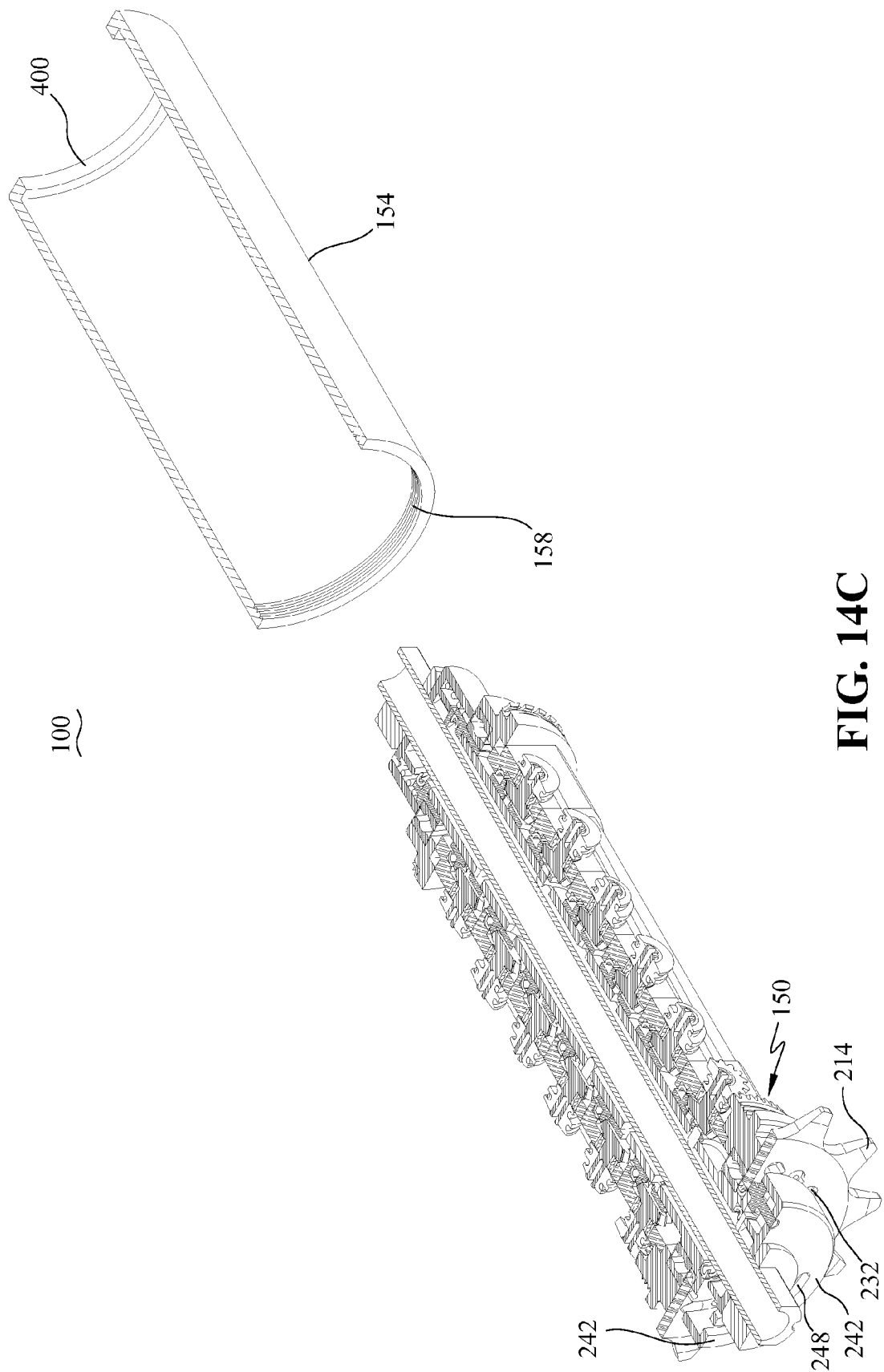
FIG. 14C is a perspective view of the fourth embodiment of the multi-ratio transmission system with parallel vertical and coaxial planet gears according to the present invention, where the cylindrical casing is apart from the system.
Figure 15A:
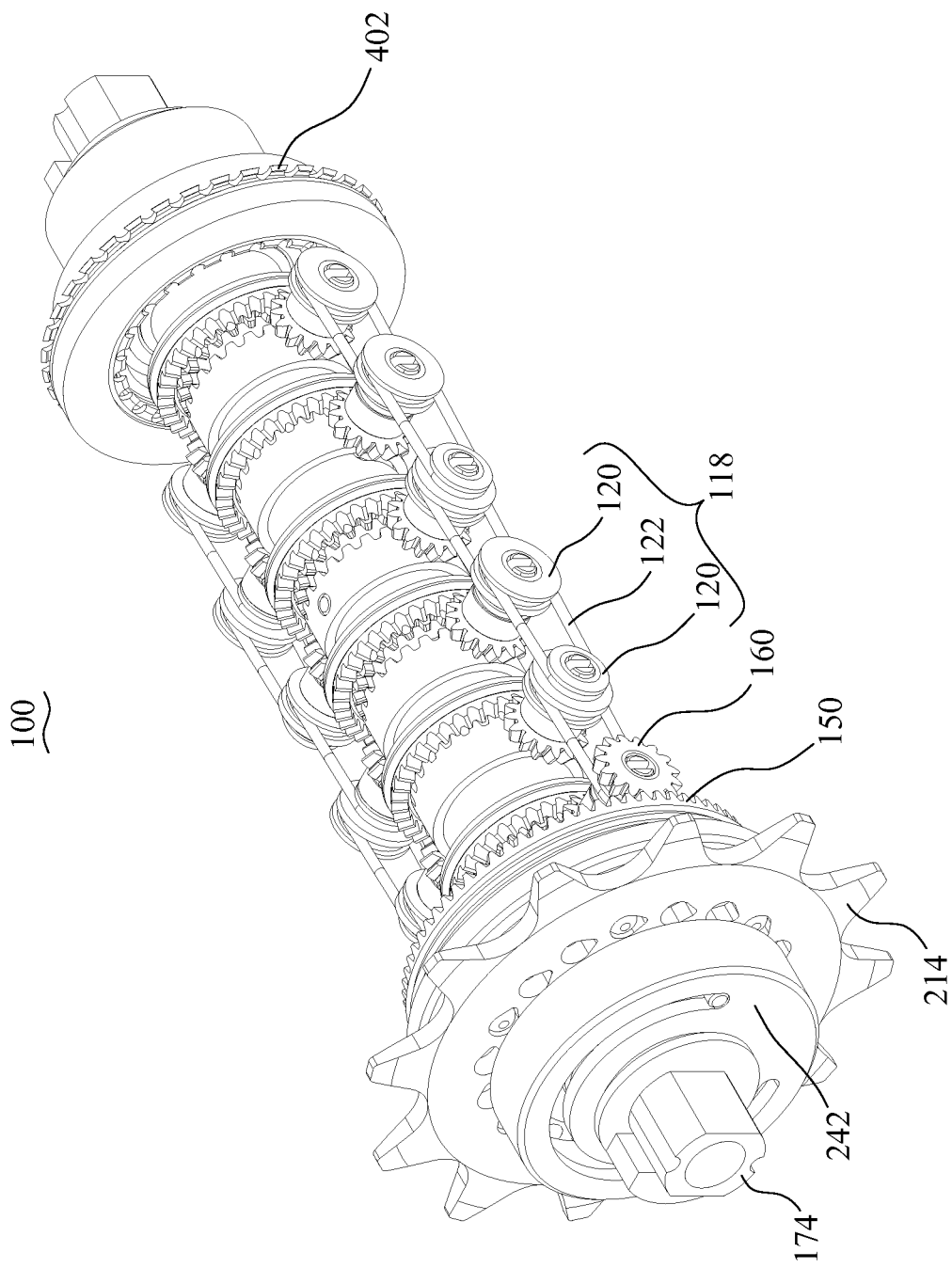
FIG. 15A is a perspective view of the fourth embodiment of the multi-ratio transmission system with parallel vertical and coaxial planet gears according to the present invention, where the cylindrical casing and the annular bases of each planet gear sub-systems are omitted for a better view of the internal structure.

The multi-ratio transmission system 100 according to the fourth embodiment of the present invention will be further explained with reference to FIG. 13, FIG. 14A, FIG. 14B, FIG. 14C, FIG. 15A and FIG. 15B.

The multi-ratio transmission system 100 of the present invention includes multiple planet gear sub-systems 102. In the fourth embodiment, the multi-ratio transmission system 100 includes six planet gear sub-systems 102. The six planet gear sub-systems 102 are coaxially placed in series along a common axis, which is defined as a first axis 104. Each planet gear sub-system 102 includes a sun gear 106, which is configured to rotate around the first axis 104. The sun gear 106 includes an outer gear 108 and an inner gear 110, and the outer gear 108 and the inner gear 110 are connected coaxially relative to each other. The outer gear 108 is a bevel gear and is located at an outer side of the inner gear 110.

Each planet gear sub-system 102 further includes at least one planet gear set 112 having a planet gear 114. The planet gear 114 is a bevel gear, and is able to engage with the outer gear 108 of the sun gear 106. The planet gear 114 is disposed on an axle 115 so as to rotate around a second axis 116. The second axis 116 is perpendicular to the first axis 104, and is defined by the axis of the axle 115. Notably, the second axis 116 of the planet gear 114 in each planet gear sub-system 102 is perpendicular to the first axis 104, and is configured to be parallel with each other.

Considering the balance of the forces, each planet gear sub-system 102 includes two planet gears 114 in the fourth embodiment. The two planet gears 114 are configured to be opposite to each other, in other words, the two planet gears 114 are 180 degrees apart from each other. However, the number of the planet gears 114 is not limited by the fourth embodiment. If necessary, each planet gear sub-system 102 includes three or more planet gears 114 that are configured symmetrically about the axle (or not symmetrically about the axle).

A coupling assembly 118 is used to couple two adjacent planet gear sub-systems 102 together, so that the rotation of the planet gear 114 of the former planet gear sub-system 102 is transmitted to the planet gear 114 of the latter planet gear sub-system 102. In the fourth embodiment, the coupling assembly 118 includes two pulleys 120. Each pulley 120 is connected to the axles 115 of the planet gear sets 112 of the two adjacent planet gear sub-systems 102 so as to rotate in synchronization with the planet gears 114 of the planet gear sets 112. A belt 122 is trained around the two pulleys 120 to connect the two pulleys, so that the rotation of the planet gear 114 of the former planet gear sub-system is transmitted through the axle 115 and the pulleys 120 to the planet gear 114 of the latter planet gear sub-system 102.

It is worth noting that except for the first (the front) and the last (the rear) planet gear sub-systems 102, each axle 115 of the planet gear 114 in the rest of the planet gear sub-systems 102 is installed with two pulleys 120. The two pulleys 120 installed on the axle 115 are connected to the pulley 120 of the former planet gear sub-systems 102 and to the pulley 120 of the latter planet gear sub-systems 102 via two belts 122. In the following description, the first planet gear planet sub-system 102 is referred to the first planet gear sub-system 102 connected adjacently to a sprocket 214 (please refer to the following description). The last planet gear subsystem 102 is referred to the very last planet gear sub-system 102 in the series of planet gear sub-systems 102 relative to the first planet gear sub-system 102.

In addition, each planet gear sub-system 102 further includes a setting element 124. The setting element 124 is able to optionally move along the first axis 104 so as to engage and secure the sun gear 106 of the planet gear sub-system 102, or to disengage and release the sun gear 106 of the planet gear sub-system 102. In the fourth embodiment, the setting element 124 is a crown gear and has a hollowed cylinder 126. The setting element 124 is disposed coaxially with the sun gear 106, and is able to move along the first axis 104 corresponding to the sun gear 106. Teeth 128 are formed at an end of the hollowed cylinder 126 of the setting element 124 facing the inner gear 110 of the sun gear 106. When the setting element 124 moves toward the sun gear 106, the teeth 128 engage the inner gear 110 of the sun gear 106, thereby securing the sun gear 106. When the setting element 124 moves away from the sun gear 106, the teeth 128 of the setting element 124 disengage from the inner gear 110, thereby releasing the sun gear 106 for free rotation. With the configuration described above, different gear ratios are provided based on the engagement statuses of the sun gears 106 of the planet gear sub-systems 102.

The multi-ratio transmission system 100 of the present invention further includes a setting element controller 130. The setting element controller 130 is connected to the setting element 124 of each planet gear sub-system 102 so as to enable the setting element 124 to engage with the sun gear 106 or to disengage from the sun gear 106. In the fourth embodiment, the setting element controller 130 includes a hollowed tube 132. The hollowed tube 132 is disposed coaxially with the first axis 104, and is able to rotate around the first axis 104 in a range of predetermined angles. The hollowed tube 132 has two ends. At least one end of the hollowed tube 132 is installed with a rotation controller 133 for optionally rotating the hollowed tube 132 within the range of predetermined angles. The hollowed tube 132 has an outer circumferential surface 134, where multiple cam grooves 136 are formed generally in the circumferential direction. In the fourth embodiment, six cam grooves 136 are formed corresponding to the setting elements 124 of the six planet gear sub-systems 102. The hollowed cylinder 126 of each setting element 124 has an inner circumferential surface (not numbered). A control pin 138 is installed on the inner circumferential surface in such way that the free end of the control pin 138 is inserted into the corresponding cam groove 136, so that the control pin 138 can move along the cam groove 136 on the outer circumferential surface 134 in the circumferential direction. Hence, when the rotation controller 133 rotates the hollowed tube 132 of the setting element controller 130 in the range of predetermined angles, the setting elements 124 of all six planet gear sub-systems 102 move in the axial direction along the first axis 104 corresponding to the cam grooves 136 due to the control pins 138 inserted in the cam grooves 136. In this way, the setting elements 124 are moved closer to or away from the sun gears 106, thereby engaging with or disengaging from the corresponding sun gears 106. By designing the cam grooves 136 into different shapes, each setting element 124 can move in different axial directions, thereby granting different gear ratios.

In the fourth embodiment, the depth of the cam groove 136 of the setting element controller 130 is the same as the wall thickness of the hollowed tube 132; however, the depth of the cam groove 136 can also be configured to be smaller than the wall thickness of the hollowed tube 132.

Each planet gear sub-system 102 further includes an annular base 140. A circular wall structure is formed on the annular base 140 surrounding the setting element 124 and the planet gears 114, and is coaxially disposed with the first axis 104. A hole 142 is drilled on the annular base 140 corresponding to the axle 115 of the planet gear set 112 for fitting the axle 115. In the fourth embodiment, the inner end of the axle 115 (located inside the annular base 140) and the outer end (located outside the annular base 140) are installed with the planet gear 114 and the pulley 120 respectively. In this way, the planet gear 114 is located inside the annular base 140, and the pulley 120 is located outside the annular base 140.

In the fourth embodiment, the annular bases 140 of the first and the last planet gear sub-systems 102 are different from the annular bases of the rest of the planet gear sub-systems 102. For clarity, the annular bases of the first and the last planet gear sub-system 102 in the fourth embodiment are referred to as the "end annular base" in the following paragraphs, and is numbered as 140'. The rest of the annular bases 140 are referred to as the "midsection annular base".

In the fourth embodiment, the annular bases 140 of the six planet gear sub-systems 102 of the multi-ratio transmission system 100 are interconnected with one another, therefore relative rotation and relative axial movements are not allowed. Each midsection annular base 140 has two axial ends. The axial ends of the midsection annular bases 140 abut against one another, and an axial end of each end annular base 140' abuts against the axial end of the adjacent midsection annular base 140, so that each annular base 140 cannot move in the axial direction of the first axis 104 separately. On the other hand, at least one axial groove 146 is formed on the outer side surface 144 of each midsection annular base 140. The axial groove extends from an axial end to another axial end of the annular base 140 along the first axis 104. In the fourth embodiment, the outer side surface 144 of each midsection annular base 140 has six axial grooves 146. In addition, six securing rods 148 are disposed along the first axis 104 in such way that a part of each securing rod 148 is tightly fitted inside the corresponding axial groove 146 of the midsection annular base 140. In this way, the securing rods 148 penetrates through the axial grooves 146 of each midsection annular base 140 along the first axis 104 so as to prevent relative rotation between the midsection annular bases 140.

In the fourth embodiment, six securing holes 172 are formed on the connecting portion 166 for receiving and securing the end of the securing rods 148. In this way, the two end annular bases 140' are connected with the four midsection annular bases 140 to prevent relative movements or rotations.

The multi-ratio transmission system 100 of the present invention further includes at least one annular gear 150 for engaging with the planet gear 114 of one of the planet gear sub-systems 102. In the fourth embodiment, the multi-ratio transmission system 100 includes two annular gears 150, each annular gear is engaged with the planet gear 114 the first and the last planet gear sub-systems 102 respectively. In the fourth embodiment, the annular gear 150 is a crown gear. Teeth 152 are formed at one axial end of the annular gear 150 for engaging with the corresponding planet gears 114, and the outer circumferential surface of the annular gear 150 corresponding to the first planet gear sub-system 102 is installed at an inner circumferential surface of a cylindrical casing 154. Any conventional methods can be used to install the annular gear 150 onto the cylindrical casing 154. In the Fourth embodiment, an outer thread 156 is formed on the outer circumferential surface of the annular gear 150 for engaging with an inner thread 158 formed on the inner circumferential surface of the cylindrical casing 154. In this way, the annular gear 150 is secured onto the cylindrical casing 154. The annular gear 150 corresponding to the last planet gear sub-system 102 is rotatably fitted inside the cylindrical casing 154. In the fourth embodiment, because the annular gear 150 is engaged with the planet gear set 112 of the first planet gear sub-system 102, the inner thread 158 is formed on the inner circumferential surface at the end (front end) of the cylindrical casing 154, which is corresponded to the first planet gear sub-system 102, for engaging with the outer thread 156 of the annular gear 150.

In the fourth embodiment, an annular flange 400 is inwardly formed at the rear end of the cylindrical casing, where the rear end of the cylindrical casing is corresponded to the last planet gear sub-system 102 and is opposite from the front end of the cylindrical casing 154. The annular flange 400 can be abutted against the axial end (not numbered) of the annular gear 150 of the last planet gear sub-system 102 which is opposite from the mid planet gear sub-system 102. In this way, with the engagement between the annular gear 150 of the first planet gear sub-system 102 and the inner thread 158 of the cylindrical casing 154, each planet gear sub-systems can be secured inside the cylindrical casing 154.

According to the present invention, the planet gear set 112 of the first and the last planet gear sub-system 102 further includes a transmission gear 160. The transmission gear 160 is installed onto each axle 115 of the planet gear set 112, so the transmission gear 160 is disposed coaxially with the axles 115 of the planet gears 114 (coaxial with the axis of the axle 115) and rotates in synchronization with the axles 115. The transmission gear 160 is engaged with the teeth 152 of the annular gear 150 to form the engagement relationship between the annular gear 150 and the planet gear sub-system 102.

The multi-ratio transmission system 100 of the present invention further includes a central axle 174. The central axle 174 is disposed coaxially with the first axis 104, and is inserted to a center through hole 176 of the hollowed tube 132 of the setting element controller 130 by relative rotation. The central axle 174 enables the hollowed tube 132 to rotate around the central axle 174, so when the rotation controller 133 rotates the hollowed tube 132 of the setting element controller 130 around the central axle 174, the setting element 124 is moved in the axial direction on the outer circumferential surface 134 of the hollowed tube 132.

In the fourth embodiment, the two ends of the central axle 174 are secured to the bicycle rack respectively, so the central axle 174 is mounted to the bicycle rack and is prevented from relative motion or rotation. In the fourth embodiment, two flat surfaces 178 are formed opposite to each other at each end of the central axle 174. The flat surfaces 178 can engage with the external flat surfaces to prevent the rotation of the central axle 174. In addition, the flat surfaces 178 can also provide the space for other components to mount onto the central axle 174.

In the fourth embodiment, the multi-ratio transmission system 100 of the present invention further includes a one-way clutch 200 disposed outside of the first planet gear sub-system 102. In the fourth embodiment, the one-way clutch 200 includes a clutch casing 202 and multiple pin sets 204. Herein, the annular gear 150 is integrally formed with the clutch casing 202 of the one-way clutch 200, so the one-way clutch 200 can be installed onto the cylindrical casing 154 by the outer thread 156 of the annular gear 150 and the inner thread 158 of the cylindrical casing 154. The clutch casing 202 is roughly a cylindrical component formed with an inner axial end (not numbered) and an outer axial end (not numbered). The inner axial end is integrally formed with the annular gear 150 and is fitted inside the cylindrical casing 154 for the outer thread 156 of the annular gear 150 to engage with the inner thread 158 of the cylindrical casing 154. The outer axial end is located outside of the cylindrical casing 154.

A through hole 208 is formed at the center of the clutch casing 202, and is configured to be coaxial with the first axis 104. The rotation controller 133 of the setting element controller 130 is rotatably fitted and supported in the through hole 208. The cross-section shape of the through hole 208 can be formed corresponding to the rotation controller 133 and the shape of the hollowed tube 132 installed on the rotation controller 133. This belongs to the common means of those who skilled in the art, therefore it is not described in detail herein. A fact worth mentioning is that a bearing 210 or other components with similar functions can be disposed between the rotation controller 133 and the through hole 208 for steadily and rotatably supporting the rotation controller 133 of the setting element controller 130 and the hollowed tube 132.

An annular protrusion 212 is formed on the outer axial end of the clutch casing 202, and is formed coaxially with the through hole 208 surrounding the through hole 208 for coaxially supporting a sprocket 214. Multiple pin-fitting holes 216 are formed on the annular protrusion 212. In the fourth embodiment, six pin-fitting holes 216 are formed on the annular protrusions 212, but the number of the pin-fitting holes 216 can be adjusted according to different needs. Preferably, the pin-fitting holes 216 are formed on the annular protrusion 212 in the circumferential direction with the same angular interval in between every two adjacent pin-fitting hole 216. Each pin-fitting hole 216 is formed with a first section 218 and a second section 220, in which the first section 218 has a larger diameter than the second section 220. A shoulder portion 222 is formed between the first section 218 and the second section 220. A pin set 204 is fitted in each pin-fitting hole 216.

Each pin set 204 includes a housing 224 which is shaped as a hollowed cylinder and a pin 226 which is movably placed inside the housing 224. A spring 228 is placed between the housing 224 and the pin 226 in such manner that its inner end abuts against the shoulder portion 222 and its outer end abuts against a flange of the pin 226. With the flexibility of the spring 228, the spring 228 pushes the outer end 230 of the pin 226 outside the housing 224, and further engages the outer end 230 of the pin 226 with the engaging holes 232 formed on the sprocket 214. In this way, the one-way clutch 200 is engaged with the sprocket 214 to rotate with the sprocket 214.

With the flexibility of the spring 228, the pin 226 retracts back into the casing 224 when the outer end 230 of the pin 226 is under internal stress. Under this condition, the inner end of the pin 226 can be fitted inside the second section 220 of the pin-fitting hole 216 of the housing 224, thereby avoiding interferences between the components.

Multiple engaging holes 232 are formed on the sprockets 214. The engaging holes 232 are distributed along a circle, which is coaxial with the first axis 104, with equal angular intervals in between. Each engaging hole 232 has a front end and a back end (both not numbered) in the circumferential direction. The back end has a flat surface, which can be abutted against the outer end 230 of the pin 226, for transmitting the force. When the sprocket 214 rotates forward, the back ends of the engaging holes 232 also rotate forward with the pins 226, thereby transmitting the torque and the rotation motion to the multi-ratio transmission system 100 of the present invention. On the other hand, the front end of the engaging hole 232 is an oblique surface, which can serve as a cam. The front end of the engaging hole 232 can guide the outer end 230 of the pin 226 to the outside of the engaging hole 232 when it comes into contact with the outer end 230 of the pin 226. Hence, when the sprockets 214 rotates backward, the pin 226 would not be able to transmit the torque and the rotation motion to the multi-ratio transmission system 100 of the present invention due to the oblique surface of the front end of the engaging hole 232. In this way, the one-way clutch 200 is only able to transmit the torque and rotation motion in one direction.

In the fourth embodiment, the multi-ratio transmission system 100 of the present invention further includes a shift cable connector 234. The shift cable connector has an inner axial pin 236 for inserting into and connecting with a connecting hole 238 of the rotation controller 133 of the setting element controller 130. The connecting hole 238 is formed eccentrically to the first axis 104, in this way, the shift cable connector 234 can rotate the connecting hole 238 to rotate around the first axis 104, and further drives the hollowed tube 132 of the rotation controller 133 to rotate around the first axis 104, thereby shifting between different gear ratios.

A shift cable (not shown) can be installed onto the shift cable connector 234. The shift cable can be the shift cable commonly seen on any bicycles, which is connected with a lever installed on the bicycle. When the user shifts the lever, the shift cable is then pulled by the lever and further rotates the setting element controller 130 through the shift cable connector 234.

In addition, an outer axial pin 240 is disposed on the shift cable connector 234 opposite to the inner axial pin 236.

A shift-guiding component 242 is inserted and connected to the central axle 174. Especially, an insertion hole 244 is formed at the center of the shift-guiding component 242, in which the two sides of the insertion hole 244 are formed as two flat walls 246 for abutting against the flat surfaces 178 of the central axle 174, so the relative rotation between the two is prevented. In addition, a circular guiding groove 248 is formed coaxially with the first axis 104 on the shift-guiding component 242. The circular guiding groove 248 extends in a range of angles along the circumferential direction, in which the range of angles corresponds to the range of predetermined angles for the rotation of the hollowed tube 132 of the setting element controller 130.

The outer axial pin 240 of the shift cable connector 234 is inserted into the circular guiding groove 248 to move along the circular guiding groove 248. When the user pulls the shift cable connector 234 through the shift cable, the outer axial pin 240 then moves along the circular guiding groove 248 and thereby achieving the shifting between different gear ratios. Herein, a fact worth mentioning is that the two ends of the circular guiding groove 248 can serve as the stopper of the outer axial pin 240 to prevent the outer axial pin 240 from moving out of range.

A restoring spring 250 is disposed between the shift-guiding component 242 and the rotation controller 133 of the setting element controller 130. The restoring spring 250 can server as the restoring force of the setting element controller 130 after the gear shifting, in which the setting element controller 130 is pulled by the shift cable. In the third embodiment, the restoring spring 250 has two side ends 252, which are inserted into the insertion hole 254 formed on the rotation controller 133 and the insertion hole 256 formed on the shift-guiding component 242 respectively.

Fifth Embodiment

In the following section, the multi-ratio transmission system with parallel vertical and coaxial planet gears 100 of the present invention will be explained as a transmission system of the bicycle according to a fifth embodiment.

Figure 16:
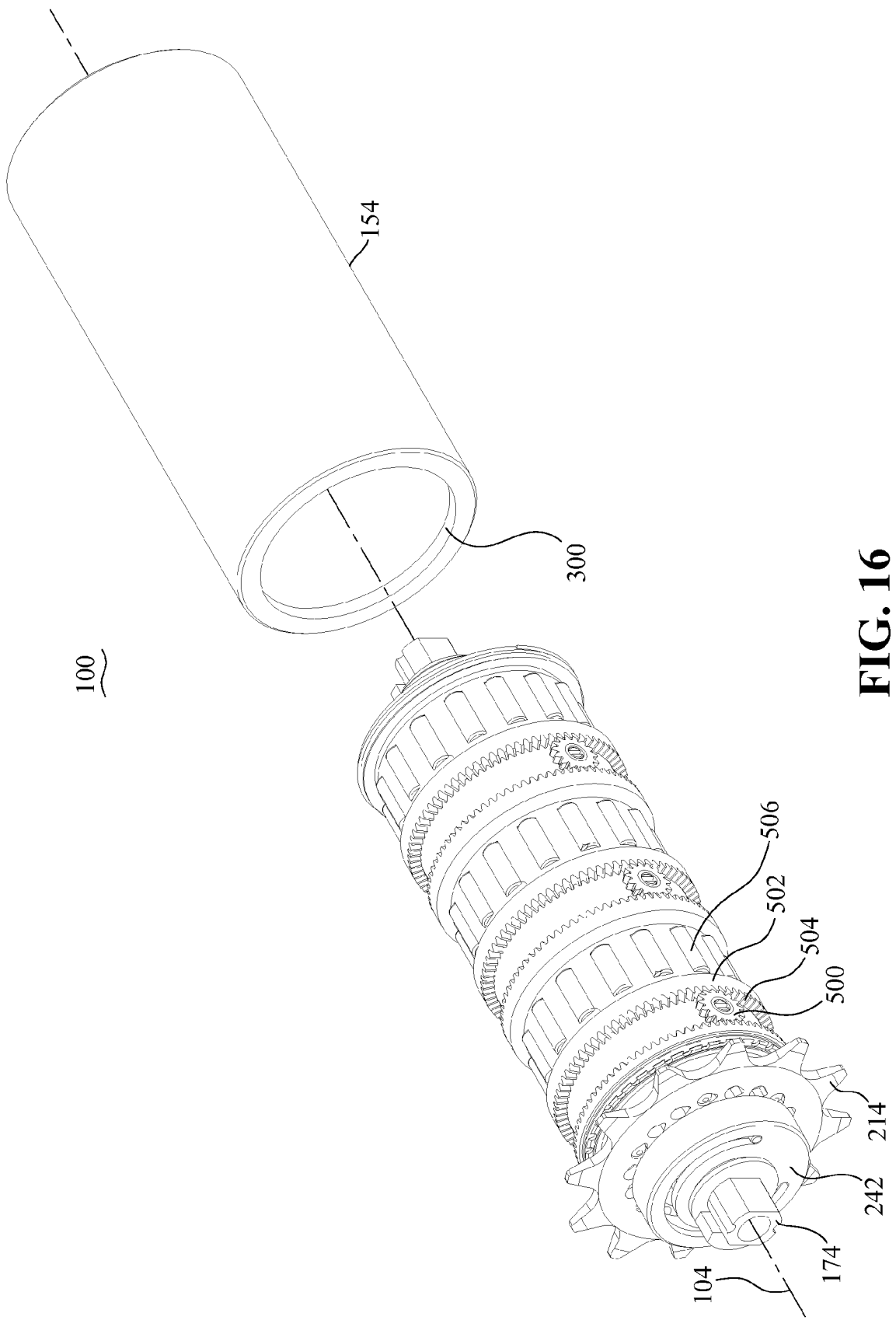
FIG. 16 is a perspective view of the fifth embodiment of the multi-ratio transmission system with parallel vertical and coaxial planet gears according to the present invention.
Figure 17A:
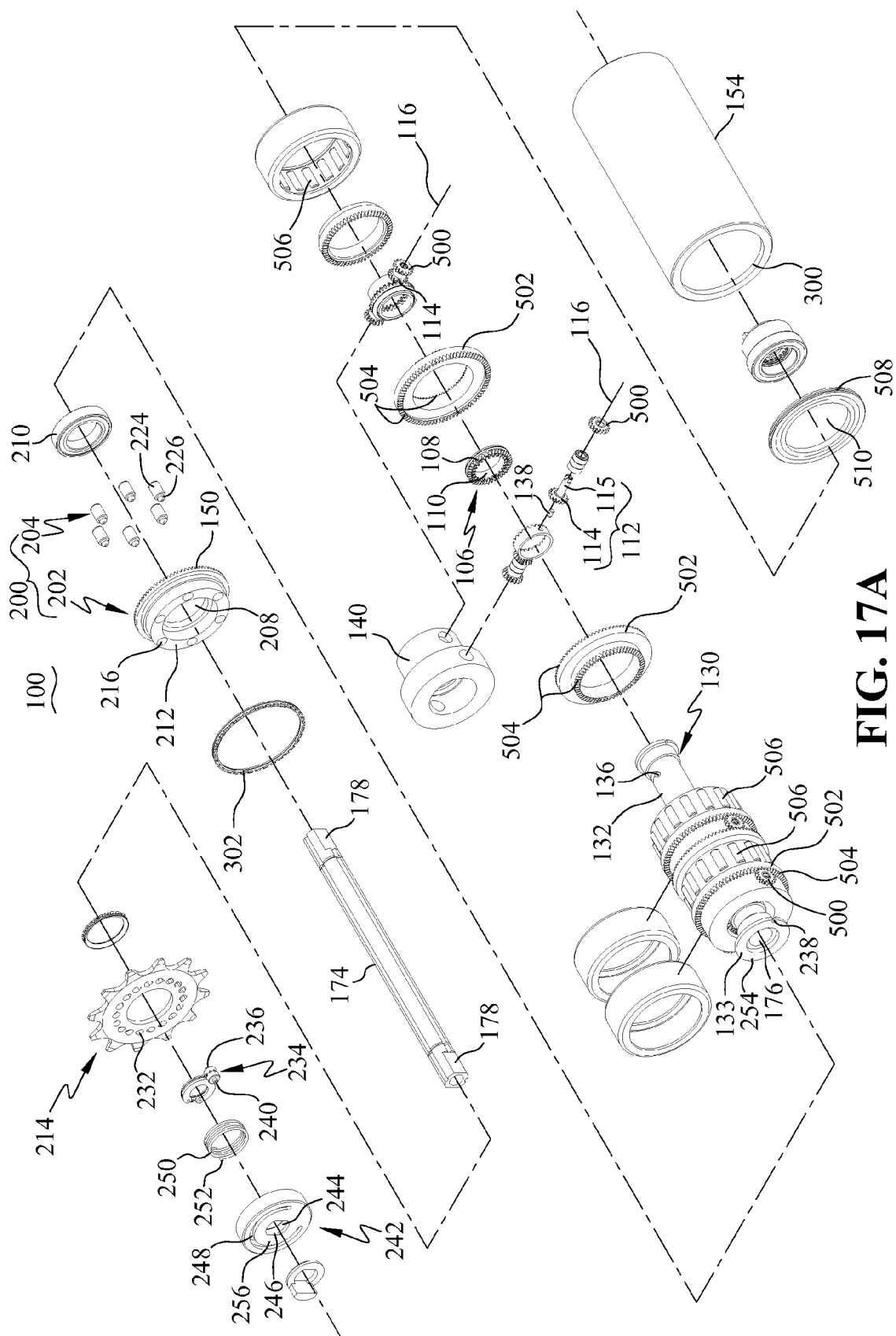
FIG. 17A is an exploded view of the fifth embodiment of the multi-ratio transmission system with parallel vertical and coaxial planet gears according to the present invention.
Figure 17B:
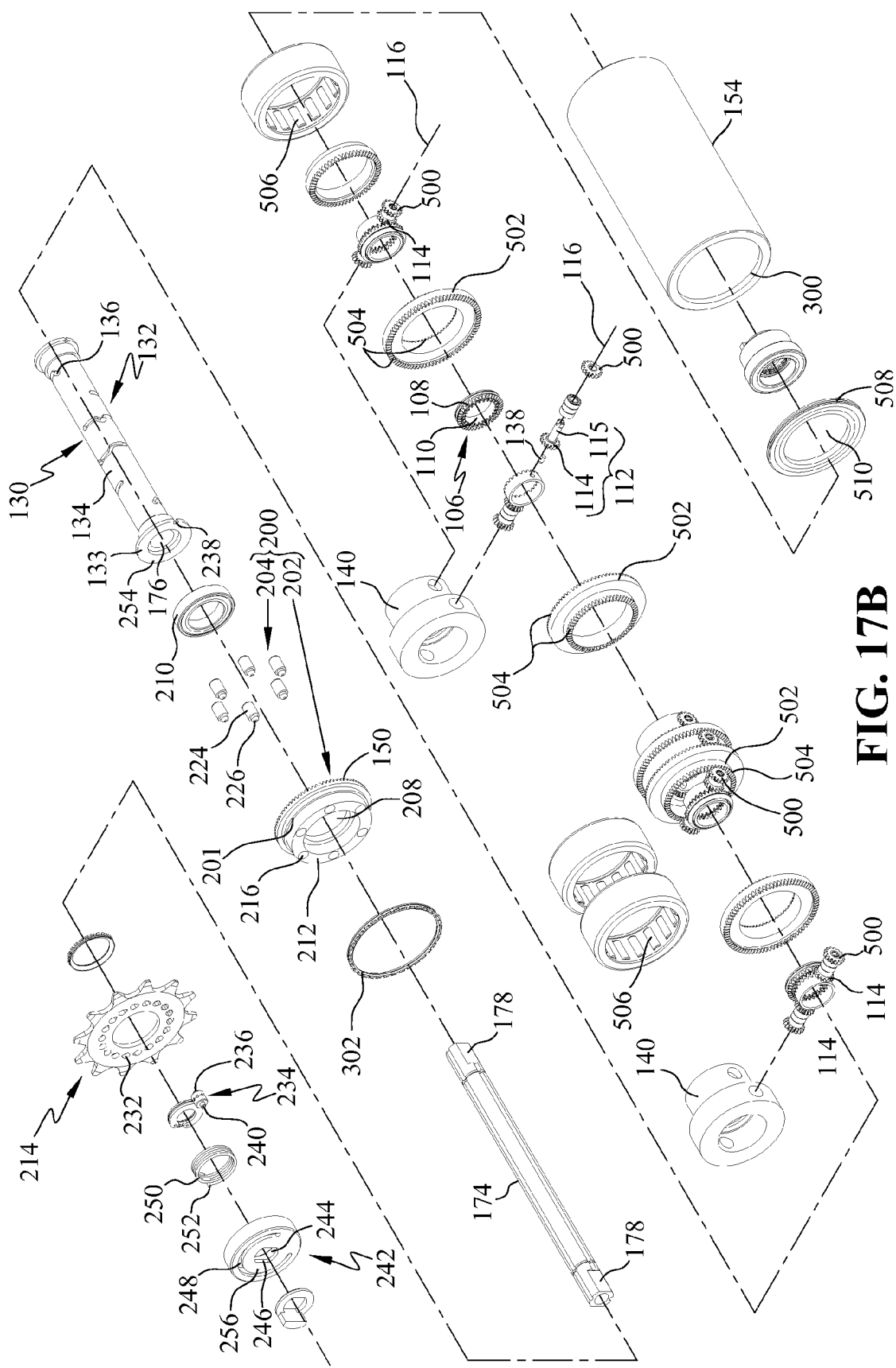
FIG. 17B is another exploded view of the fifth embodiment of the multi-ratio transmission system with parallel vertical and coaxial planet gears according to the present invention.
Figure 17C:
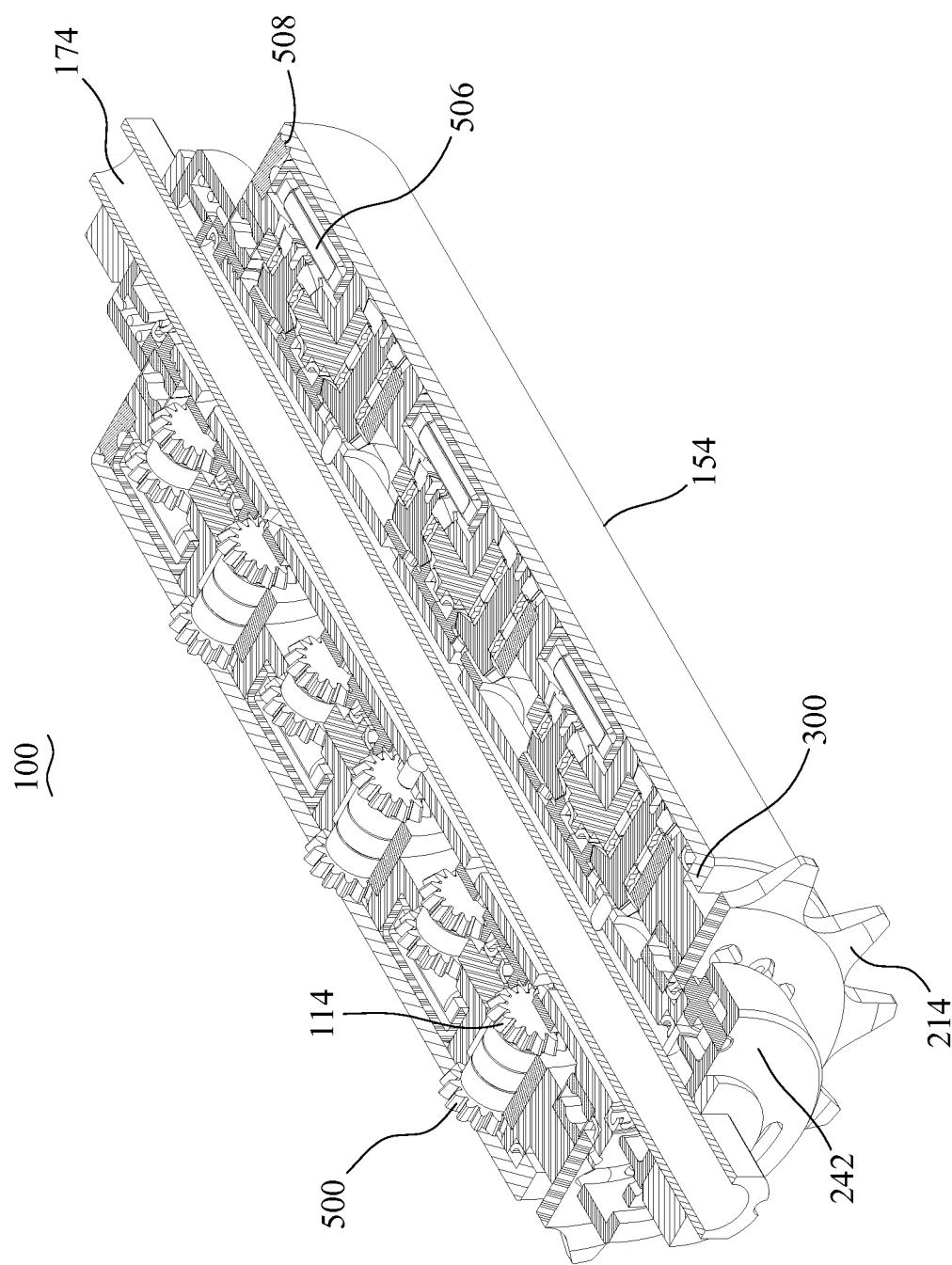
FIG. 17C is a perspective sectional view of the fifth embodiment of the multi-ratio transmission system with parallel vertical and coaxial planet gears according to the present invention, where the cylindrical casing is apart from the system.
Figure 18A:
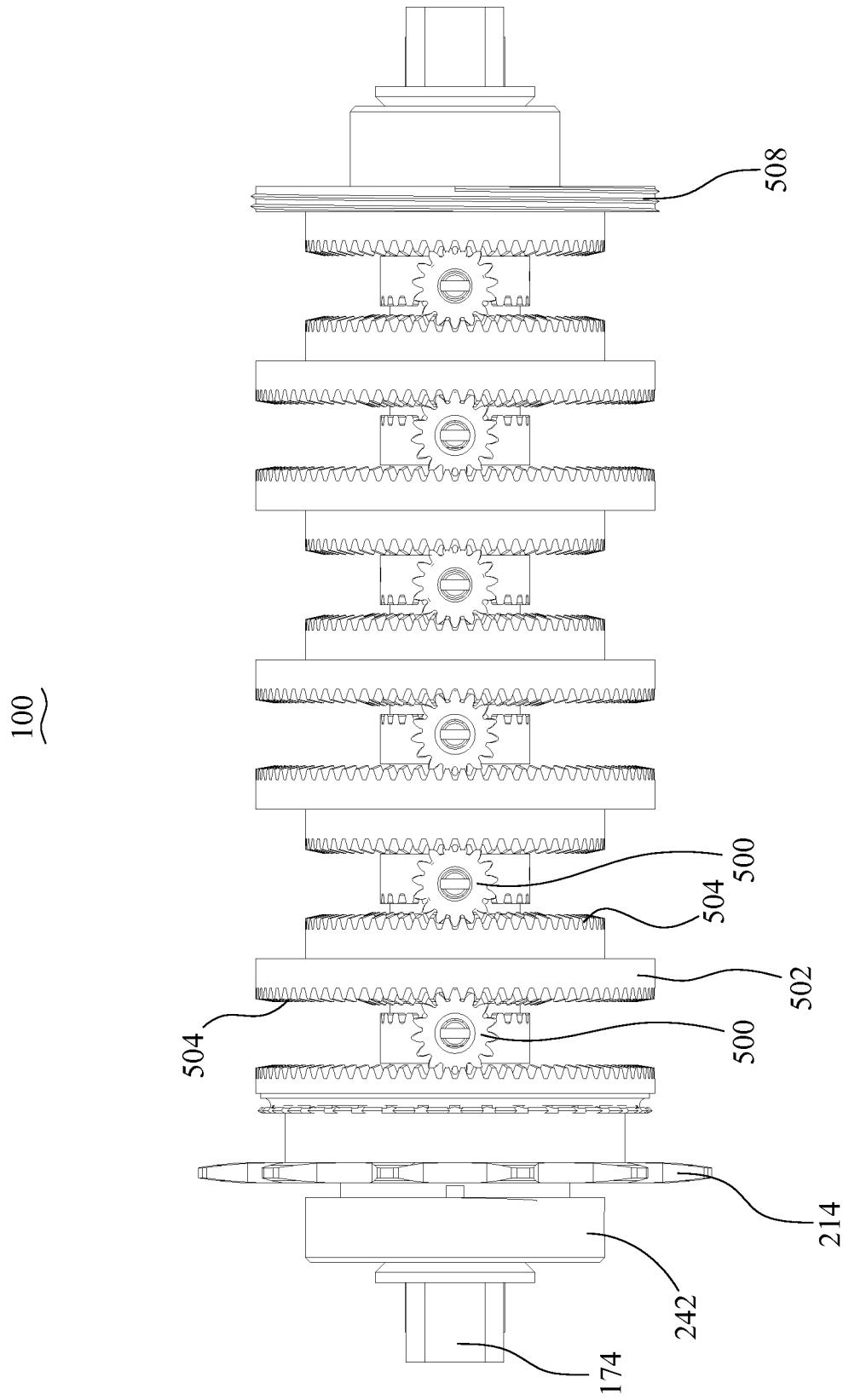
FIG. 18A is a side view of the fifth embodiment of the multi-ratio transmission system with parallel vertical and coaxial planet gears according to the present invention, where the cylindrical casing is omitted for a better view of the internal structure.
Figure 18B:
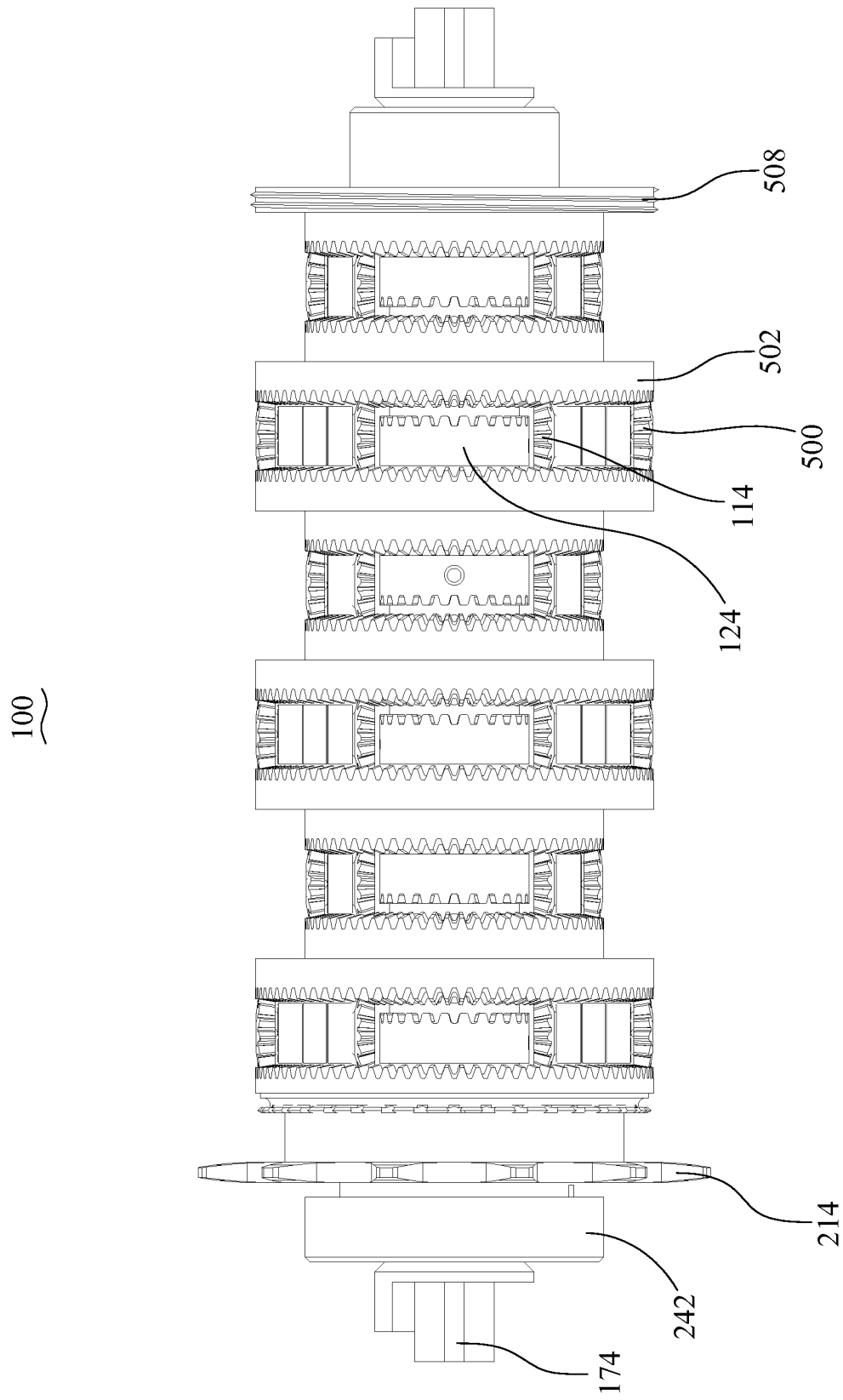
FIG. 18B is a side view of the fifth embodiment of the multi-ratio transmission system with parallel vertical and coaxial planet gears according to the present invention, where the cylindrical casing is omitted for a better view of the internal structure.

The multi-ratio transmission system 100 according to the fifth embodiment of the present invention will be further explained with reference to FIG. 16, FIG. 17A, FIG. 17B, FIG. 17C, FIG. 18A and FIG. 18B.

The multi-ratio transmission system 100 of the present invention includes multiple planet gear sub-systems 102. In the fifth embodiment, the multi-ratio transmission system 100 includes six planet gear sub-systems 102. The six planet gear sub-systems 102 are coaxially placed in series along a common axis, which is defined as a first axis 104. Each planet gear sub-system 102 includes a sun gear 106, which is configured to rotate around the first axis 104. The sun gear 106 includes an outer gear 108 and an inner gear 110, and the outer gear 108 and the inner gear 110 are connected coaxially relative to each other. The outer gear 108 is a bevel gear and is located at an outer side of the inner gear 110.

Each planet gear sub-system 102 further includes at least one planet gear set 112 having a planet gear 114. The planet gear 114 is a bevel gear, and is able to engage with the outer gear 108 of the sun gear 106. The planet gear 114 is disposed on an axle 115 so as to rotate around a second axis 116. The second axis 116 is perpendicular to the first axis 104, and is defined by the axis of the axle 115. Notably, the second axis 116 of the planet gear 114 in each planet gear sub-system 102 is perpendicular to the first axis 104, and is configured to be parallel with each other.

Considering the balance of the forces, each planet gear sub-system 102 includes two planet gears 114 in the fifth embodiment. The two planet gears 114 are configured to be opposite to each other, in other words, the two planet gears 114 are 180 degrees apart from each other. However, the number of the planet gears 114 is not limited by the fifth embodiment. If necessary, each planet gear sub-system 102 can include three or more planet gears 114 that are configured symmetrically about the axle (or not symmetrically about the axle).

A coupling assembly 118 is used to couple two adjacent planet gear sub-systems 102 together, so the rotation of the planet gear 114 of the former planet gear sub-system 102 is transmitted to the planet gear 114 of the latter planet gear sub-system 102. In the fifth embodiment, the coupling assembly 118 includes two small gears 500. Each small gear 500 is connected to the axles 115 of the planet gear sets 112 of the two adjacent planet gear sub-systems 102 so as to rotate in synchronization with the planet gears 114 of the planet gear sets 112. A coupling gear plate 502 is disposed between the two small gears 500 to connect the two small gears 500, so that the rotation of the planet gear 114 of the former planet gear sub-system 102 is transmitted to the planet gear 114 of the latter planet gear sub-system 102 through the axle 115, the two small gears 500 and the coupling gear plate 502.

In the fifth embodiment, the coupling gear plate 502 has a first axial end surface and a second axial end surface. A crown gear 504 is formed on the first and second axial end surfaces respectively for engaging with the small gears 500 of the planet gear sets 112 of the two adjacent planet gear sub-systems 102.

In the fifth embodiment, the two crown gears 504 on the two sides of the coupling gear plate 502 are configured to have different diameters. The small gears 500 to be engaged with the crown gears 504 are located at a different distance from the first axis 104 respectively. With different distance from the first axis 104, the rotation speed of the two small gears 500 on the two sides of the coupling plate 502 are different from each other. In the fifth embodiment, the two adjacent coupling plates 502 are symmetrically disposed with each other; in other words, the crown gear 504 with the larger diameter of the former coupling gear plate 502 is symmetric with the crown gear 504 of with the larger diameter of the latter coupling gear plate 502. For example, the two crown gears 504 with larger diameters are disposed facing each other or are disposed facing away from each other. Similarly, the crown gears 504 with smaller diameters of the two adjacent coupling gear plates 502 are symmetrically disposed with each other, so every other small gear 500 has the same rotation speed. Hence, every two adjacent planet gear sub-systems 102 can be seen as a group in the fifth embodiment, in which the two plane gears 114 rotate with different rotation speed. Since every group of the planet gear sub-system 102 has the same operation condition, the six planet gear sub-systems 102 of the fifth embodiment are divided into three groups of planet gear sub-systems 102 with the same operation conditions.

It is worth noting that the small gears 500 of the first (the front) and the last (the rear) planet gear sub-systems 102 are engaged with two annular gears 150 respectively (please refer to the following descriptions). In the following description, the first planet gear planet sub-system 102 is referred to the first planet gear sub-system 102 connected adjacently to a sprocket 214 (please refer to the following description). The last planet gear subsystem 102 is referred to the very last planet gear sub-system 102 in the series of planet gear sub-systems 102 relative to the first planet gear sub-system 102.

In addition, each planet gear sub-system 102 further includes a setting element 124. The setting element 124 is able to optionally move along the first axis 104 so as to engage and secure the sun gear 106 of the planet gear sub-system 102, or disengages from and releases the sun gear 106 of the planet gear sub-system 102. In the fifth embodiment, the setting element 124 is a crown gear and has a hollowed cylinder 126. The setting element 124 is disposed coaxially with the sun gear 106, and is able to move along the first axis 104 corresponding to the sun gear 106. Teeth 128 are formed at an end of the hollowed cylinder 126 of the setting element 124 facing the inner gear 110 of the sun gear 106. When the setting element 124 moves toward the sun gear 106, the teeth 128 engage with the inner gear 110 of the sun gear 106, thereby securing the sun gear 106. When the setting element 124 moves away from the sun gear 106, the teeth 128 of the setting element 124 disengage from the inner gear 110, thereby releasing the sun gear 106 for free rotation. With the configuration described above, different gear ratios are provided based on the engagement statuses of the sun gears 106 of the planet gear sub-systems 102.

The multi-ratio transmission system 100 of the present invention further includes a setting element controller 130. The setting element controller 130 is connected to the setting element 124 of each planet gear sub-system 102 so as to enable the setting element 124 to engage with the sun gear 106 or disengage from the sun gear 106. In the fifth embodiment, the setting element controller 130 includes a hollowed tube 132. The hollowed tube 132 is disposed coaxially with the first axis 104, and is able to rotate around the first axis 104 in a range of predetermined angles. The hollowed tube 132 has two ends. At least one end of the hollowed tube 132 is installed with a rotation controller 133 for optionally rotating the hollowed tube 132 within the range of predetermined angles. The hollowed tube 132 has an outer circumferential surface 134, where multiple cam grooves 136 are formed generally in the circumferential direction. In the fifth embodiment, six cam grooves 136 are formed corresponding to the setting elements 124 of the six planet gear sub-systems 102. The hollowed cylinder 126 of each setting element 124 has an inner circumferential surface (not numbered). A control pin 138 is installed on the inner circumferential surface in such way that the free end of the control pin 138 is inserted into the corresponding cam groove 136, so that the control pin 138 moves along the cam groove 136 on the outer circumferential surface 134 in the circumferential direction. Hence, when the rotation controller 133 rotates the hollowed tube 132 of the setting element controller 130 in the range of predetermined angles, the setting elements 124 of all six planet gear sub-systems 102 move in the axial direction along the first axis 104 corresponding to the cam grooves 136 due to the control pins 138 inserted in the cam grooves 136. In this way, the setting elements 124 are moved closer to or away from the sun gears 106, thereby engaging with or disengaging from the corresponding sun gears 106. By designing the cam grooves 136 into different shapes, each setting element 124 can move in different axial directions, thereby granting different gear ratios.

In the fifth embodiment, the depth of the cam groove 136 of the setting element controller 130 is the same as the wall thickness of the hollowed tube 132; however, the depth of the cam groove 136 can also be configured to be smaller than the wall thickness of the hollowed tube 132.

Each planet gear sub-system 102 further includes an annular base 140. A circular wall structure is formed on the annular base 140 surrounding the setting element 124 and the planet gears 114, and is coaxially disposed with the first axis 104. A hole 142 is drilled on the annular base 140 corresponding to the axle 115 of the planet gear set 112 for fitting the axle 115. In the fifth embodiment, the inner end of the axle 115 (located inside the annular base 140) and the outer end (located outside the annular base 140) are installed with the planet gear 114 and the small gear 500 respectively. In this way, the planet gear 114 is located inside the annular base 140, and the small gear 500 is located outside the annular base 140.

As mentioned above, the two adjacent planet gear sub-systems 102 make a group in the fifth embodiment; therefore, the annular bases 140 of the two adjacent planet gear sub-systems 102 are also formed integrally, as shown in the figures.

In addition, the multi-ratio transmission system 100 according to the fifth embodiment further includes a bearing 506. The bearing 506 is disposed surrounding the crown gears 504 with smaller diameters of the adjacent two coupling gear plates 502 and the small gears 500 engaged therewith, thereby supporting the coupling gear plate 502 to rotate smoothly on the inner circumferential surface of the cylindrical casing 154.

The multi-ratio transmission system 100 of the present invention further includes at least one annular gear 150 for engaging with the small gears 500 of one of the planet gear set 112 of one of the planet gear sub-systems 102. In the fifth embodiment, the multi-ratio transmission system 100 includes two annular gears 150, each annular gear is engaged with the small gear 500 the first and the last planet gear sub-systems 102 respectively. In the fifth embodiment, the annular gear 150 is a crown gear. Teeth 152 are formed at one axial end of the annular gear 150 for engaging with the corresponding planet gear 114. The annular gear corresponding to the last planet gear sub-system 102 is secured inside the cylindrical casing 154 with a circular securing end cap 508. The securing end cap 508 is formed with a center hole 510 for rotatably fitting the annular gear 105 corresponding to the last planet gear sub-system 102. The securing end cap 508 has an outer circumferential surface for installing onto an inner circumferential surface of the cylindrical casing 154. Any conventional methods can be used to install the securing end cap 508 onto the cylindrical casing 154. In the fifth embodiment, an outer thread 512 is formed on the outer circumferential surface of the securing end cap 508 for engaging with an inner thread 158 formed on the inner circumferential surface of the cylindrical casing 154. In this way, the securing end cap 508 is secured onto the cylindrical casing 154. The annular gear 150 corresponding to the first planet gear sub-system 102 is installed onto a one-way clutch 200 (described in the later sections), and a shoulder portion 201 is formed between the two. In the fifth embodiment, because the two annular gears 150 are engaged with the small gears 500 of the planet gear sets 112 of the first and the last planet gear sub-systems 102, therefore, in addition to the annular gear 150 corresponding to the last planet gear sub-system 102 being secured to an end of the cylindrical casing 154 (rear end), the annular gear 150 corresponding to the first planet gear sub-system 102 is fitted at the other end (front end) of the cylindrical casing 154. The rest of the planet gear sub-systems 102 are enclosed within the cylindrical casing 154.

In the fifth embodiment, in addition to the inner thread 158 formed at the rear end of the cylindrical casing 154, an annular flange 300 is also formed inwardly at the front end of the cylindrical casing 154. The annular flange 300 abuts against the annular gear 150 of the planet gear sub-system and the shoulder portion 201 of the one-way clutch 200 with a bearing 302. In this way, each planet gear sub-systems is secured inside the cylindrical casing 154 to ensure the engagement relationship between each small gear 500 and each crown gear 504 of the coupling gear plate 502.

In the fifth embodiment, the front annular gear 150 is integrally formed with the clutch casing 202 of the one-way clutch 200.

The multi-ratio transmission system 100 of the present invention further includes a central axle 174. The central axle 174 is disposed coaxially with the first axis 104, and is inserted to a center through hole 176 of the hollowed tube 132 of the setting element controller 130 by relative rotation. The central axle 174 enables the hollowed tube 132 to rotate around the central axle 174, so when the rotation controller 133 rotates the hollowed tube 132 of the setting element controller 130 around the central axle 174, the setting element 124 moves in the axial direction on the outer circumferential surface 134 of the hollowed tube 132.

In the fifth embodiment, the two ends of the central axle 174 are secured to the bicycle rack respectively, so that the central axle 174 is mounted to the bicycle rack and is prevented from relative motion or rotation. In the fifth embodiment, two flat surfaces 178 are formed opposite to each other at each end of the central axle 174. The flat surfaces 178 can engage with the external flat surfaces to prevent the rotation of the central axle 174. In addition, the flat surfaces 178 also provide the space for other components to mount onto the central axle 174.

In the fifth embodiment, the multi-ratio transmission system 100 of the present invention further includes a one-way clutch 200 disposed outside of the first planet gear sub-system 102. The one-way clutch 200 abuts against the annular flange 300 of the cylindrical casing 154 with the bearing 302 and the front annular gear 150. In the fifth embodiment, the one-way clutch 200 includes a clutch casing 202 and multiple pin sets 204. The clutch casing 202 is roughly a cylindrical component formed with an inner axial end (not numbered) and an outer axial end (not numbered). The inner axial end is installed onto the front annular gear 150 and is located inside the cylindrical casing 154. The outer axial end is located outside of the cylindrical casing 154.

A through hole 208 is formed at the center of the clutch casing 202, and is configured to be coaxial with the first axis 104. The rotation controller 133 of the setting element controller 130 is rotatably fitted and supported in the through hole 208. The cross-section shape of the through hole 208 is formed corresponding to the rotation controller 133 and the shape of the hollowed tube 132 installed on the rotation controller 133. This belongs to the common means of those who skilled in the art, therefore it is not described in detail herein. A fact worth mentioning is that a bearing 210 or other components with similar functions are disposed between the rotation controller 133 and the through hole 208 for steadily and rotatably supporting the rotation controller 133 of the setting element controller 130 and the hollowed tube 132.

An annular protrusion 212 is formed on the outer axial end of the clutch casing 202, and is formed coaxially with the through hole 208 surrounding the through hole 208 for coaxially supporting a sprocket 214. Multiple pin-fitting holes 216 are formed on the annular protrusion 212. In the fifth embodiment, six pin-fitting holes 216 are formed on the annular protrusions 212, but the number of the pin-fitting holes 216 can be adjusted according to different needs. Preferably, the pin-fitting holes 216 are formed on the annular protrusion 212 in the circumferential direction with the same angular interval between every two adjacent pin-fitting holes 216. Each pin-fitting hole 216 is formed with a first section 218 and a second section 220, in which the first section 218 has a larger diameter than the second section 220. A shoulder portion 222 is formed between the first section 218 and the second section 220. A pin set 204 is fitted in each pin-fitting hole 216.

Each pin set 204 includes a housing 224 which is shaped as a hollowed cylinder and a pin 226 which is movably placed inside the housing 224. A spring 228 is placed between the housing 224 and the pin 226 in such a manner that its inner end abuts against the shoulder portion 222 and its outer end abuts against a flange of the pin 226. With the flexibility of the spring 228, the spring 228 pushes the outer end 230 of the pin 226 outside the housing 224, and further engages the outer end 230 of the pin 226 with the engaging holes 232 formed on the sprocket 214. In this way, the one-way clutch 200 is engaged with the sprocket 214 to rotate with the sprocket 214.

With the flexibility of the spring 228, the pin 226 retracts back into the casing 224 when the outer end 230 of the pin 226 is under internal stress. Under this condition, the inner end of the pin 226 is fitted inside the second section 220 of the pin-fitting hole 216 of the housing 224, thereby avoiding interferences between the components.

Multiple engaging holes 232 are formed on the sprockets 214. The engaging holes 232 are distributed along a circle, which is coaxial with the first axis 104, with equal angular intervals therebetween. Each engaging hole 232 has a front end and a back end (both not numbered) in the circumferential direction. The back end has a flat surface, which abuts against the outer end 230 of the pin 226, for transmitting the force. When the sprocket 214 rotates forward, the back ends of the engaging holes 232 also rotate forward with the pins 226, thereby transmitting the torque and the rotation motion to the multi-ratio transmission system 100 of the present invention. On the other hand, the front end of the engaging hole 232 is an oblique surface, which serves as a cam. The front end of the engaging hole 232 can guide the outer end 230 of the pin 226 to the outside of the engaging hole 232 when it comes into contact with the outer end 230 of the pin 226. Hence, when the sprockets 214 rotates backward, the pin 226 would not transmit the torque and the rotation motion to the multi-ratio transmission system 100 of the present invention due to the oblique surface of the front end of the engaging hole 232. In this way, the one-way clutch 200 transmits the torque and rotation motion in only one direction.

In the fifth embodiment, the multi-ratio transmission system 100 of the present invention further includes a shift cable connector 234. The shift cable connector has an inner axial pin 236 for inserting into and connecting with a connecting hole 238 of the rotation controller 133 of the setting element controller 130. The connecting hole 238 is formed eccentrically to the first axis 104, in this way, the shift cable connector 234 can rotate the connecting hole 238 to rotate around the first axis 104, and further drives the hollowed tube 132 of the rotation controller 133 to rotate around the first axis 104, thereby shifting between different gear ratios.

A shift cable (not shown) is installed onto the shift cable connector 234. The shift cable can be the shift cable commonly seen on any bicycles, which is connected with a lever installed on the bicycle. When the user shifts the lever, the shift cable is then pulled by the lever and further rotates the setting element controller 130 through the shift cable connector 234.

In addition, an outer axial pin 240 is disposed on the shift cable connector 234 opposite to the inner axial pin 236.

A shift-guiding component 242 is inserted and connected to the central axle 174. Especially, an insertion hole 244 is formed at the center of the shift-guiding component 242, in which the two sides of the insertion hole 244 are formed as two flat walls 246 for abutting against the flat surfaces 178 of the central axle 174, so that relative rotation between the two is prevented. In addition, a circular guiding groove 248 is formed coaxially with the first axis 104 on the shift-guiding component 242. The circular guiding groove 248 extends in a range of angles along the circumferential direction, in which the range of angles is corresponded to the range of predetermined angles for the rotation of the hollowed tube 132 of the setting element controller 130.

The outer axial pin 240 of the shift cable connector 234 is inserted into the circular guiding groove 248 to move along the circular guiding groove 248. When the user pulls the shift cable connector 234 through the shift cable, the outer axial pin 240 then moves along the circular guiding groove 248, thereby achieving the shifting between different gear ratios. Herein, a fact worth mentioning is that the two ends of the circular guiding groove 248 serve as the stopper of the outer axial pin 240 to prevent the outer axial pin 240 from moving out of range.

A restoring spring 250 is disposed between the shift-guiding component 242 and the rotation controller 133 of the setting element controller 130. The restoring spring 250 serves as the restoring force of the setting element controller 130 after the gear shifting, in which the setting element controller 130 is pulled by the shift cable. In the third embodiment, the restoring spring 250 has two side ends 252, which are inserted into the insertion hole 254 formed on the rotation controller 133 and the insertion hole 256 formed on the shift-guiding component 242 respectively.

Sixth Embodiment

In the following paragraphs, the multi-ratio transmission system with parallel vertical and coaxial planet gears 100 of the present invention will be explained as a transmission system of the bicycle according to a sixth embodiment.

Figure 19:
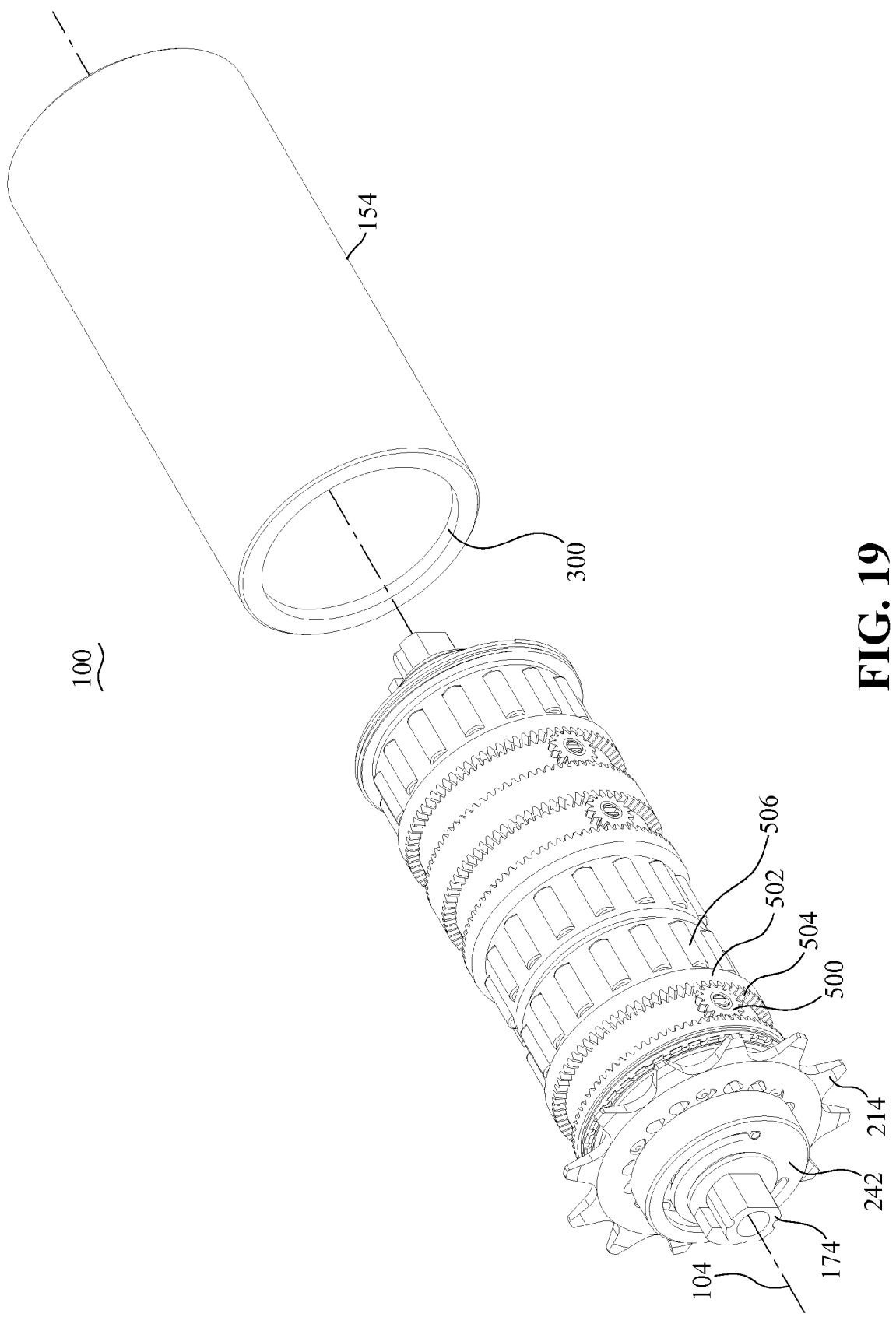
FIG. 19 is a perspective view of the sixth embodiment of the multi-ratio transmission system with parallel vertical and coaxial planet gears according to the present invention.
Figure 20A:
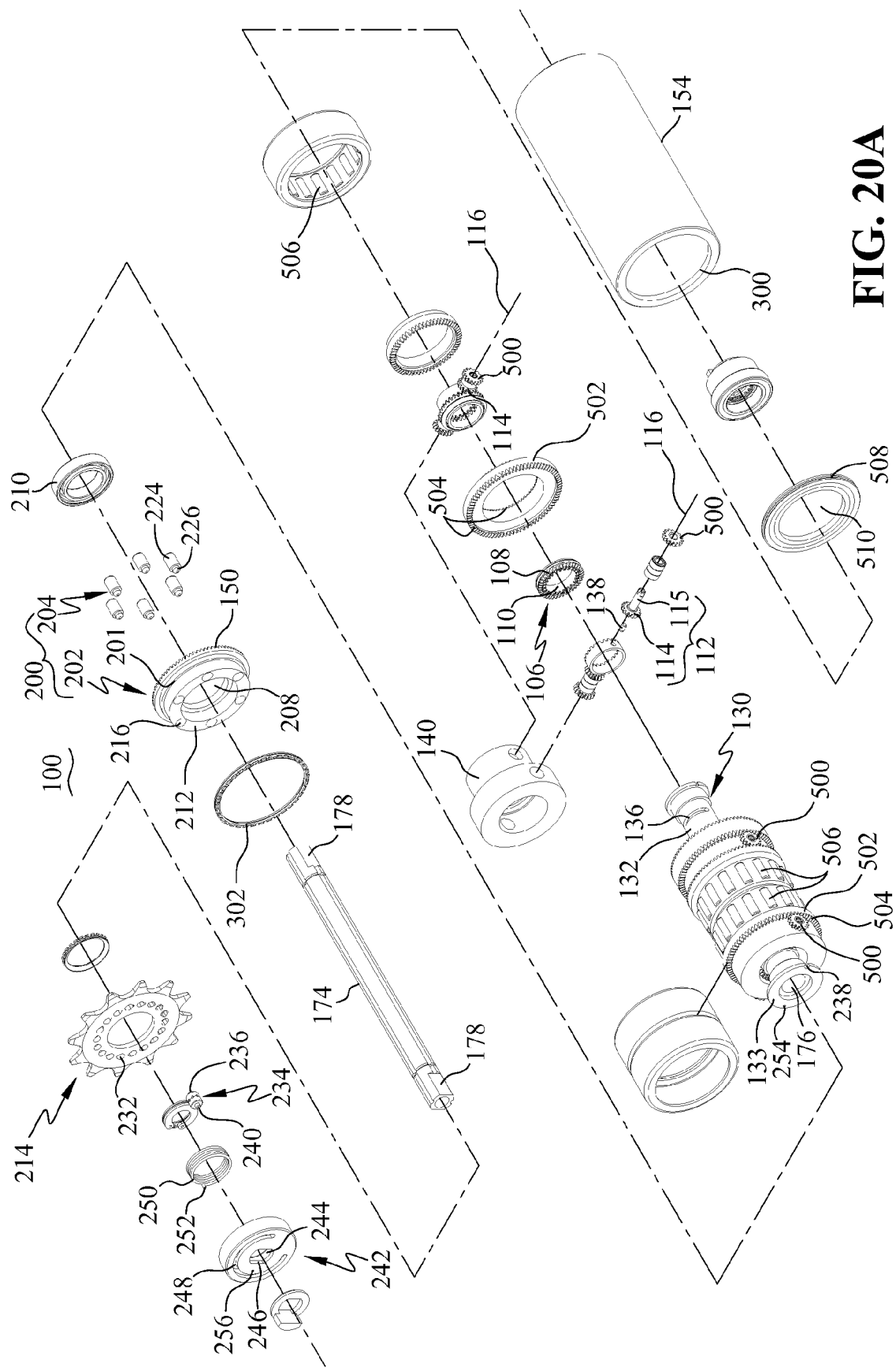
FIG. 20A is an exploded view of the sixth embodiment of the multi-ratio transmission system with parallel vertical and coaxial planet gears according to the present invention.
Figure 20B:
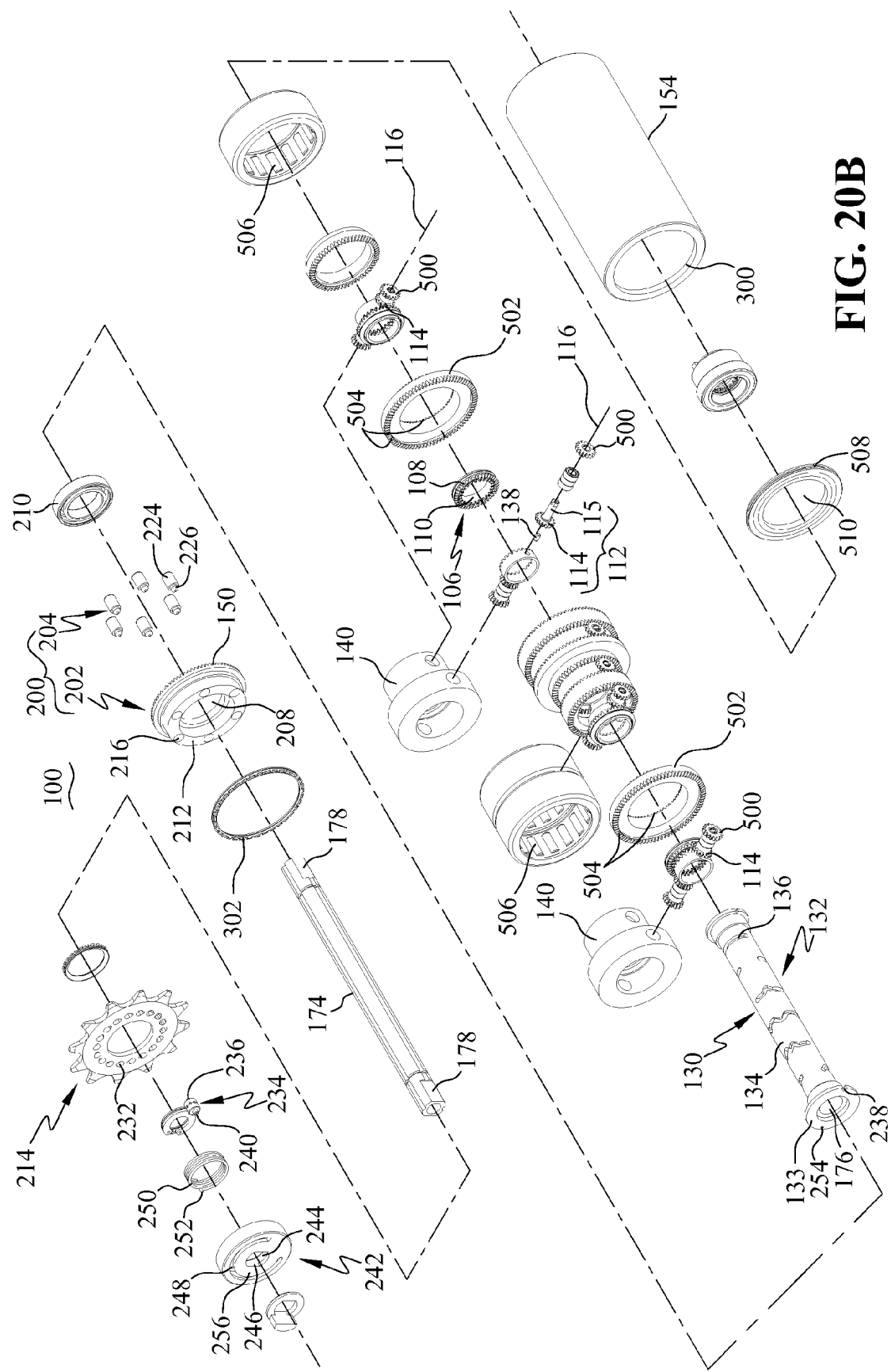
FIG. 20B is another exploded view of the sixth embodiment of the multi-ratio transmission system with parallel vertical and coaxial planet gears according to the present invention.
Figure 20C:
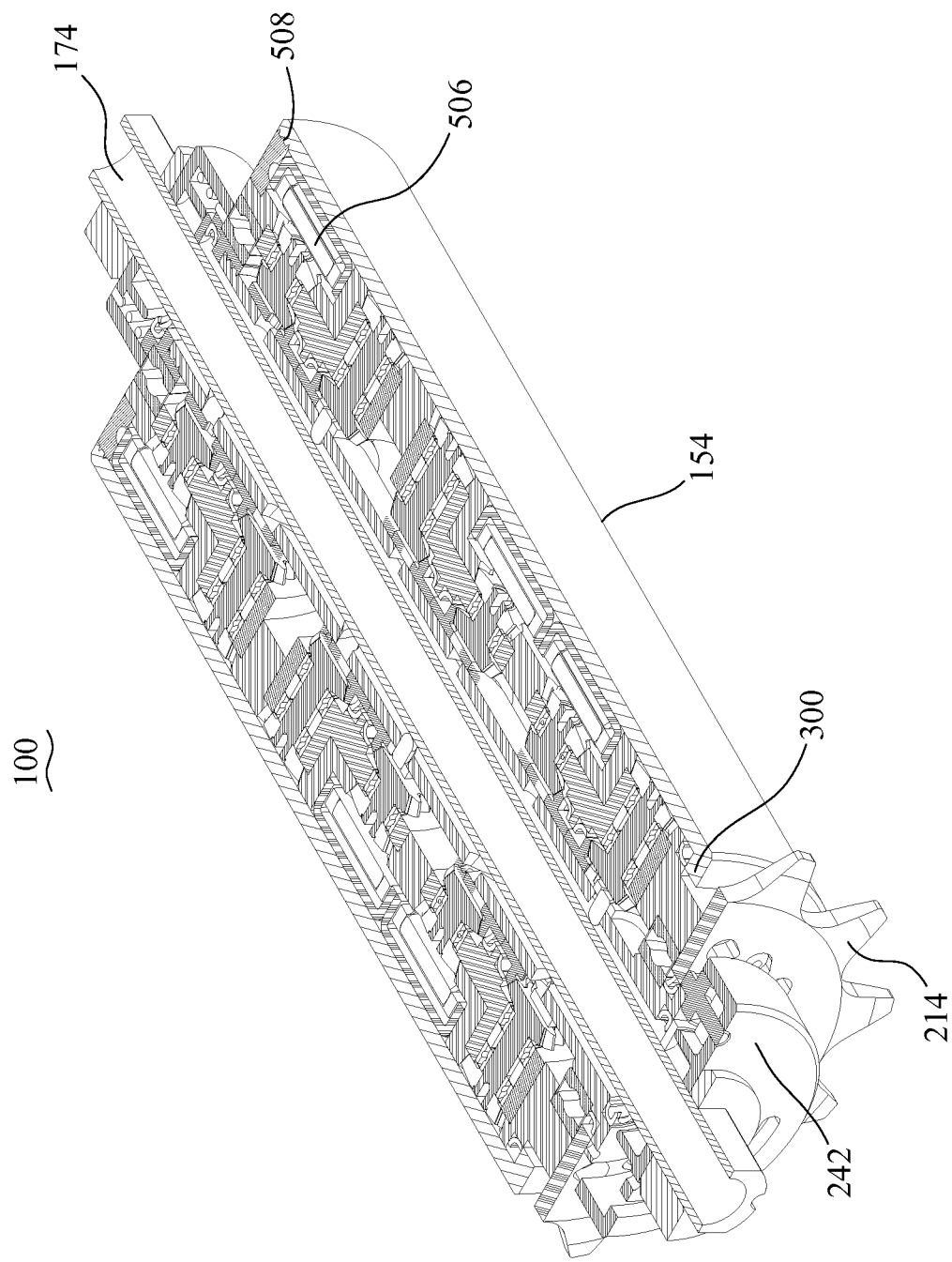
FIG. 20C is a perspective sectional view of the sixth embodiment of the multi-ratio transmission system with parallel vertical and coaxial planet gears according to the present invention, where the cylindrical casing is apart from the system.
Figure 21A:
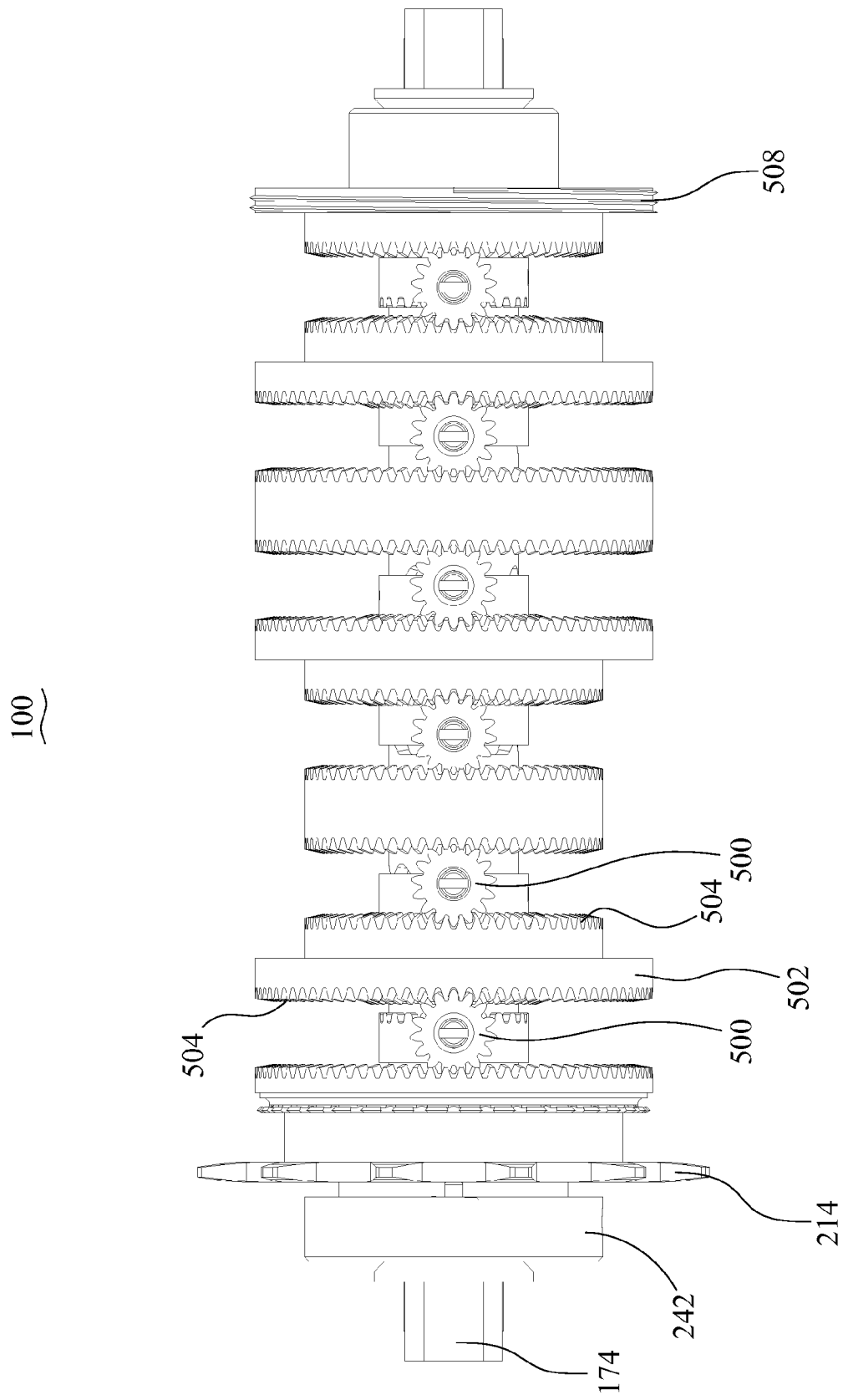
FIG. 21A is a side view of the sixth embodiment of the multi-ratio transmission system with parallel vertical and coaxial planet gears according to the present invention, where the cylindrical casing is omitted for a better view of the internal structure.
Figure 21B:
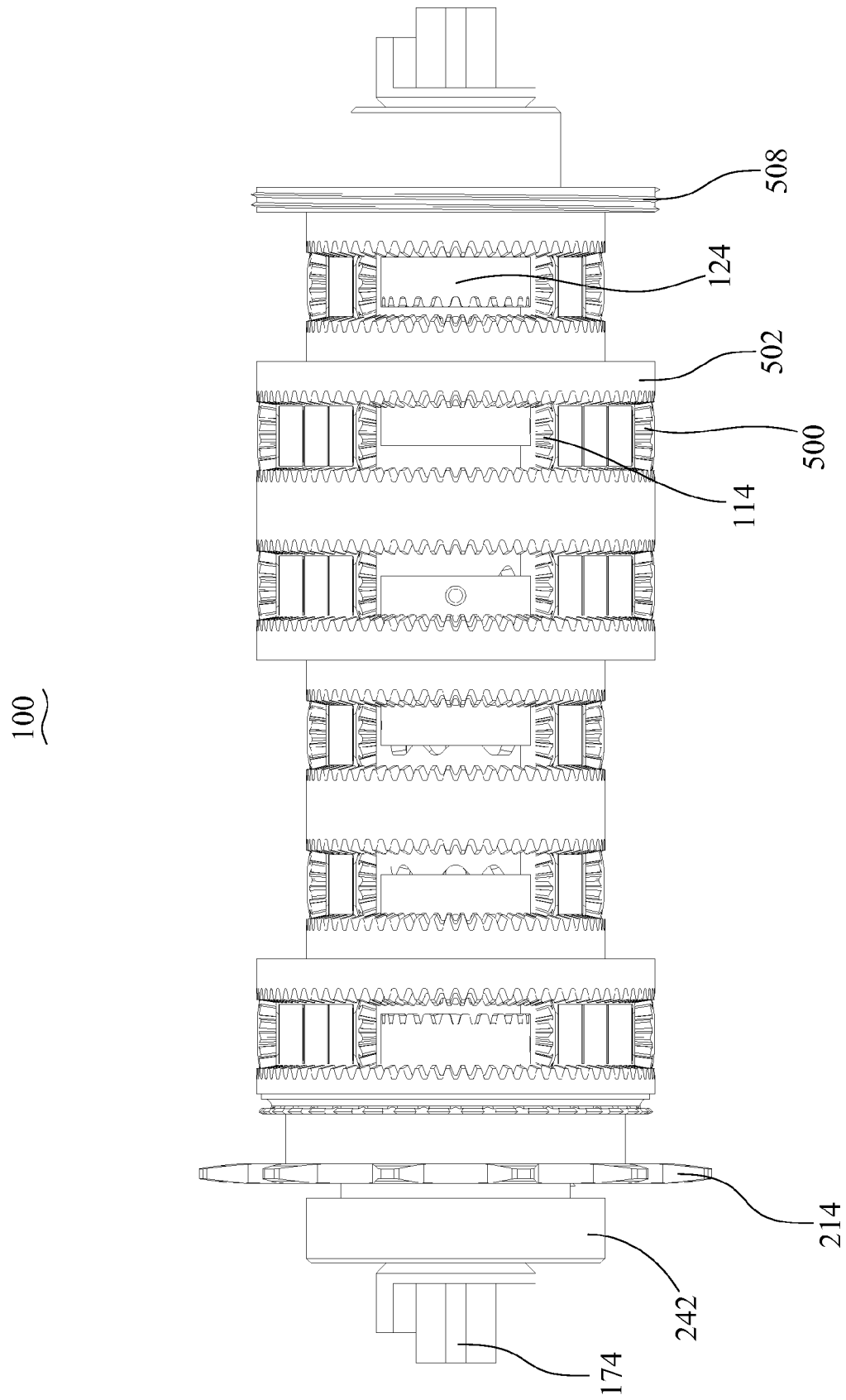
FIG. 21B is a side view of the sixth embodiment of the multi-ratio transmission system with parallel vertical and coaxial planet gears according to the present invention, where the cylindrical casing is omitted for a better view of the internal structure.

The multi-ratio transmission system 100 according to the sixth embodiment of the present invention will be further explained with reference to FIG. 19, FIG. 20A, FIG. 20B, FIG. 20C, FIG. 21A and FIG. 21B.

The multi-ratio transmission system 100 of the present invention includes multiple planet gear sub-systems 102. In the sixth embodiment, the multi-ratio transmission system 100 includes six planet gear sub-systems 102. The six planet gear sub-systems 102 are coaxially placed in series along a common axis, which is defined as a first axis 104. Each planet gear sub-system 102 includes a sun gear 106, which is configured to rotate around the first axis 104. The sun gear 106 includes an outer gear 108 and an inner gear 110, and the outer gear 108 and the inner gear 110 are connected coaxially relative to each other. The outer gear 108 is a bevel gear and is located at an outer side of the inner gear 110.

Each planet gear sub-system 102 further includes at least one planet gear set 112 having a planet gear 114. The planet gear 114 is a bevel gear, and is able to engage with the outer gear 108 of the sun gear 106. The planet gear 114 is disposed on an axle 115 so as to rotate around a second axis 116. The second axis 116 is perpendicular to the first axis 104, and is defined by the axis of the axle 115. Notably, the second axis 116 of the planet gear 114 in each planet gear sub-system 102 is perpendicular to the first axis 104, and is configured to be parallel with each other.

Considering the balance of the forces, each planet gear sub-system 102 includes two planet gears 114 in the sixth embodiment. The two planet gears 114 are configured to be opposite to each other, in other words, the two planet gears 114 are 180 degrees apart from each other. However, the number of the planet gears 114 is not limited by the sixth embodiment. If necessary, each planet gear sub-system 102 includes three or more planet gears 114 that are configured symmetrically about the axle (or not symmetrically about the axle).

A coupling assembly 118 is used to couple two adjacent planet gear sub-systems 102 together, so that the rotation of the planet gear 114 of the former planet gear sub-system 102 is transmitted to the planet gear 114 of the latter planet gear sub-system 102. In the sixth embodiment, the coupling assembly 118 includes two small gears 500. Each small gear 500 is connected to the axles 115 of the planet gear sets 112 of the two adjacent planet gear sub-systems 102 so as to rotate in synchronization with the planet gears 114 of the planet gear sets 112. A coupling gear plate 502 is disposed between the two small gears 500 to connect the two small gears 500, so that the rotation of the planet gear 114 of the former planet gear sub-system 102 is transmitted to the planet gear 114 of the latter planet gear sub-system 102 through the axle 115, the two small gears 500 and the coupling gear plate 502.

In the sixth embodiment, the coupling gear plate 502 has a first axial end surface and a second axial end surface. A crown gear 504 is formed on the first and second axial end surfaces respectively for engaging with the small gears 500 of the planet gear sets 112 of the two adjacent planet gear sub-systems 102.

In the sixth embodiment, the two crown gears 504 on the two sides of some of the coupling gear plates 502 are configured to have different diameters. The small gears 500 to engage with the crown gears 504 are located at a different distance from the first axis 104 respectively. With different distance from the first axis 104, the rotation speed of the two small gears 500 on the two sides of the coupling plates 502 are different from each other. On the other hand, the two crown gears 504 on the two sides of the other coupling gear plates 502 are configured to have the same diameter. Hence, the rotation speed of the small gears 500 of such coupling gear plates 502 are the same.

Herein, for clarity, the gear coupling plate 502 which has two crown gears 504 with different diameters is referred to as the first gear coupling plate 502. The gear coupling plate 502 which has the two crown gears 504 with the same diameter is referred to as the second gear coupling plate 502. In the sixth embodiment, the two first gear coupling plates 502 are disposed symmetrically with each other with a second gear coupling plate 502 disposed therebetween. In other words, the crown gear 504 with larger diameter of the former first gear coupling gear plate 502 is disposed symmetrically with the crown gear 504 with larger diameter of the latter first gear coupling gear plate 502. For example, the two crown gears 504 with larger diameters are disposed facing each other or are disposed facing away from each other. Similarly, the two crown gears 504 with smaller diameters of the first gear coupling gear plate 502 are also disposed symmetrically with each other. With the configuration that a second gear coupling plate 502 is sandwiched between two first gear coupling plates 502, every three adjacent planet gear sub-systems 102 can be seen as a group. In addition, the planet gear 114 of the first planet gear sub-systems 102 has a different rotation speed from the two planet gears 114 of the last two planet gear sub-systems 102, but the two planet gears 114 of the last two planet gear sub-systems 102 have the same rotation speed.

It is worth noting that the small gears 500 of the first (the front) and the last (the rear) planet gear sub-systems 102 are engaged with two annular gears 150 respectively (please refer to the following descriptions). In the following description, the first planet gear planet sub-system 102 is referred to the first planet gear sub-system 102 connected adjacently to a sprocket 214 (please refer to the following description). The last planet gear subsystem 102 is referred to the very last planet gear sub-system 102 in the series of planet gear sub-systems 102 relative to the first planet gear sub-system 102.

In addition, each planet gear sub-system 102 further includes a setting element 124. The setting element 124 is able to optionally move along the first axis 104 so as to engage with and secure the sun gear 106 of the planet gear sub-system 102, or to disengage from and release the sun gear 106 of the planet gear sub-system 102. In the fifth embodiment, the setting element 124 is a crown gear and has a hollowed cylinder 126. The setting element 124 is disposed coaxially with the sun gear 106, and is able to move along the first axis 104 corresponding to the sun gear 106. Teeth 128 are formed at an end of the hollowed cylinder 126 of the setting element 124 facing the inner gear 110 of the sun gear 106. When the setting element 124 moves toward the sun gear 106, the teeth 128 engage with the inner gear 110 of the sun gear 106, thereby securing the sun gear 106. When the setting element 124 moves away from the sun gear 106, the teeth 128 of the setting element 124 disengage from the inner gear 110, thereby releasing the sun gear 106 for free rotation. With the configuration described above, different gear ratios are provided based on the engagement statuses of the sun gears 106 of the planet gear sub-systems 102.

The multi-ratio transmission system 100 of the present invention further includes a setting element controller 130. The setting element controller 130 is connected to the setting element 124 of each planet gear sub-system 102 so as to enable the setting element 124 to engage with the sun gear 106 or disengage from the sun gear 106. In the sixth embodiment, the setting element controller 130 includes a hollowed tube 132. The hollowed tube 132 is disposed coaxially with the first axis 104, and is able to rotate around the first axis 104 in a range of predetermined angles. The hollowed tube 132 has two ends. At least one end of the hollowed tube 132 is installed with a rotation controller 133 for optionally rotating the hollowed tube 132 within the range of predetermined angles. The hollowed tube 132 has an outer circumferential surface 134, where multiple cam grooves 136 are formed generally in the circumferential direction. In the sixth embodiment, six cam grooves 136 are formed corresponding to the setting elements 124 of the six planet gear sub-systems 102. The hollowed cylinder 126 of each setting element 124 has an inner circumferential surface (not numbered). A control pin 138 is installed on the inner circumferential surface in such way that the free end of the control pin 138 is inserted into the corresponding cam groove 136, so that the control pin 138 moves along the cam groove 136 on the outer circumferential surface 134 in the circumferential direction. Hence, when the rotation controller 133 rotates the hollowed tube 132 of the setting element controller 130 in the range of predetermined angles, the setting elements 124 of all six planet gear sub-systems 102 move in the axial direction along the first axis 104 corresponding to the cam grooves 136 due to the control pins 138 inserted in the cam grooves 136. In this way, the setting elements 124 move closer to or away from the sun gears 106, thereby engaging with or disengaging from the corresponding sun gears 106. By designing the cam grooves 136 into different shapes, each setting element 124 moves in different axial directions, thereby granting different gear ratios.

In the sixth embodiment, the depth of the cam groove 136 of the setting element controller 130 is the same as the wall thickness of the hollowed tube 132; however, the depth of the cam groove 136 can also be configured to be smaller than the wall thickness of the hollowed tube 132.

Each planet gear sub-system 102 further includes an annular base 140. A circular wall structure is formed on the annular base 140 surrounding the setting element 124 and the planet gears 114, and is coaxially disposed with the first axis 104. A hole 142 is drilled on the annular base 140 corresponding to the axle 115 of the planet gear set 112 for fitting the axle 115. In the sixth embodiment, the inner end of the axle 115 (located inside the annular base 140) and the outer end (located outside the annular base 140) are installed with the planet gear 114 and the small gear 500 respectively. In this way, the planet gear 114 is located inside the annular base 140, and the small gear 500 is located outside the annular base 140.

As mentioned above, the planet gear sub-systems 102 are grouped in the sixth embodiment; therefore, the annular bases 140 of the two adjacent planet gear sub-systems 102 are integrally formed as shown in the figures.

In addition, the multi-ratio transmission system 100 according to the sixth embodiment further includes a bearing 506. The bearing 506 is disposed surrounding the crown gears 504 with smaller diameters of the coupling gear plates 502 and the small gears 500 engaged therewith, thereby supporting the coupling gear plate 502 to rotate smoothly on the inner circumferential surface of the cylindrical casing 154.

The multi-ratio transmission system 100 of the present invention further includes at least one annular gear 150 for engaging with the small gears 500 of one of the planet gear set 112 of one of the planet gear sub-systems 102. In the sixth embodiment, the multi-ratio transmission system 100 includes two annular gears 150, each annular gear is engaged with the small gear 500 the first and the last planet gear sub-systems 102 respectively. In the sixth embodiment, the annular gear 150 is a crown gear. Teeth 152 are formed at one axial end of the annular gear 150 for engaging with the corresponding planet gear 114. The annular gear corresponding to the last planet gear sub-system 102 is secured inside the cylindrical casing 154 with a circular securing end cap 508. The securing end cap 508 is formed with a center hole 510 for rotatably fitting the annular gear 105 corresponding to the last planet gear sub-system 102. The securing end cap 508 has an outer circumferential surface for installing onto an inner circumferential surface of the cylindrical casing 154. Any conventional methods can be used to install the securing end cap 508 onto the cylindrical casing 154. In the sixth embodiment, an outer thread 512 is formed on the outer circumferential surface of the securing end cap 508 for engaging with an inner thread 158 formed on the inner circumferential surface of the cylindrical casing 154. In this way, the securing end cap 508 is secured onto the cylindrical casing 154. The annular gear 150 corresponding to the first planet gear sub-system 102 is installed onto a one-way clutch 200 (will be described in later paragraphs), and a shoulder portion 201 is formed between the two. In the sixth embodiment, because the two annular gears 150 are engaged with the small gears 500 of the planet gear sets 112 of the first and the last planet gear sub-systems 102, therefore, in addition to the annular gear 150 corresponding to the last planet gear sub-system 102 being secured to an end of the cylindrical casing 154 (rear end), the annular gear 150 corresponding to the first planet gear sub-system 102 is fitted at the other end (front end) of the cylindrical casing 154. The rest of the planet gear sub-systems 102 are enclosed within the cylindrical casing 154.

In the sixth embodiment, in addition to the inner thread 158 formed at the rear end of the cylindrical casing 154, an annular flange 300 is also inwardly formed at the front end of the cylindrical casing 154. The annular flange 300 abuts against the annular gear 150 of the planet gear sub-system and the shoulder portion 201 of the one-way clutch 200 with a bearing 302. In this way, each planet gear sub-systems 102 is secured inside the cylindrical casing 154 to ensure the engagement relationship between each small gear 500 and each crown gear 504 of the coupling gear plate 502.

In the sixth embodiment, the front annular gear 150 is integrally formed with the clutch casing 202 of the one-way clutch 200.

The multi-ratio transmission system 100 of the present invention further includes a central axle 174. The central axle 174 is disposed coaxially with the first axis 104, and is inserted to a center through hole 176 of the hollowed tube 132 of the setting element controller 130 by relative rotation. The central axle 174 enables the hollowed tube 132 to rotate around the central axle 174, so that when the rotation controller 133 rotates the hollowed tube 132 of the setting element controller 130 around the central axle 174, the setting element 124 moves in the axial direction on the outer circumferential surface 134 of the hollowed tube 132.

In the sixth embodiment, the two ends of the central axle 174 are secured to the bicycle rack respectively, so that the central axle 174 is mounted to the bicycle rack and is prevented from relative motion or rotation. In the sixth embodiment, two flat surfaces 178 are formed opposite to each other at each end of the central axle 174. The flat surfaces 178 are engaged with the external flat surfaces to prevent the rotation of the central axle 174. In addition, the flat surfaces 178 also provide the space for other components to mount onto the central axle 174.

In the sixth embodiment, the multi-ratio transmission system 100 of the present invention further includes a one-way clutch 200 disposed outside of the first planet gear sub-system 102. The one-way clutch 200 abuts against the annular flange 300 of the cylindrical casing 154 with the bearing 302 and the front annular gear 150. In the sixth embodiment, the one-way clutch 200 includes a clutch casing 202 and multiple pin sets 204. The clutch casing 202 is roughly a cylindrical component formed with an inner axial end (not numbered) and an outer axial end (not numbered). The inner axial end is installed onto the front annular gear 150 and is located inside the cylindrical casing 154. The outer axial end is located outside of the cylindrical casing 154.

A through hole 208 is formed at the center of the clutch casing 202, and is configured to be coaxial with the first axis 104. The rotation controller 133 of the setting element controller 130 is rotatably fitted and supported in the through hole 208. The cross-section shape of the through hole 208 is formed corresponding to the rotation controller 133 and the shape of the hollowed tube 132 installed on the rotation controller 133. This belongs to the common means of those who skilled in the art, therefore it is not described in detail herein. A fact worth mentioning is that a bearing 210 or other components with similar functions are disposed between the rotation controller 133 and the through hole 208 for steadily and rotatably supporting the rotation controller 133 of the setting element controller 130 and the hollowed tube 132.

An annular protrusion 212 is formed on the outer axial end of the clutch casing 202, and is formed coaxially with and surrounding the through hole 208 for coaxially supporting a sprocket 214. Multiple pin-fitting holes 216 are formed on the annular protrusion 212. In the sixth embodiment, six pin-fitting holes 216 are formed on the annular protrusions 212, but the number of the pin-fitting holes 216 is adjusted according to different needs. Preferably, the pin-fitting holes 216 are formed on the annular protrusion 212 in the circumferential direction with the same angular interval between every two adjacent pin-fitting holes 216. Each pin-fitting hole 216 is formed with a first section 218 and a second section 220, in which the first section 218 has a larger diameter than the second section 220. A shoulder portion 222 is formed between the first section 218 and the second section 220. A pin set 204 is fitted in each pin-fitting hole 216.

Each pin set 204 includes a housing 224 which is shaped as a hollowed cylinder and a pin 226 which is movably placed inside the housing 224. A spring 228 is placed between the housing 224 and the pin 226 in such a manner that its inner end abuts against the shoulder portion 222 and its outer end abuts against a flange of the pin 226. With the flexibility of the spring 228, the spring 228 pushes the outer end 230 of the pin 226 outside the housing 224, and further engages the outer end 230 of the pin 226 with the engaging holes 232 formed on the sprocket 214. In this way, the one-way clutch 200 engages with the sprocket 214 to rotate together therewith.

With the flexibility of the spring 228, the pin 226 retracts back into the casing 224 when the outer end 230 of the pin 226 is under internal stress. Under this condition, the inner end of the pin 226 is fitted inside the second section 220 of the pin-fitting hole 216 of the housing 224, thereby avoiding interferences between the components.

Multiple engaging holes 232 are formed on the sprockets 214. The engaging holes 232 are distributed along a circle, which is coaxial with the first axis 104, with equal angular interval therebetween. Each engaging hole 232 has a front end and a back end (both not numbered) in the circumferential direction. The back end has a flat surface, which abuts against the outer end 230 of the pin 226, for transmitting the force. When the sprocket 214 rotates forward, the back ends of the engaging holes 232 also rotate forward with the pins 226, thereby transmitting the torque and the rotation motion to the multi-ratio transmission system 100 of the present invention. On the other hand, the front end of the engaging hole 232 is an oblique surface, which serves as a cam. The front end of the engaging hole 232 can guide the outer end 230 of the pin 226 to the outside of the engaging hole 232 when it comes into contact with the outer end 230 of the pin 226. Hence, when the sprockets 214 rotates backward, the pin 226 would not transmit the torque and the rotation motion to the multi-ratio transmission system 100 of the present invention due to the oblique surface of the front end of the engaging hole 232. In this way, the one-way clutch 200 transmits the torque and rotation motion in one direction only.

In the sixth embodiment, the multi-ratio transmission system 100 of the present invention further includes a shift cable connector 234. The shift cable connector has an inner axial pin 236 for inserting into and connecting with a connecting hole 238 of the rotation controller 133 of the setting element controller 130. The connecting hole 238 is formed eccentrically to the first axis 104, in this way, the shift cable connector 234 can rotate the connecting hole 238 to rotate around the first axis 104, and further drives the hollowed tube 132 of the rotation controller 133 to rotate around the first axis 104, thereby shifting between different gear ratios.

A shift cable (not shown) is installed onto the shift cable connector 234. The shift cable is the shift cable commonly seen on any bicycles, which is connected with a lever installed on the bicycle. When the user shifts the lever, the shift cable is then pulled by the lever and further rotates the setting element controller 130 through the shift cable connector 234.

In addition, an outer axial pin 240 is disposed on the shift cable connector 234 opposite to the inner axial pin 236.

A shift-guiding component 242 is inserted and connected to the central axle 174. Especially, an insertion hole 244 is formed at the center of the shift-guiding component 242, in which the two sides of the insertion hole 244 are formed as two flat walls 246 for abutting against the flat surfaces 178 of the central axle 174, so the relative rotation between the two is prevented. In addition, a circular guiding groove 248 is formed coaxially with the first axis 104 on the shift-guiding component 242. The circular guiding groove 248 extends in a range of angles along the circumferential direction, in which the range of angles is corresponded to the range of predetermined angles for the rotation of the hollowed tube 132 of the setting element controller 130.

The outer axial pin 240 of the shift cable connector 234 is inserted into the circular guiding groove 248 to move along the circular guiding groove 248. When the user pulls the shift cable connector 234 through the shift cable, the outer axial pin 240 then moves along the circular guiding groove 248, thereby achieving the shifting between different gear ratios. Herein, a fact worth mentioning is that the two ends of the circular guiding groove 248 serve as the stopper of the outer axial pin 240 to prevent the outer axial pin 240 from moving out of range.

A restoring spring 250 is disposed between the shift-guiding component 242 and the rotation controller 133 of the setting element controller 130. The restoring spring 250 can server as the restoring force of the setting element controller 130 after the gear shifting, in which the setting element controller 130 is pulled by the shift cable. In the third embodiment, the restoring spring 250 has two side ends 252, which are inserted into the insertion hole 254 formed on the rotation controller 133 and the insertion hole 256 formed on the shift-guiding component 242 respectively.

Although the present invention has been described with reference to the preferred embodiments thereof, it is apparent to those skilled in the art that a variety of modifications and changes may be made without departing from the scope of the present invention which is intended to be defined by the appended claims. Any equivalent structures in the same field or other related fields achieved with the description and figures of the present invention should be considered within the scope of protection of the present invention.

What is claimed is:

1. A multi-ratio transmission system with parallel vertical and coaxial planet gears, comprising:
    a plurality of planet gear sub-systems, being coaxially disposed in series along a first axis, each of said planet gear sub-system comprising:
    a sun gear, being coaxially disposed along said first axis, wherein said sun gear rotates around said first axis; and
    at least one planet gear, being coaxially disposed along a second axis which is vertical to said first axis, wherein said at least one planet gear rotates around said second axis;
    at least two coupling assemblies, wherein each of said coupling assembly includes a gear set, and is disposed between every two adjacent said planet gear sub-systems so as to transmit rotation of said planet gear of the former said planet gear sub-system to said planet gear of the latter said planet gear sub-system; wherein said at least two coupling assemblies form a group of said coupling assemblies, and groups of coupling assemblies are disposed along said first axis in a repeated manner;
    a setting element disposed corresponding to each of said planet gear sub-systems, wherein said setting element moves in the direction of said first axis so as to engage with said sun gear of said planet gear sub-system;
    a setting element controller, having a hollowed tube disposed coaxially with said first axis to rotate around said first axis within a range of predetermined angles, wherein said hollowed tube has an outer circumferential surface, and a cam groove is formed on said outer circumferential surface in the circumferential direction corresponding to each of said setting element of said planet gear sub-system, thereby allowing said setting element to move along said first axis and to engage with said sun gears of said planet gear sub-systems;
    an annular gear installed onto to a one-way clutch, wherein said annular gear forms a linkage relationship with said planet gear of at least one said planet gear sub-system;
    a cylindrical casing enclosing said planet gear sub-systems, wherein said cylindrical casing has a front end for rotatably fitting said annular gear;
    a sprocket installed onto said one-way clutch, wherein said sprocket is installed with an external transmission system to drive said planet gear sub-systems to rotate via said one-way clutch and said annular gear; and
    a central axle, being disposed coaxially with said first axis, wherein said central axle is inserted into a center through hole of said hollowed tube of said setting element controller by relative rotation, thereby enabling said hollowed tube to rotate around said central axle.

2. The multi-ratio transmission system with parallel vertical and coaxial planet gears according to claim 1, wherein said second axes of said planet gears of said planet gear sub-systems are configured to be parallel to one another.

3. The multi-ratio transmission system with parallel vertical and coaxial planet gears according to claim 1, wherein said sun gear of each of said planet gear sub-systems includes an outer gear, which is a bevel gear, and said planet gear of each said planet gear sub-system is a bevel gear engaging with said outer gear of said sun gear.

4. The multi-ratio transmission system with parallel vertical and coaxial planet gears according to claim 3, wherein said sun gear further includes an inner gear, and said setting element is a crown gear, which engages with said inner gear of said sun gear.

5. The multi-ratio transmission system with parallel vertical and coaxial planet gears according to claim 1, wherein said sun gear of each planet gear sub-system includes an outer gear and an inner gear which are coaxially connected to each other, said outer gear is located at the outer side of said inner gear and is a bevel gear, said planet gear of said planet gear sub-system is a bevel gear, which is engaged with said outer gear of said sun gear, and said setting element is a crown gear, which engages with said inner gear of said sun gear.

6. The multi-ratio transmission system with parallel vertical and coaxial planet gears according to claim 1, wherein each planet gear sub-system has two planet gears, which are disposed opposite to each other.

7. The multi-ratio transmission system with parallel vertical and coaxial planet gears according to claim 1, wherein said gear set of said coupling assembly includes:
    two small gears, said two small gears are coaxially connected to said planet gears of said two adjacent planet gear sub-systems respectively, and are rotated in synchronization with said planet gears respectively; and
    a coupling gear plate disposed between said two small gears and having two gears, wherein said two gears are engaged with said two small gears.

8. The multi-ratio transmission system with parallel vertical and coaxial planet gears according to claim 7, wherein said two gears of said coupling gear plate are two crown gears, and said two crown gears are formed on two axial end surfaces of said coupling gear plate respectively.

9. The multi-ratio transmission system with parallel vertical and coaxial planet gears according to claim 8, wherein said two crown gears of said coupling gear plate are configured to have different diameters.

10. The multi-ratio transmission system with parallel vertical and coaxial planet gears according to claim 8, wherein said two crown gears of said coupling gear plate are configured to have the same diameter.

11. The multi-ratio transmission system with parallel vertical and coaxial planet gears according to claim 8 includes two of said coupling plate, wherein said two crown gears of at least one of said coupling gear plate are configured to have different diameters, and said two crown gears of at least one of said coupling gear plate are configured to have the same diameter.

12. The multi-ratio transmission system with parallel vertical and coaxial planet gears according to claim 8 includes two of said coupling gear plates, wherein said two crown gears of each said coupling gear plate are configured to have different diameters, and said two coupling gear plates are disposed symmetrically with each other.

13. The multi-ratio transmission system with parallel vertical and coaxial planet gears according to claim 12, wherein each of said group of coupling assemblies includes two of said coupling assemblies, said two crown gears of said two coupling gear plate in each said group are configured to have different diameters, and said two coupling gear plates are disposed symmetrically with each other.

14. The multi-ratio transmission system with parallel vertical and coaxial planet gears according to claim 12, wherein each of said group of coupling assemblies includes three of said coupling assemblies, said two crown gears of said two coupling gear plates in said three coupling gear plates of said three coupling assemblies are configured to have different diameters, and said two coupling gear plates are disposed symmetrically with each other; wherein said two crown gears of the other said coupling gear plate are configured to have the same diameter, and the other said coupling gear plate is disposed between the two coupling gear plates described previously.

15. The multi-ratio transmission system with parallel vertical and coaxial planet gears according to claim 7, wherein said annular gear engages with said small gear of a first planet gear sub-system among said planet gear sub-systems, so as to form the linkage relationship between said planet gear and said annular gear.

16. The multi-ratio transmission system with parallel vertical and coaxial planet gears according to claim 1, wherein said central axle has two ends, said two ends of said central axle are secured on a bicycle rack respectively.

17. The multi-ratio transmission system with parallel vertical and coaxial planet gears according to claim 16, wherein two flat surfaces are formed oppositely to each other on each end of said central axle, said two flat surfaces of said central axle are engaged with two corresponding flat surfaces of said bicycle rack to prevent relative rotation between said central axle and said bicycle rack.

18. The multi-ratio transmission system with parallel vertical and coaxial planet gears according to claim 1, wherein said setting element controller further includes a rotation controller, said rotation controller is installed onto an end of said hollowed tube so as to rotate said hollowed tube in said range of predetermined angles.

19. The multi-ratio transmission system with parallel vertical and coaxial planet gears according to claim 18, wherein said rotation controller is installed onto a shift cable connector for connecting to a shift cable, said rotation controller and said hollowed tube installed onto said rotation controller are driven to rotate around said first axis by pulling said shift cable.

20. The multi-ratio transmission system with parallel vertical and coaxial planet gears according to claim 19, wherein a connecting hole is formed on said rotation controller for inserting an inner axial pin of said shift cable connector.

21. The multi-ratio transmission system with parallel vertical and coaxial planet gears according to claim 19 further includes a shift-guiding component inserted and connected to said central axle, wherein a circular guiding groove is formed coaxially with said first axis on said shift-guiding component, said shift cable connector has an outer axial pin which is slidably inserted into said circular guiding groove; wherein said circular guiding groove extends for a range of angles in the circumferential direction corresponding to said range of predetermined angles of the rotation of said hollowed tube of said setting element controller.

22. The multi-ratio transmission system with parallel vertical and coaxial planet gears according to claim 21, wherein an insertion hole is formed at the center of said shift-guiding component, and the two sides of said insertion hole are formed as two flat walls for abutting against said flat surfaces of said central axle, thereby preventing relative rotation between said central axle and said shift-guiding component.

23. The multi-ratio transmission system with parallel vertical and coaxial planet gears according to claim 1, wherein said setting element includes a hollowed cylinder, a plurality of teeth is formed on a side end of said hollowed cylinder, and said hollowed cylinder is disposed coaxially with said sun gear of said planet gear sub-system in such way that said hollowed cylinder moves along said first axis corresponding to said sun gear, thereby allowing said teeth to engage with said sun gear; said hollowed cylinder includes a control pin, wherein a free end of said control pin is inserted into said cam groove to move along said cam groove.

24. The multi-ratio transmission system with parallel vertical and coaxial planet gears according to claim 1, wherein a shoulder portion is formed between said annular gear and said one-way clutch, an annular flange is formed inwardly at said front end of said cylindrical casing, said annular flange abuts against said shoulder portion of said annular gear to rotatably fit said annular gear inside said front end of said cylindrical casing.

25. The multi-ratio transmission system with parallel vertical and coaxial planet gears according to claim 24 further includes a bearing, wherein said bearing is disposed between said annular flange of said cylindrical casing and said shoulder portion formed between said annular gear and said one-way clutch.

26. The multi-ratio transmission system with parallel vertical and coaxial planet gears according to claim 1 includes a second annular gear, wherein said second annular gear is rotatably fitted at a rear end of said cylindrical casing opposite to said front end, said annular gear and said second annular gear form a linkage relationship with the planet gears of said first planet gear sub-systems and a last planet gear sub-systems among said planet gear sub-systems respectively.

27. The multi-ratio transmission system with parallel vertical and coaxial planet gears according to claim 26, wherein said annular gear and said second annular gear are engaged with said small gears of a first and a last of said planet gear sub-systems respectively, thereby forming the linkage relationship between said annular gear, said second annular gear, and said planet gears of said planet gear sub-systems.

28. The multi-ratio transmission system with parallel vertical and coaxial planet gears according to claim 26 further comprising a securing end cap having a center hole, wherein said second annular gear is rotatably supported inside said center hole.

29. The multi-ratio transmission system with parallel vertical and coaxial planet gears according to claim 28, wherein an outer thread is formed at an outer circumferential surface of said securing end cap, an inner thread is formed at an inner circumferential surface at the rear end of said cylindrical casing, said outer thread of said securing end cap is engaged with said inner thread of said cylindrical casing to secure said securing end cap at said rear end of said cylindrical casing.

30. The multi-ratio transmission system with parallel vertical and coaxial planet gears according to claim 1, wherein each planet gear sub-system includes an annular base, a circular wall structure is formed on said annular base surrounding said setting element and said planet gear of said planet gear sub-system while being disposed coaxially with said first axis; wherein a hole is formed on said annular base for rotatably fitting and supporting an axle of said planet gear.

31. The multi-ratio transmission system with parallel vertical and coaxial planet gears according to claim 1, wherein said one-way clutch includes:
   a clutch casing integrally formed with said annular gear, wherein said clutch casing has an annular protrusion for installing said sprocket, and at least one pin-fitting hole is formed on said annular protrusion; and
   at least one pin set fitted inside said pin-fitting hole, wherein said pin set includes a pin, which is constantly pushed outward by a spring to engage with one of a plurality of engaging holes formed on said sprocket, and is retracted from said engaging hole by an external force.

32. The multi-ratio transmission system with parallel vertical and coaxial planet gears according to claim 31, wherein said engaging holes of said sprocket are distributed along a circle, which is coaxial to said first axis, with equal angular intervals in between every two adjacent engaging holes; wherein each engaging hole has a flat surface and an oblique surface opposite to said flat surface, said flat surface is abutted against said pin to transmit force in a given rotation direction, said oblique surface serves as a cam and guides said pin outside said engaging hole upon contact to avoid force transmission in a rotation direction opposite to said given rotation direction.

* * * * *